(12) United States Patent
Casey et al.

(10) Patent No.: US 9,014,844 B2
(45) Date of Patent: Apr. 21, 2015

(54) METHODS AND APPARATUS FOR STACKING RECEPTACLES IN MATERIALS HANDLING FACILITIES

(75) Inventors: Jackie W. Casey, Lexington, KY (US); Zachary Shane Morgan, Cynthiana, KY (US)

(73) Assignee: Amazon Technologies, Inc., Reno, NV (US)

( * ) Notice: Subject to any disclaimer, the term of this patent is extended or adjusted under 35 U.S.C. 154(b) by 607 days.

(21) Appl. No.: 13/335,453

(22) Filed: Dec. 22, 2011

(65) Prior Publication Data

US 2013/0166062 A1 Jun. 27, 2013

(51) Int. Cl.
*G06F 7/00* (2006.01)
*B65D 21/04* (2006.01)
*B65G 57/30* (2006.01)
*B65G 1/137* (2006.01)

(52) U.S. Cl.
CPC .......... *B65D 21/045* (2013.01); *B65G 1/1378* (2013.01); *B65G 57/302* (2013.01)

(58) Field of Classification Search
USPC ........................................ 700/230, 228, 217
See application file for complete search history.

(56) References Cited

U.S. PATENT DOCUMENTS

2009/0000912 A1   1/2009   Battles et al.

OTHER PUBLICATIONS

USS (United Sortation Solutions), "Flexible Turning Unit (FTU) Spec Sheet," Downloaded from: http://www.unitedsortation.com/download_spec_sheets/ on Dec. 15, 2011, all pages.
USS (United Sortation Solutions), "Stacking Over Conveyor System (SOCS) Spec Sheet," Downloaded from: http://www.unitedsortation.com/download_spec_sheets/ on Dec. 15, 2011, all pages.
USS (United Sortation Solutions), "Tote Stacking/Destacking," Downloaded from: http://www.unitedsortation.com/solutions/totecarton_processing/ on Dec. 15, 2011, all pages.
Total Tote, Inc., "Tote Tender," Downloaded from: http://www.total-tote.com/TOTE_TENDER.html on Dec. 15, 2011, all pages.
"IPak Tray Stacker TS-100," IPak Machinery, Downloaded from: http://www.wexxar.com/products/ipak-tray-stacker-ts-100/?printerfriendly=yes on Dec. 15, 2011, all pages.

(Continued)

*Primary Examiner* — Gene Crawford
*Assistant Examiner* — Kyle Logan
(74) *Attorney, Agent, or Firm* — Robert C. Kowert; Meyertons, Hood, Kivlin, Kowert & Goetzel, P.C.

(57) ABSTRACT

Methods and apparatus for stacking receptacles in materials handling facilities. An automated receptacle stacker may be integrated into a materials handling system to receive empty receptacles from upstream stations via an input conveyance mechanism, add the receptacles to a stack in a stack hopper, detect when the stack is complete, and output the stack onto an output conveyance mechanism. The output conveyance mechanism may convey the stack to a palletization station, and the stacker may begin another stack. This process may continue to build and output stacks of empty receptacles. In some implementations the receptacles may be stackable only when oriented correctly; in these implementations, orientation of the receptacles may be detected prior to stacking and incorrectly oriented receptacles may be either rotated to the correct orientation or diverted to a second receptacle stacker.

29 Claims, 30 Drawing Sheets

(56) References Cited

OTHER PUBLICATIONS

"IPak Tray Stacker TS-200" IPak Machinery, Downloaded from: http://www.wexxar.com/products/ipak-tray-stacker-ts-200/?printerfriendly=yes on Dec. 15, 2011, all pages.
"IPak Tray Stacker BS-100," IPak Machinery, Downloaded from: http://www.wexxar.com/products/ipak-tray-stacker-bs-100/?printerfriendly=yes on Dec. 15, 2011, all pages.
"Schafer Handling Systems," by SSI Schaefer Group, Downloaded from: http://media.ssi-schaefer.de/fileadmin/ssi/documents/navigationsbaum/logistiksysteme/handlingsysteme/handling_systems_en.pdf on Dec. 15, 2011, all pages.
"Schafer Automated Systems," by SSI Schaefer Group, Downloaded from: http://media.ssi-schaefer.de/fileadmin/ssi/documents/main_brochures/en/br_image_automation_en.pdf on Dec. 15, 2011, all pages.
International Search Report and Written Opinion in application No. PCT/US2012/070705 mailed Feb. 19, 2013 pp. 1-17.
Tote Stacker + Rotate Module. Video (Online). United Sortation. Uploaded Apr. 2, 2010, Downloaded Feb. 5, 2013 from www.youtube.com/watch?v=Go2hK5Uj_UM pp. 1-2.

METHODS AND APPARATUS FOR STACKING RECEPTACLES IN MATERIALS HANDLING FACILITIES

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to as materials handling facilities). The inventory items are ordered from one or more vendors, received at the materials handling facilities as inbound shipments, and stocked in inventory of the materials handling facilities. In a conventional order fulfillment process, orders for items may be received from customers of the distributor. Units of the ordered items are picked from various locations in the inventory in the materials handling facilities, processed for shipping, and shipped as outbound shipments to the customers.

An example conventional order fulfillment process may include a pick process and a sortation process in which mixed batches of units picked for orders are sorted into their respective orders. In a conventional order fulfillment process, requests (e.g., orders) for items from requestors may be divided among multiple pickers, who then pick mixed batches of items. The orders may be subdivided among the pickers; therefore, two or more of the pickers may pick items for one order. Consequently, a sort operation to select the proper units of items for given orders from the aggregations of units items returned by each respective picker is required. Conventionally, sorting may be performed using automated sorting mechanisms or manual sorting systems. Automated sorting mechanisms for sorting certain types of inventory items according to individual orders include, but are not limited to, the Crisplant® sorter, Eurosort® sorters, and automated sorting mechanisms offered by other vendors. Using an automated sorting mechanism, batches or a stream of incoming picked items for multiple different customer orders are received at the automated sorting mechanism and sorted by the automated mechanism according to individual orders.

Figure 1:
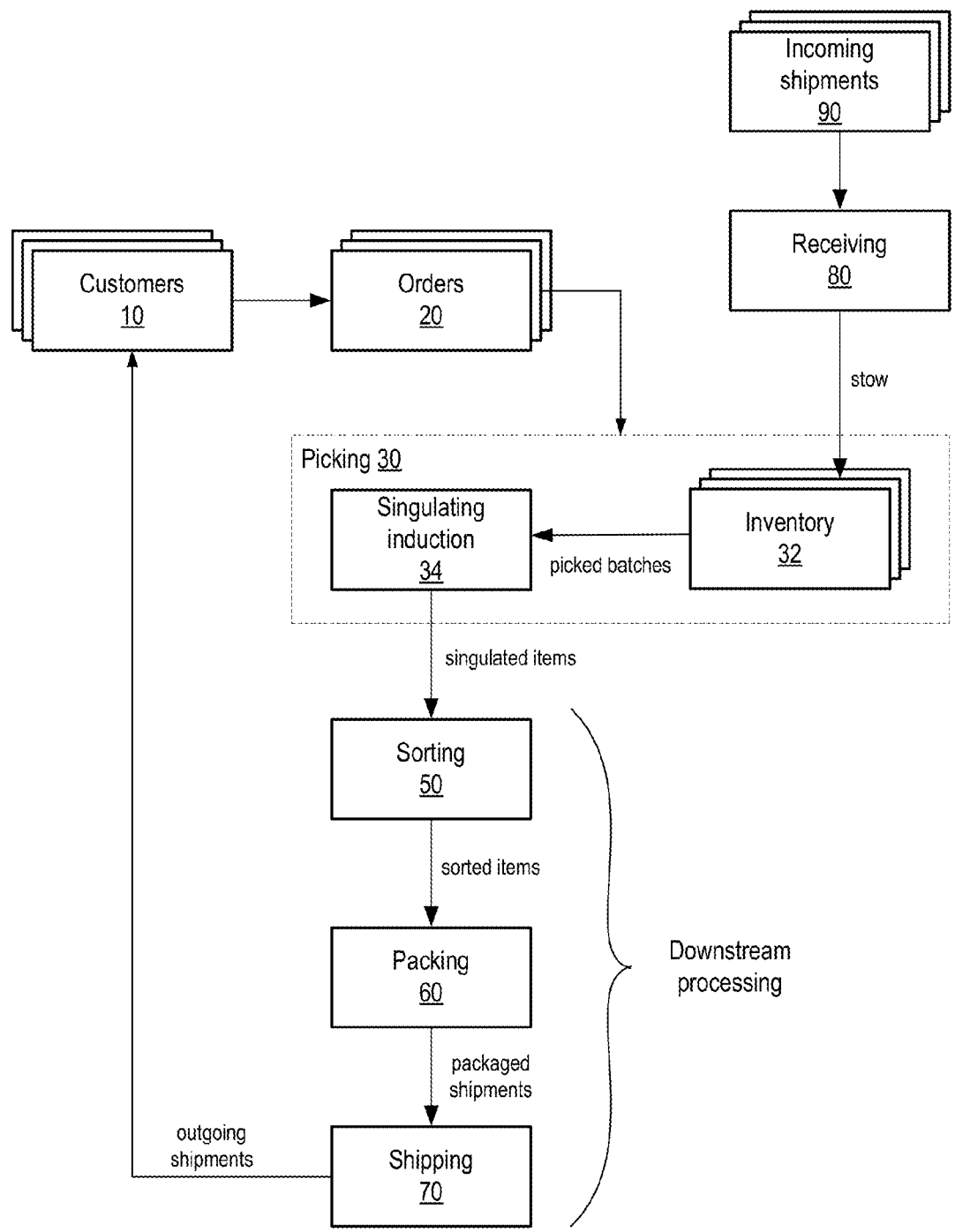
FIG. 1 illustrates a logical representation or view of the operation of an example materials handling facility in which embodiments of an automated receptacle stacker may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for collecting and stacking empty receptacles in materials handling facilities are described. An automated receptacle stacker is described that may be integrated into a process or system in a facility, for example a materials handling system such as an order fulfillment process or system in a materials handling facility, that uses receptacles for one or more purposes such as transporting one or more units of items within the facility. The receptacle stacker may receive empty receptacles through an input mechanism, collect the receptacles into a stack using a stacking mechanism, and, when each stack is complete, output the stack via an output mechanism. The output stacks may, for example, be collected onto pallets for transferal to other locations in the facility. Embodiments of the automated receptacle stacker may reduce or eliminate labor costs associated with the task of empty receptacle collection in materials handling facilities, which has conventionally been performed manually. Embodiments of the automated receptacle stacker may be easily reconfigured to stack various sizes or heights of receptacles. In at least some embodiments, an automated receptacle stacker may be configured to stack mixed types of receptacles, for example receptacles of similar width and length but of differing heights. In some implementations, receptacles may be used that are stackable by the receptacle stacker only if oriented correctly. Thus, embodiments of a receptacle stacker are described that automatically detects incorrectly oriented receptacles and rotates the incorrectly oriented receptacles to the correct orientation prior to stacking the receptacles.

This document first describes an example materials handling facility and materials handling system (an order fulfillment process) into which embodiments of the automated receptacle stacker may be integrated to collect and stack various receptacles used in the process. Several configurations for integrating embodiments of the automated receptacle stacker into the process are then described. Example embodiments of the automated receptacle stacker are then described.

Example Materials Handling Facility and Materials Handling System

An order fulfillment process or order fulfillment system that is given as an example of a materials handling system into which embodiments of the automated receptacle stacker may be integrated is described in U.S. patent application Ser. No. 11/768,529, titled "Method and Apparatus for Non-Linear Unit-Level Sortation in Order Fulfillment Processes," which is hereby incorporated by reference in its entirety. U.S. patent application Ser. No. 11/768,529 describes a flexible, non-linear, unit-level sortation system that facilitates the sortation of individual units of items, picked from discrete inventory locations within a materials handling facility, into orders to fulfill requests from customers. In embodiments as described in U.S. patent application Ser. No. 11/768,529, a picking process may deliver batches, or a stream, of unsorted items for fulfilling requests to one or more induction stations in pick receptacles (also referred to as pick totes). At one or more induction stations, individual units of items are pulled or selected from a mixed collection of items, associated with particular conveyance receptacles, and placed into the receptacles, with one and only one unit per conveyance receptacle. The conveyance receptacles are inducted into a conveyance mechanism under the direction of a control system, which then, through various control mechanisms, directs the conveyance receptacles to particular destination stations within the materials handling facility. For example, a destination station may be a sorting station, where the individual items may be manually or automatically retrieved from the conveyance receptacles and manually or automatically placed into locations (e.g., slots or bins) corresponding to particular requests (e.g., customer orders).

Figure 3A:
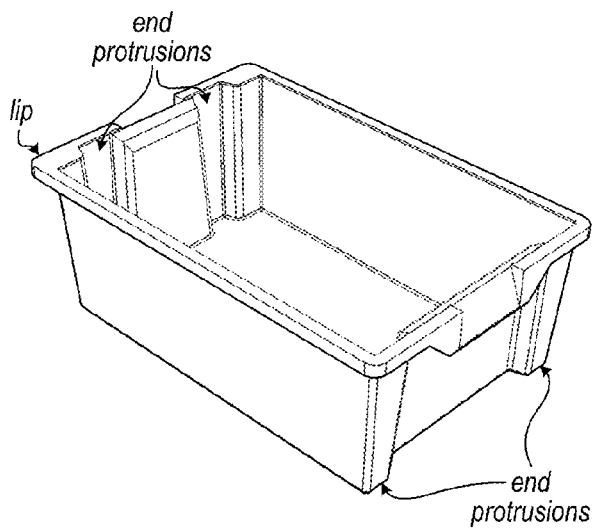
FIGS. 3A through 3C illustrate an example receptacle or tote according to at least some embodiments.
Figure 3B:
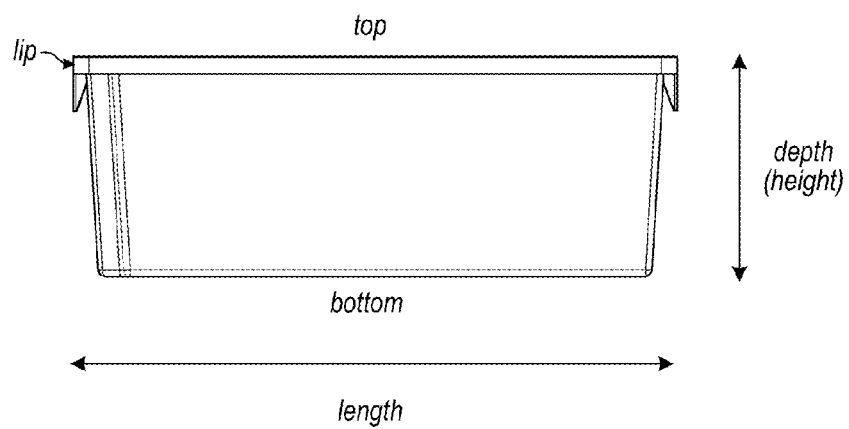
Figure 3C:
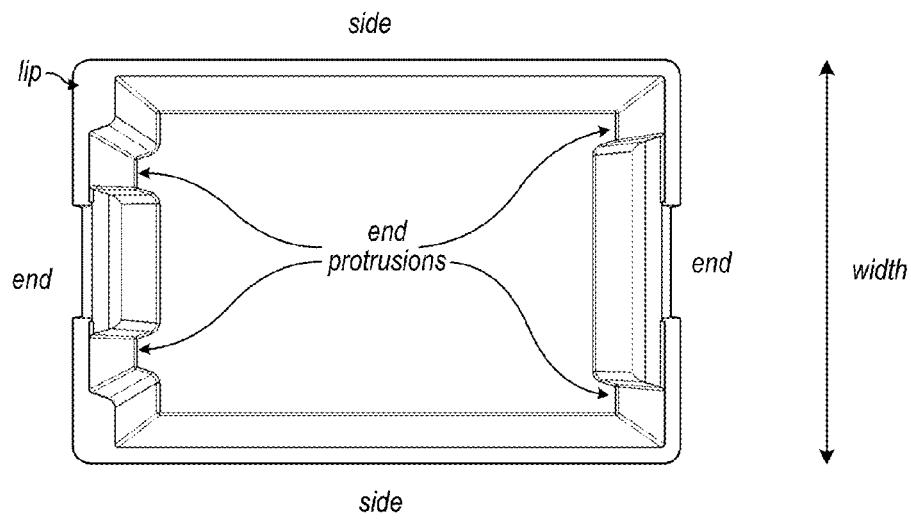

Embodiments of the automated receptacle stacker as described herein may be integrated into the order fulfillment system as described in U.S. patent application Ser. No. 11/768,529 to collect empty pick receptacles output from the induction station(s), to collect conveyance receptacles output from the destination station(s), or to collect both pick and conveyance receptacles. Receptacles, as used herein, may include, but are not limited to, any tote, basket, box, tray, or similar mechanism configured to receive individual units of items or batches of units of items in a materials handling facility. In at least some embodiments, the receptacles may be nested; that is an empty receptacle may be placed within another empty receptacle, and two or more empty receptacles may be so nested to produce a stack of receptacles. Thus, a stack of receptacles, or receptacle stack, may be used herein to refer to two or more nested receptacles. An example receptacle that may be used as a pick receptacle and/or as a conveyance receptacle is shown in FIGS. 3A through 3C.

FIG. 1 illustrates a logical representation or view of the operation of an example materials handling facility in which embodiments of the automated receptacle stacker may be implemented. For example, this Figure may illustrate an order fulfillment center of a product distributor in which an embodiment of the order fulfillment system described in U.S. patent application Ser. No. 11/768,529 is implemented. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10.

In embodiments of the order fulfillment system as described in U.S. patent application Ser. No. 11/768,529, picked items may be delivered to an induction (or singulation) station in pick receptacles, where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system. Note that a picked, packed and shipped order does not necessarily include all of the items ordered by the customer; an outgoing shipment to a customer may include only a subset of the ordered items available to ship at one time from one inventory-storing location.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30.

The various operations of a materials handling facility as illustrated in FIG. 1 may be located in one building or facility, or alternatively may be spread or subdivided across two or more buildings or facilities.

Figure 2:
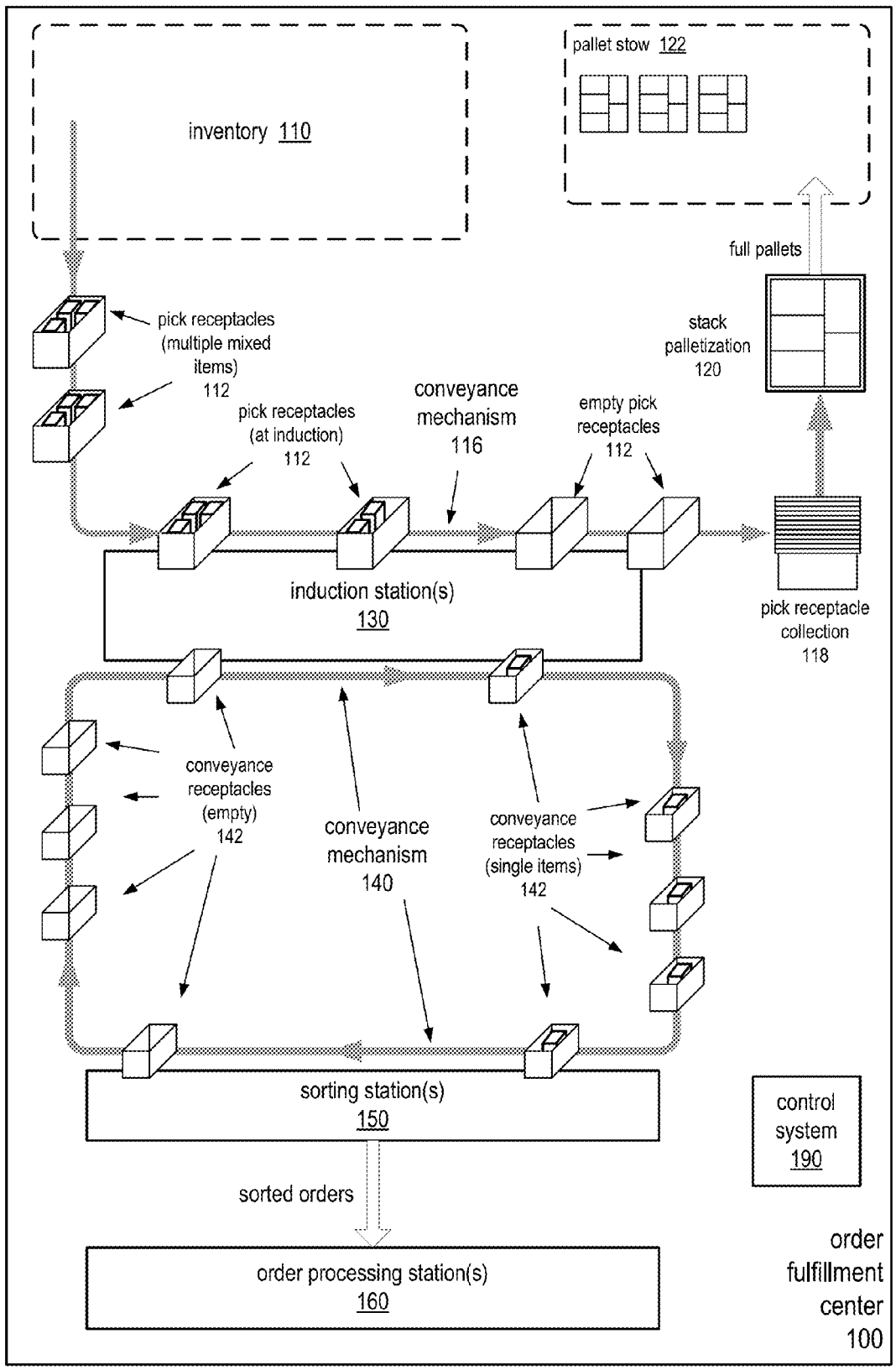
FIG. 2 illustrates an example physical layout of an example materials handling facility in which an embodiment of an order fulfillment system is implemented, and into which embodiments of an automated receptacle stacker may be integrated.

FIG. 2 illustrates an example physical layout of an example materials handling facility, such as an order fulfillment facility or center 100, in which an embodiment of the order fulfillment system as described in U.S. patent application Ser. No. 11/768,529 is implemented, and into which embodiments of the automated receptacle stacker as described herein may be integrated. Requests (e.g., orders) for items may be divided among multiple pickers, who then pick mixed batches of items from inventory 110. Picked units of items may be placed into pick receptacles 112 (e.g., pick totes) for conveyance. FIGS. 3A through 3C illustrate an example receptacle that may be used as a pick receptacle 112. The orders may be subdivided among the pickers; therefore, two or more of the pickers may pick items for one order into two or more separate pick receptacles 112A. The pick receptacles 112 holding the picked batches are conveyed or delivered to one or more induction stations 130, for example by placing the pick receptacle 112 containing one or more items on a conveyance mechanism 116 (e.g., a conveyor belt, roller system, or other conveyance mechanism) that enters the induction station(s) 130 area. In at least some embodiments, the pick receptacles 112 are not fixed to conveyance mechanism 116. Each pick receptacle 112 that is input to the induction station(s) 130 contains one or more units of items, and each may possibly contain items from two or more orders.

At the induction station(s) 130, each unit may be pulled individually from each picked batch (e.g., from a pick receptacle 112). Alternatively, all batches from the pick receptacles 112 may be "dumped" into a common receptacle (a bin, basket, shelf, etc.), and individual units may then be pulled from the common receptacle. Each pulled unit is then placed into an empty conveyance receptacle 142 (e.g., a tote or tray) on a conveyance mechanism 140, with one and only one unit placed into each conveyance receptacle 142. In at least some embodiments, the conveyance receptacles 142 are not fixed to conveyance mechanism 140. Conveyance mechanism 140 then conveys the singulated items in conveyance receptacles 142 to one or more downstream processing stations, for example sorting station(s) 150, where the singulated units of items are removed from the conveyance receptacles 142.

Once a pick receptacle 112 is emptied at the induction station(s) 130, the empty pick receptacle 112 may be conveyed to a pick receptacle collection 118 area, for example by placing the empty pick receptacle 112 on a conveyance mechanism 116 (e.g., a conveyor belt, roller system, or other conveyance mechanism) that exits the induction station(s) 130 area. In some embodiments, the conveyance mechanism 116 that conveys empty pick receptacles 112 from the induction station(s) 130 may be the same as the conveyance mechanism 116 that conveys pick receptacles 112 including items to the induction station(s) 130. However, in some embodiments, a separate conveyance mechanism 116 may be used to convey empty pick receptacles 112 from the induction station(s) 130.

At the pick receptacle collection 118 area, the empty pick receptacles 112 may be stacked, and the stacks of pick receptacles may be palletized 120. Full pallets may be conveyed to a pallet stow 122, for example using a forklift or pallet jack. Conventionally, the pick receptacles 112 are manually stacked at pick receptacle collection 118 area and manually placed on pallets. Embodiments of the automated receptacle stacker as described herein may be integrated into the process as illustrated in FIG. 2 to automatically collect and stack empty pick receptacles 112 output from induction station(s) 130, outputting stacks of receptacles 112 that can then be placed onto pallets via manual or automated techniques.

Each unit of an item pulled from a pick receptacle 112 at induction station(s) 130 may be associated with the particular conveyance receptacle 142 that the unit is placed in at the induction station(s) 130. In at least some embodiments, the association of a unit of an item with a particular conveyance receptacle 142 may be performed by reading, scanning or otherwise entering an item identifier associated with the item and a conveyance receptacle identifier associated with the particular conveyance receptacle 142 into which the unit is placed. The item identifier and receptacle identifier may be communicated to a control system 190 of the materials handling facility via wired and/or wireless communications. Each conveyance receptacle 142 may include a unique conveyance receptacle identifier that uniquely identifies the particular conveyance receptacle 142 in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle 142.

In at least some embodiments, each unit of each item carried in inventory 110 may include an item identifier. A type of item held in inventory 110 may be referred to herein as simply an item. The term item identifier refers to a unique identifier associated with each particular type of item carried in inventory 110 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item.

Cases, boxes, bundles, or other collections of units of items may similarly be marked or tagged with item identifiers. The units of items in a collection may all be of the same type of item, for example a case of 12 units of a particular item, or may be a collection of one or more units of each of two or more heterogeneous items. A collection of units of item(s) (e.g., a case containing 12 units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, embodiments of the order fulfillment system as illustrated in FIG. 2, in addition to sorting individual units of items, may also sort collections of units of item(s) designated as units. Therefore, the conveyance receptacles 142 described herein may receive collections of units of item(s) that are designated as units as well as individual units of items.

Figure 30:
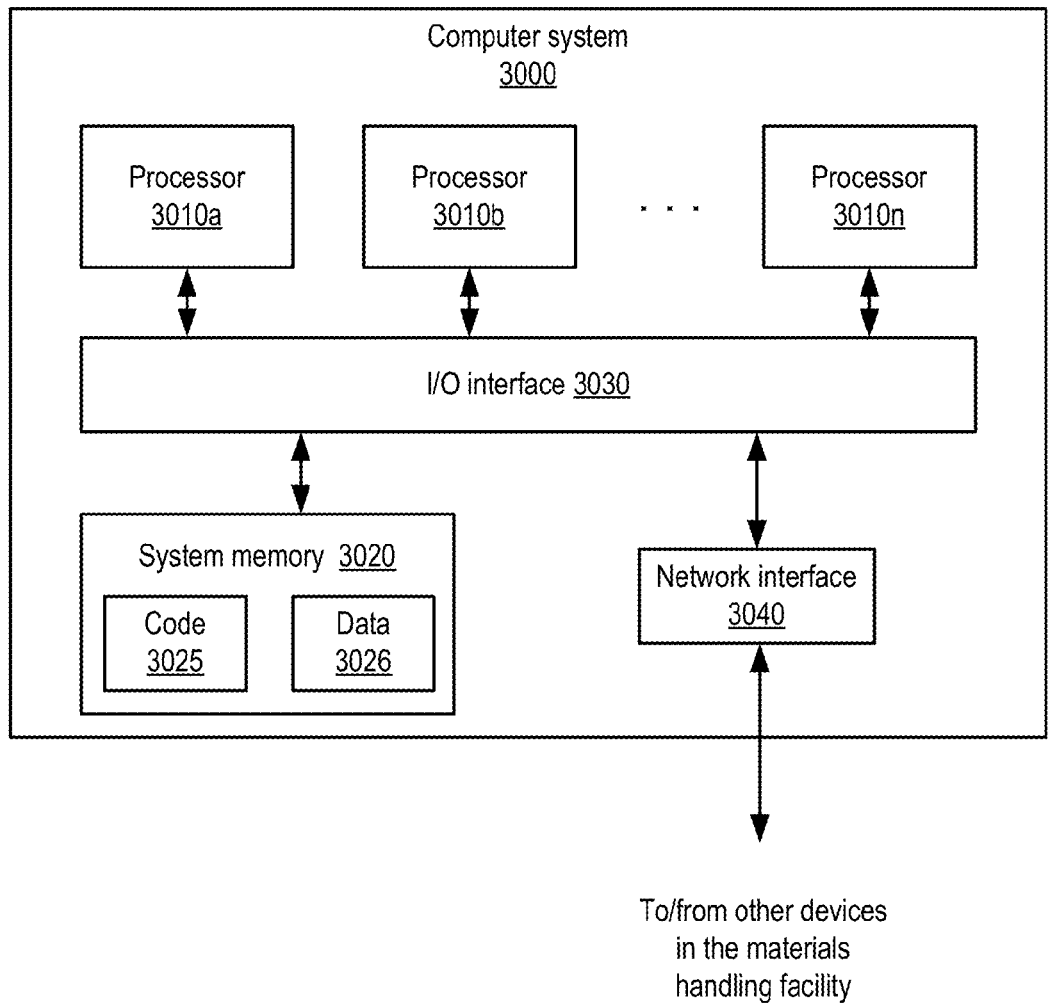
FIG. 30 is a block diagram illustrating an example computer system that may be used in some embodiments.

A materials handling facility may include a control system 190 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An example computer system that may be used as or in a control system 190 is illustrated in FIG. 30.

At the induction station(s) 130, a pulled unit of an item may be associated with a particular conveyance receptacle 142 by reading, scanning, etc. the item identifier associated with the item and the conveyance receptacle identifier associated with the conveyance receptacle 142 into the control system 190. This may be performed manually (e.g., by an operator using a hand-held scanner), via an automated scanning/reading process using fixed scanners/readers, or by a combination of manual and automatic scanning/reading. For example, an operator at an induction station 130 may use a hand-held scanner to scan a code off the unit of the item before or during placement of the unit into a "staged" conveyance receptacle 142, while an automated reader may read (or may have already read) the conveyance receptacle identifier from the conveyance receptacle 142 that is "staged" for the operator to place the unit of the item into.

Once a pulled unit of an item is associated with and placed into a particular conveyance receptacle 142, the conveyance receptacle 142 may be inducted into a conveyance mechanism 140 (e.g., a conveyor belt, roller system, or other conveyance mechanism) to be conveyed thereby to one or more downstream processing stations for further processing of the unit of the item. In various embodiments, the conveyance mechanism 140 may be a conveyance sorter mechanism that includes some method of diverting product off a conveyance path under control of a control system. Examples of conveyance sorter mechanisms that may be used as conveyance mechanism 140 may include, but are not limited to, shoe sorter mechanisms and pop up sorter mechanisms, such as pop up wheel sorter mechanisms. A pop up wheel sorter includes powered wheels that rise up out of the conveyor to divert product off the conveyor onto a different path or to a location. Other types of conveyance sorter mechanism may be used in various embodiments.

The conveyance receptacle 142 may already be on the conveyance mechanism 140 when the unit is associated with and placed into the receptacle 142 at induction station(s) 130. Alternatively, a conveyance receptacle 142 may be retrieved from a conveyance receptacle storage, stack, or other supply, the unit may be associated with and placed into the receptacle 142, and the receptacle 142 may then be inducted into or placed on the conveyance mechanism 140. In at least some implementations, the conveyance receptacles 142 are not fixed to the conveyance mechanism 140; instead, the receptacles 142 are removable bins, trays, totes, or similar devices. The conveyance mechanism 140 may be coupled to and controlled by the materials handling facility control system 190 via wired and/or wireless communications. The control system 190 may receive input from and send commands to the conveyance mechanism 140 to direct or control various operations of the conveyance mechanism 140.

The above describes embodiments of an induction station 130 in which one or more human operators at induction station(s) 130 perform at least a portion of the pulling of units of items from batches of picked items in pick receptacles 112, scanning/reading the items and receptacles 142 to associate single units of items to particular conveyance receptacles 142, and placing the units into the conveyance receptacles 142. In alternative embodiments, some or all of the activities described as being performed by human operators may be performed by automated or robotic mechanisms, which may be coupled to and under control of the materials handling facility control system 190.

Once the conveyance receptacles 142, each containing an individual unit of an item and each associated with the item it contains, are inducted into the conveyance mechanism 140, the receptacles 142 may be conveyed or routed to any of one or more processing stations, to one or more of various types of sorting mechanisms or processes, to other locations in the materials handling facility, and so on (e.g., to sorting station(s) 150 in FIG. 2). In at least some embodiments, the conveyance mechanism 140 may be directed by the control system 190 as to the routing of each particular conveyance receptacle 142 to a particular destination. Since each conveyance receptacle 142 is associated with the particular item it contains, the control system 190 may, by tracking the conveyance receptacle 142 via its unique conveyance receptacle identifier, route the particular item to an appropriate destination.

The control system 190 may also include or have access to information on the orders in the order processing stream: for example, which orders are in the process of being fulfilled (i.e., which orders have been assigned to pickers), which orders have been picked, what items in what quantities are included on each order, and so on. By associating particular items associated with particular conveyance receptacles via the conveyance receptacle identifiers with the orders being processed, the control system 190 may route conveyance receptacles 142 containing units of items for particular orders to appropriate destinations for the orders, or for portions of the orders (e.g., to a particular one of one or more sorting stations 150 where particular orders are collected and grouped to be passed on to packing stations, or to other types of stations such as gift wrapping stations where pre-packing processing may be performed on orders or portions of orders, or even on individual units of items). The routing of conveyance receptacles 142 and the particular items contained therein may be performed automatically (e.g., by directing the conveyance mechanism 140 to deliver the conveyance receptacle 142 to a particular destination) and/or by providing indications to human operators as to the routing or placement of conveyance receptacles 142 and/or the items contained therein. As an example of the former, a reader communicatively coupled to the control system 190 may automatically read the conveyance receptacle identifier from a receptacle 142 as it passes on the conveyance mechanism 140, and the control system 190 may then direct the conveyance mechanism 140 to route the receptacle on a particular one of two or more paths or branches of the conveyance mechanism 140, for example to a branch that conveys the receptacle to a particular processing station. As an example of the latter, once a receptacle 142 is routed to and arrives at a processing station such as a sorting station 150, the conveyance receptacle identifier may be manually or automatically scanned or read from the receptacle 142, and the control system 190 may then activate an indicator on a particular slot, bin, shelf, etc. that is the correct destination for the item contained in the receptacle 142. The indicator may be a light, an audio signal, or some other mechanism or combination of mechanisms capable of conveying audio, visual, and/or other information to a human operator. Alternatively, the indicator may be textual or graphical directions displayed on a monitor of a computer, handheld device, etc., or printed to paper output.

Once the unit of an item has been pulled from its associated conveyance receptacle 142 at whatever destination the receptacle is routed to (e.g., a sorting station 150), the item and receptacle 142 may be disassociated by the control system 190. The empty (and unassociated) conveyance receptacle 142 may then be re-inducted, if necessary, into the conveyance mechanism 140 to be returned, e.g. to induction station(s) 130 (there may be more than one set of induction station(s) 130; therefore, a receptacle 142 is not necessarily returned to the same induction station(s) 130 it came from). However, a conveyance receptacle 142 is not necessarily immediately re-inducted into the conveyance mechanism 140 when emptied. The conveyance receptacles 142 are not fixed or attached to the conveyance mechanism 140, and there is no necessary ordering of the receptacles 142 on the conveyance mechanism 140; therefore, an emptied conveyance receptacle 142 may be removed and set aside if necessary or desired.

In at least some implementations, once a conveyance receptacle 142 is emptied at a station (e.g., at a sorting station 150), the conveyance receptacle 142 may be conveyed to a conveyance receptacle collection area (not shown), for example by placing the empty conveyance receptacle 142 on a conveyance mechanism (e.g., a conveyor belt, roller system, or other conveyance mechanism) that exits the station area. In some embodiments, the conveyance mechanism that conveys empty conveyance receptacles 142 from the station may be the same as the conveyance mechanism 140 that conveys conveyance receptacles 142 including singulated units of items to the station. However, in some embodiments, a separate conveyance mechanism may be used to convey empty conveyance receptacles 142 from a station.

At the conveyance receptacle collection area, the empty conveyance receptacles 142 may be stacked. Conventionally, the conveyance receptacles 142 are manually stacked. Embodiments of the automated receptacle stacker as described herein may be integrated into the process to automatically collect and stack empty conveyance receptacles 142 output from one or more stations such as sorting station(s) 150. The automated receptacle stacker may output stacks of conveyance receptacles 142 that may, for example, be placed onto pallets via manual or automated techniques.

When an empty conveyance receptacle 142 arrives at an induction station 130 by a return path, for example via a return path of the conveyance mechanism 140, the conveyance receptacle 142 may be associated with and used to contain and convey a selected unit of an item from a mixed collection of items, or alternatively may be set aside into a conveyance receptacle storage area or stack if necessary or desired. Again, the conveyance receptacles 142 are not fixed to the conveyance mechanism 140, and are not ordered on the conveyance mechanism 140. The conveyance mechanism 140, in other words, is non-linear.

The above describes a non-linear, unit-level sortation system for sorting mixed and unsorted collections of units of items to various destinations according to requests or orders for which the items were picked. A picking process delivers batches or a continuous stream of unsorted items in pick receptacles 112 to one or more induction stations 130. At the induction stations 130, individual units of items are pulled from the pick receptacles 112, associated with particular conveyance receptacles 142, and placed into the receptacles 142, with one and only one unit per receptacle 142. The conveyance receptacles 142 are inducted into a conveyance mechanism 140 under the direction of a control system 190 that, through various mechanisms, directs the receptacles 142, each containing and associated with a single unit of an item, to particular destinations. One such destination, in at least some embodiments, is a sorting station 150, where the individual items may be manually or automatically retrieved from conveyance receptacles 142 and manually or automatically placed into slots or bins corresponding to particular orders. Empty conveyance receptacles 142 may be returned from the destinations to the one or more induction stations 130. Embodiments of the automated receptacle stacker as described herein may be integrated into the order fulfillment system as illustrated in FIG. 2 to collect empty pick receptacles output from the induction station(s), to collect conveyance receptacles output from the destination station(s), or to collect both pick and conveyance receptacles.

Example Receptacles

FIGS. 3A through 3C illustrate an example receptacle or tote according to at least some embodiments. A receptacle like or similar to this example receptacle may be used as a pick receptacle and/or as a conveyance receptacle in the example order fulfillment systems illustrated in FIGS. 1 and 2, or in other materials handling facility processes. FIG. 3A shows a perspective view of the receptacle, FIG. 3B shows a side view of the receptacle and indicates the outside length and depth (or height) dimensions, and FIG. 3C shows a top-down view of the receptacle and indicates the outside width dimension. The receptacle may be composed of a variety of materials or combinations thereof, including but not limited to a plastic, a composite, a metal or alloy, wire mesh, and so on. The receptacle may be of a variety of dimensions. For example, an example receptacle may be 24 inches long and 16 inches wide. Example depths for receptacles may be 8, 10, or 12 inches, although other depths may be used. In at least some embodiments, a lip or edge may extend partly or completely around the top edge of the receptacle, as shown in FIGS. 3A through 3C. In at least some embodiments, the receptacle may be nestable; that is, an empty receptacle may be placed within another empty receptacle, and two or more empty receptacles may be so nested to produce a stack of receptacles.

FIG. 3C indicates that the surfaces corresponding to the width of the receptacle are referred to as the ends of the receptacle, while the surfaces corresponding to the length of the receptacle are referred to as the sides of the receptacle. In at least some embodiments, the two ends of the receptacle may differ. For example, the receptacle may include protrusions at each end which are configured differently on the two ends, as shown in FIGS. 3A and 3C. However, note that in some embodiments the two ends of the receptacle may be substantially similar.

In some embodiments, at least some receptacles may be associated with a receptacle identifier that uniquely identifies the particular receptacle in the materials handling facility. The receptacle identifier may, for example, be a bar code, Radio Frequency Identifier (RFID) device, or some other scannable or readable mark, tag, or device attached to or integrated with the receptacle. A receptacle may have one, two, or more receptacle identifiers attached to or integrated with the receptacle. Receptacle identifiers may be permanently fixed to the receptacles or, alternatively, may be attachable/removable.

In some embodiments using receptacles in which the two ends are different as in the example receptacle shown in FIGS. 3A through 3C, the receptacle identifier(s) may be situated on the receptacle so as to allow sensors (e.g., optical sensors or RFID readers) to determine orientation of a receptacle, for example orientation on a conveyance mechanism such as a roller system or conveyor belt system. As an alternative to using a receptacle identifier to determine orientation, one or more marks or other indicators may be attached to or integrated with each receptacle that allow a sensor (e.g., an optical sensor) to determine orientation of receptacles. In some embodiments, a sensor may be configured to determine orientation of receptacles according to the physical characteristics of the receptacles, for example according to the different protrusions on the ends of the example receptacle illustrated in FIGS. 3A through 3C.

Note that a receptacle may differ on the sides, as well as or instead of differing on the ends as shown in FIGS. 3A through 3C.

Example Automated Receptacle Stacker Implementations

FIGS. 4 through 8 illustrate several example implementations for integrating embodiments of the automated receptacle stacker into a process in a materials handling facility. These examples are directed to integrating one or more receptacle stackers into an order fulfillment system as illustrated in FIG. 2 to receive empty pick receptacles 112 exiting from induction station(s) 130, automatically stack the empty receptacles 112, and output completed stacks of receptacles 112. However, similar implementations may be used in other parts of the order fulfillment process, for example to receive, automatically stack, and output completed stacks of conveyance receptacles 142 exiting from downstream processing station(s) such as sorting stations 150 as illustrated in FIG. 2. Moreover, other implementations than those shown in these examples may be used, and these or other implementations may be integrated into various materials handling systems or processes that use receptacles to automatically collect and stack empty receptacles.

Figure 4:
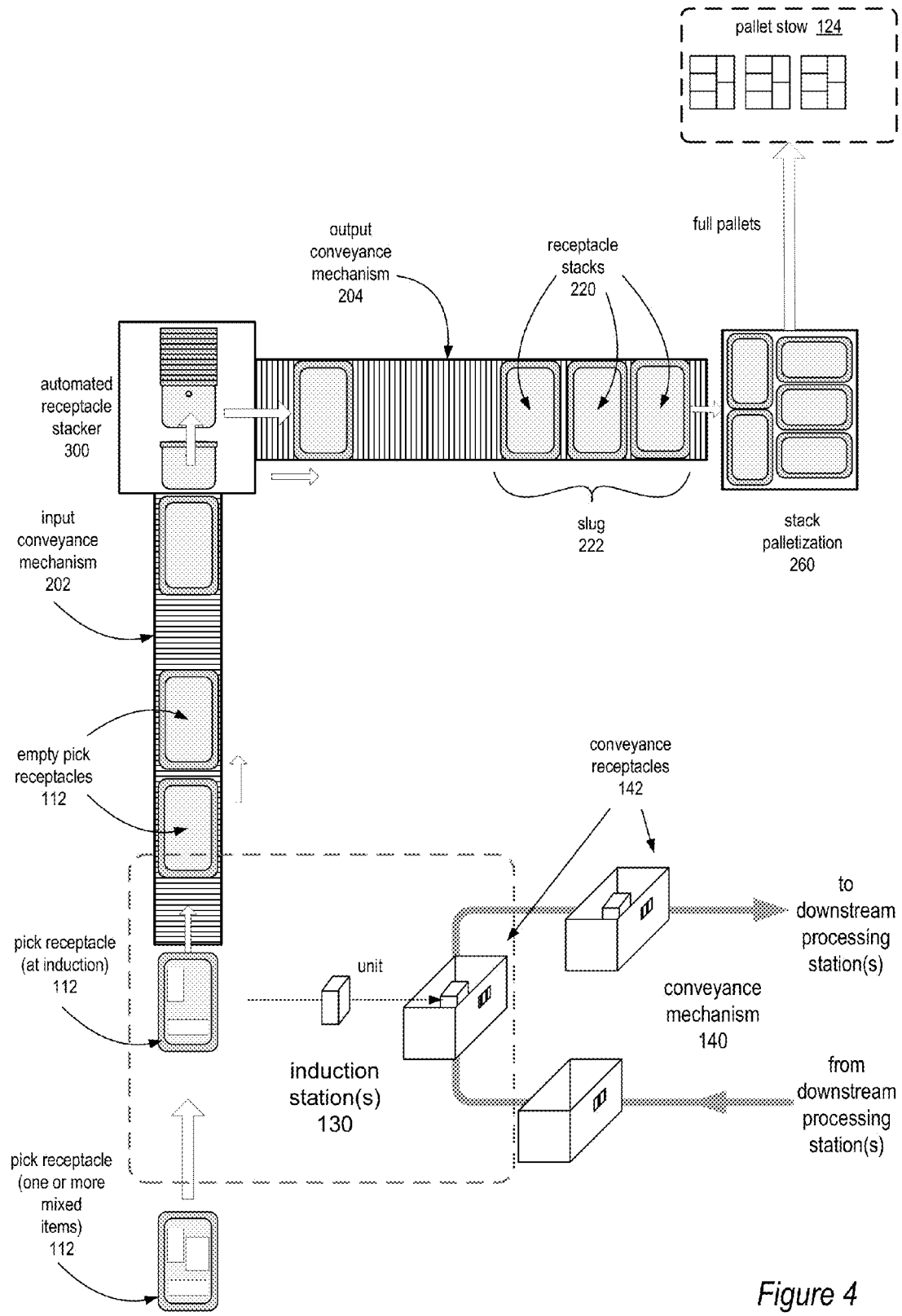
FIG. 4 illustrates an automated receptacle stacker implementation in which a conveyance mechanism carries empty receptacles from station(s) directly to a receptacle stacker, according to some embodiments.

FIG. 4 illustrates an automated receptacle stacker implementation in which a conveyance mechanism carries empty receptacles from station(s) directly to a receptacle stacker, according to some embodiments. This implementation may be used, for example, where the receptacles are the same on both ends and sides, and therefore orientation of the receptacles (e.g., which end goes to the input of the receptacle stacker) does not matter. This implementation may also be used where the ends of the receptacles are different as in the example receptacle shown in FIGS. 3A through 3C; however, the operators at the induction station(s) 130 would have to insure that the receptacles 112 are correctly oriented on the input conveyance mechanism 202.

FIG. 4 is used to describe general operations of an automated receptacle stacker 300 and a process for using the stacker 300 in a materials handling facility. In this description, components of the receptacle stacker 300 as well as components of the materials handling facility with which the stacker 300 is integrated are described. FIGS. 9 through 19 further illustrate and describe an example physical configuration for and the various components of an automated receptacle stacker 300 that may be used in the implementation shown in FIG. 4, according to at least some embodiments.

In FIG. 4, pick receptacles 112 containing one or more mixed items are received at induction station(s) 130. The pick receptacles 112 may be received at induction station(s) 130 via a conveyance mechanism (e.g., a conveyor belt, roller system, or other mechanism). At induction station(s) 130, individual units of items are removed from the pick receptacles 112 and inducted into conveyance receptacles 142, with one unit associated with and inducted into each conveyance receptacle 142. A pick receptacle 112 may pass by or be passed to two or more induction stations 130, with one or more units being removed from the receptacle 112 at each station 130. Conveyance receptacles 142 may be on, or may be placed on, a conveyance mechanism 140 (e.g., a conveyor belt, roller system, or other mechanism). Conveyance mechanism 140 may deliver the conveyance receptacles 142 each containing a singulated unit of an item to one or more downstream processing stations. In at least some embodiments, conveyance mechanism 140 may also deliver empty conveyance receptacles 142 to induction station(s) 130.

After a pick receptacle 112 is emptied at induction station(s) 130, the empty receptacle may be placed on an input conveyance mechanism 202 (e.g., a conveyor belt, roller system, or other conveyance mechanism). Input conveyance mechanism 202 may, for example, be a conveyor belt or roller system that passes through or by the induction station 130 area and that proceeds to an input portion of automated receptacle stacker 300. In some embodiments, input conveyance mechanism 202 may be a continuation of a conveyance mechanism that is used to bring pick receptacles 112 containing mixed batches of items picked from an inventory into the induction station 130 area. In other embodiments, input conveyance mechanism 202 may be a separate conveyance mechanism.

In at least some embodiments, input conveyance mechanism 202 may be configured to accommodate receptacles 112 oriented with the ends facing along the mechanism 202. To accomplish this, in at least some embodiments, the width of input conveyance mechanism 202 may be as wide or wider than the width of the receptacles 112, but not as wide as the length of the receptacles 112. In at least some embodiments, input conveyance mechanism 202 may include guides or edges that act to maintain the orientation of the pick receptacles 112 on the mechanism 202, as well as to prevent the receptacles 112 from falling off the mechanism 202. In some embodiments, input conveyance mechanism 202 may be a driven mechanism (e.g., a driven belt system or a roller system with at least some of the rollers being drive rollers) that automatically moves empty receptacles 112 towards the input portion of receptacle stacker 300. Alternatively, in some embodiments, input conveyance mechanism 202 may rely on gravity to move empty receptacles 112 towards the receptacle stacker 300, and thus may be arranged with a slight downward slope from the induction station(s) 130 to the stacker 300.

In at least some embodiments, when an empty receptacle 112 reaches receptacle stacker 300, the receptacle 112 may be stopped by a stop mechanism of the stacker 300. The stop mechanism may hold an incoming receptacle 112 until a lift component of the stacker 300 is clear. Once the lift component is clear, the stop mechanism may release the receptacle 112, and an input drive mechanism of the stacker 300 may propel the receptacle 112 into the lift component of the stacker 300. For example, stacker 300 may include a stacker input component that is configured to abut with or couple to the input conveyance mechanism 202. The stacker input component may, for example, include a roller conveyance mechanism. In at least some embodiments, one or more rollers of the roller mechanism may be drive rollers that operate to propel the receptacle 112 into the lift component. The stacker input component may include one or more guides that may serve to properly guide the receptacle 112 into the lift component of the stacker 300. Stacker 300 may include one or more sensors that detect when a receptacle is at the input component and/or in the lift component.

The lift component may include a platform or tray onto which the receptacle 112 is propelled. The platform may be a solid piece, two or more bars or tubes, or of some other configuration. The lift component may further include a lift mechanism that is attached to the platform and that operates to lift the platform holding the receptacle 112 upwards within the stacker 300. For example, the lift mechanism may be a pneumatic-driven (e.g., pneumatic cylinder) mechanism operable to lift the platform containing a receptacle 112. Other types of mechanisms may be used as the lift mechanism, for example hydraulic-driven mechanisms or electric motor-driven mechanisms.

Stacker 300 may further include a stacking component into which the receptacle 112 is lifted by the lift component. The stacking component may include a stack hopper mounted within the stacker into which receptacles 112 are lifted and pushed onto the bottom of a stack of receptacles 112 held within the stack hopper by two or more catch or clip mechanisms. Note that the stack hopper is initially empty when a first receptacle 112 is lifted into the stacking component by the lift component at the start of a new stack. The stacking component may further include two or more mechanical catch or clip mechanisms attached to or integrated with the stack hopper. In at least some embodiments, the catch mechanisms may be positioned on the sides of the stack hopper that correspond to the ends of the receptacle 112 (see FIGS. 3A through 3C). The catch mechanisms may, for example, be mechanical catch mechanisms such as spring-loaded bars or plates positioned so as to retract as the receptacle 112 is pushed upwards, and that automatically extend under the lip of the receptacle 112 being lifted once the lip of the receptacle 112 is past the top of the catch mechanisms to thus hold the receptacle 112 in place in the stack hopper of the stacking component. Alternatively, the catch mechanisms may be pneumatically powered pins or cylinders that are extended to hold the receptacle 112 in place and retracted when pushing a new receptacle onto the stack. Once the receptacle has been caught by the catch mechanisms, the lift component may lower the platform to prepare for receiving a next empty receptacle 112 from the input conveyance mechanism 202. Note that the distance from the bottom of the receptacle at the bottom of the stack in the stacking component to the platform of the lift component when fully lowered is sufficient to allow another receptacle 112 to fit under the stack in the stacking component.

As the lift component lifts the receptacle 112 upwards into the stack hopper of the stacking component, if there are already one or more receptacles in a stack held in the stack hopper, the receptacle on the platform may slide over the bottommost receptacle 112 in the stack until the top of the lip of the receptacle 112 being lifted contacts the bottommost receptacle 112 in the stack. The lift component continues to push the receptacle 112 upwards, resulting in the entire stack being lifted within the stack hopper.

In at least some embodiments, two or more additional (or secondary) mechanical catch mechanisms may be positioned on the sides of the stack hopper at some distance above the catch mechanisms that hold the bottommost receptacle 112 in a stack (the primary catch mechanisms). These secondary catch mechanisms may be operable to catch and hold a portion of the stack pushed above the secondary catch mechanisms.

The stacking component may be configured to hold a specific number of receptacles 112 in a stack and/or a specific height for the stack. For example, in some embodiments, the stacking component may be configured to hold a stack of 12 receptacles, or a stack of 15 receptacles. In at least some embodiments, the stacker 300 may include one or more sensors (e.g., optical sensors) or other mechanisms that track the number of receptacles 112 in a stack and/or that detect when the stack has reached a certain height within the stack hopper and is thus ready to be output from the stacker 300.

In at least some embodiments, the stacker 300 may include one or more sensors (e.g., optical sensors) or other mechanisms that may operate to detect problems with the stacker 300 (e.g., a jam, misstack, or misalignment of the receptacles 112 in the stacking component or lift component) and, in response to detecting a problem, raise an alarm so that an agent can clear the problem. The stacker 300 may include one or more doors and/or panels whereby an agent can access the receptacles 112 in the stacking component. The stacker 300 may also include one or more switches, buttons, or other controls whereby an agent can shut off and turn on the stacker 300, or initiate other stacker 300 actions (e.g., extend or retract the stack push assembly, raise or lower the lift platform, etc.) as necessary or desired. The alarm may be an audible signal such as a bell or beep or series thereof, a voice signal, a visual signal such as a light or lights, or a combination thereof. In some implementations, the agent(s) may carry hand-held devices to which a signal may be sent by the stacker 300 to alert the agent(s) that a problem has been detected.

Once the stacker 300 detects that a stack 220 is complete (e.g., that the correct number of receptacles 112 have been lifted into the stack, and/or that the stack is at or above a threshold height), the stacker 300 may push the stack 220 out of the stack hopper and onto an output conveyance mechanism 204. In at least some embodiments, stacker 300 may include a stack push component comprising a stack push assembly coupled to a stack push mechanism operable to push the full stack 220 of receptacles 112 out of the stack hopper onto an output component of the stacker 300. The stack push mechanism may, for example, be a pneumatic-driven (e.g., pneumatic cylinder) mechanism operable to pull the stack push assembly towards the output side of the stacker 300 to thus push the stack 220 out of the stack hopper onto a stacker output component. Other types of mechanisms may be used as the stack push mechanism, for example hydraulic-driven mechanisms or electric motor-driven mechanisms. In at least some embodiments, the stack hopper may include one or more gates on each side that are closed when a stack is being formed within the stack hopper to help hold the stack in place. In some embodiments, the gates may be mechanical gates that are pushed open by the stack during operation of the stack push component. Alternatively, the gates may be automatically opened, for example using a pneumatic or electric device, when the stack push component is activated to push the stack out of the stack hopper.

The stacker output component may be configured to abut with or couple to the output conveyance mechanism 204. The stacker output component may, for example, be a roller conveyance mechanism. In at least some embodiments, one or more rollers of the roller mechanism may be drive rollers that operate to propel the stacks 220 onto the output conveyance mechanism 204.

In at least some embodiments, stacker 300 may be configured to push the stacks 220 out the side of the stacker 300 onto the output conveyance mechanism 204, with the stacks 220 thus oriented with a side of the receptacles 112 facing down the output conveyance mechanism 204 towards a stack palletization 260 station. Output conveyance mechanism 204 may be configured to accommodate stacks of receptacles 112 oriented with the sides facing along the mechanism 204. The width of output conveyance mechanism 204 may be, but is not necessarily, as wide or wider than the length of the receptacles 112. In at least some embodiments, output conveyance mechanism 204 may include guides or edges that act to maintain the orientation of the stacks 220 on the mechanism 204. In some embodiments, output conveyance mechanism 204 may rely on gravity to move stacks 220 towards the stack palletization 260 station, and thus may be arranged with a slight downward slope for at least part of the distance from the stacker 300 to the stack palletization 260 station. Alternatively, in some embodiments, output conveyance mechanism 204 may be a driven mechanism (e.g., a driven belt system or a roller system with at least some of the rollers being drive rollers).

While FIG. 4 as well as FIGS. 5 through 19 show the stacks 220 as being output through the right side of the stacker 300 as viewed from above in FIG. 4, note that embodiments of the stacker 300 may be configured to output the stacks 220 through either side of the stacker 300 as viewed from above in FIG. 4. In addition, as an alternative to outputting stacks 220 through one of the two sides, an embodiment of the stacker 300 may be configured to output the stacks 220 through the end opposite the input end of the stacker 300 as shown in FIG. 4. In this configuration, note that the stacks 220 may be oriented with an end of the receptacles 112 in the stack 220 pointing down the output conveyance mechanism 204, rather than the side of the receptacles 112 in the stack 220 pointing down the output conveyance mechanism 204 as shown in FIG. 4.

The stacker 300 may thus receive incoming empty receptacles 112 via input conveyance mechanism 202, add the empty receptacles 112 to a current stack in the hopper, detect when the stack is complete, and output the stack 220 onto output conveyance mechanism 204. Output conveyance mechanism 204 may convey the stack 220 towards stack palletization 260 station, and the stacker 300 may begin another stack. When that stack is complete, the stack 220 is also output onto output conveyance mechanism 204. This process may continue to automatically build and output stacks 220 of empty receptacles 112. Thus, two or more stacks 220 may collect at the stack palletization 260 end of output conveyance mechanism 204. A collection of two or more stacks 220 on output conveyance mechanism 204 may be referred to as a slug 222.

In at least some implementations, stack palletization 260 may be manually performed by one or more agents that remove stacks from output conveyance mechanism 204 and arrange the stacks on a pallet. Once a pallet is full, the pallet may be moved to a pallet stow 124 area, for example using a pallet jack or fork lift. In an example implementation as shown in FIG. 4, a pallet may hold five stacks 220. However, in other implementations, a pallet may hold more or fewer stacks 220. Note that, in some implementations or situations, stacks may be removed from output conveyance mechanism 204 and otherwise disposed. For example, stacks 220 may be removed from mechanism 204 and placed somewhere on the floor in the stack palletization 260 area if a pallet is not presently available. As another example, a stack 220 may be transported with a dolly or similar device from palletization 260 station to elsewhere in the materials handling facility if necessary or desired.

In some implementations, as shown in FIG. 4, stacks 220 may be removed from the output conveyance mechanism 204 and placed directly on a pallet. In other implementations, there may be a platform or table at the end of output conveyance mechanism 204 onto which one or more stacks may be deposited; the stacks 220 may then be moved directly from the platform/table onto pallets without requiring the agent to lift the stack. For example, a roller ball platform may be positioned at the end of output conveyance mechanism 204 onto which stacks 220 are deposited, and from which stacks 220 can be easily moved onto pallets.

Palletizing the stacks 220 at the stack palletization 260 station may typically not take much time. Therefore, in at least some implementations or at some times, an agent assigned to stack palletization 260 duty may be assigned other duties in the materials handling facility as well, and thus may at times be away from the palletization 260 station. In at least some embodiments, a mechanism or mechanisms, which may be integrated with, attached to, or proximate to stacker 300 and/or output conveyance mechanism 204, may detect when at least a threshold number of stacks 220 are on the output conveyance mechanism 204 and alert the agent(s) so that the agent(s) can return to stack palletization 260 and palletize the waiting stacks 220. For example, in some embodiments, the stacker 300 may count stack cycles (i.e., stacks that are pushed onto output conveyance mechanism 204), and generate an alert every Nth cycle (for example, every fifth stack). As another example, an optical or other sensor on or adjacent to output conveyance mechanism 204 may detect when N stacks 220 (e.g., five stacks) are on the mechanisms 204 and thus need to be cleared from mechanism 204. As another example, a simple timer may be used to periodically raise an alert, for example every 20 minutes. The alert may be an audible signal such as a bell or beep or series thereof, a voice signal, a visual signal such as a light or lights, or a combination thereof. In some implementations, the agent(s) may carry handheld devices to which a signal may be sent via a wireless connection to alert the agent(s) that stacks are ready to be palletized.

While the stack palletization 260 task is described above as being performed manually by one or more agents, in some implementations stack palletization 260 may be at least partially automated.

In at least some materials handling facility processes, receptacles may be used that will only stack when correctly oriented. For example, the ends of the receptacles may be different as in the example receptacle shown in FIGS. 3A through 3C, and thus two receptacles will only nest properly if both are oriented the same way. As previously mentioned, the implementation shown in FIG. 4 in which the input conveyance mechanism 202 carries empty receptacles 112 from station(s) directly to a receptacle stacker 300 may be used for receptacles 112 that must be correctly oriented to stack correctly, for example receptacles 112 as shown in FIGS. 3A through 3C. However, this would require agents to correctly orient the receptacles 112 on the input conveyance mechanism 202.

Relying on human agents to correctly orient every receptacle 112 may not be practical, and may result in misfeeds/misstacks/jams at the receptacle stacker 300.

Figure 5:
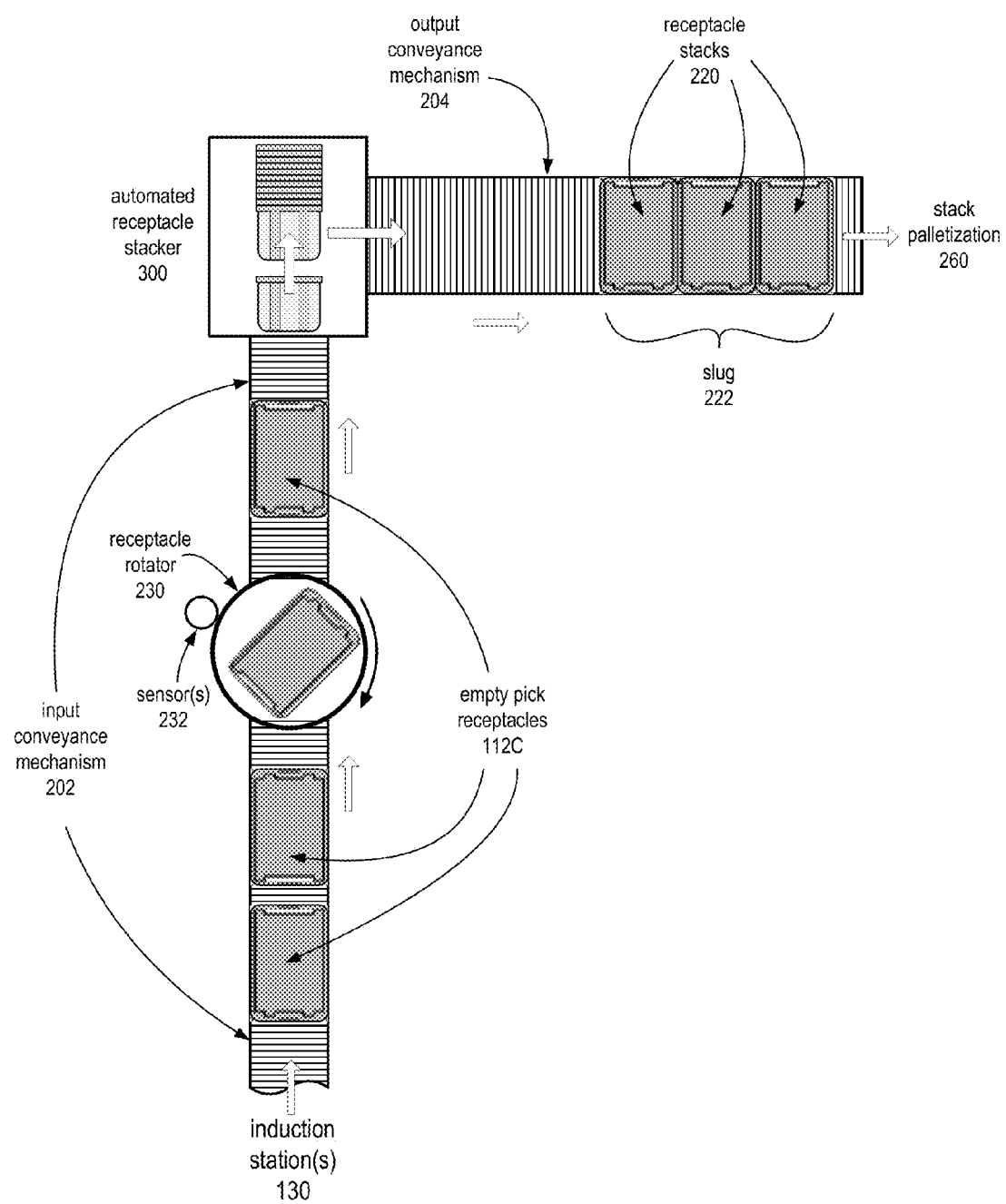
FIG. 5 illustrates an automated receptacle stacker implementation that includes a rotator mechanism on the input conveyance mechanism to correctly orient receptacles before input to the receptacle stacker, according to some embodiments.
Figure 6:
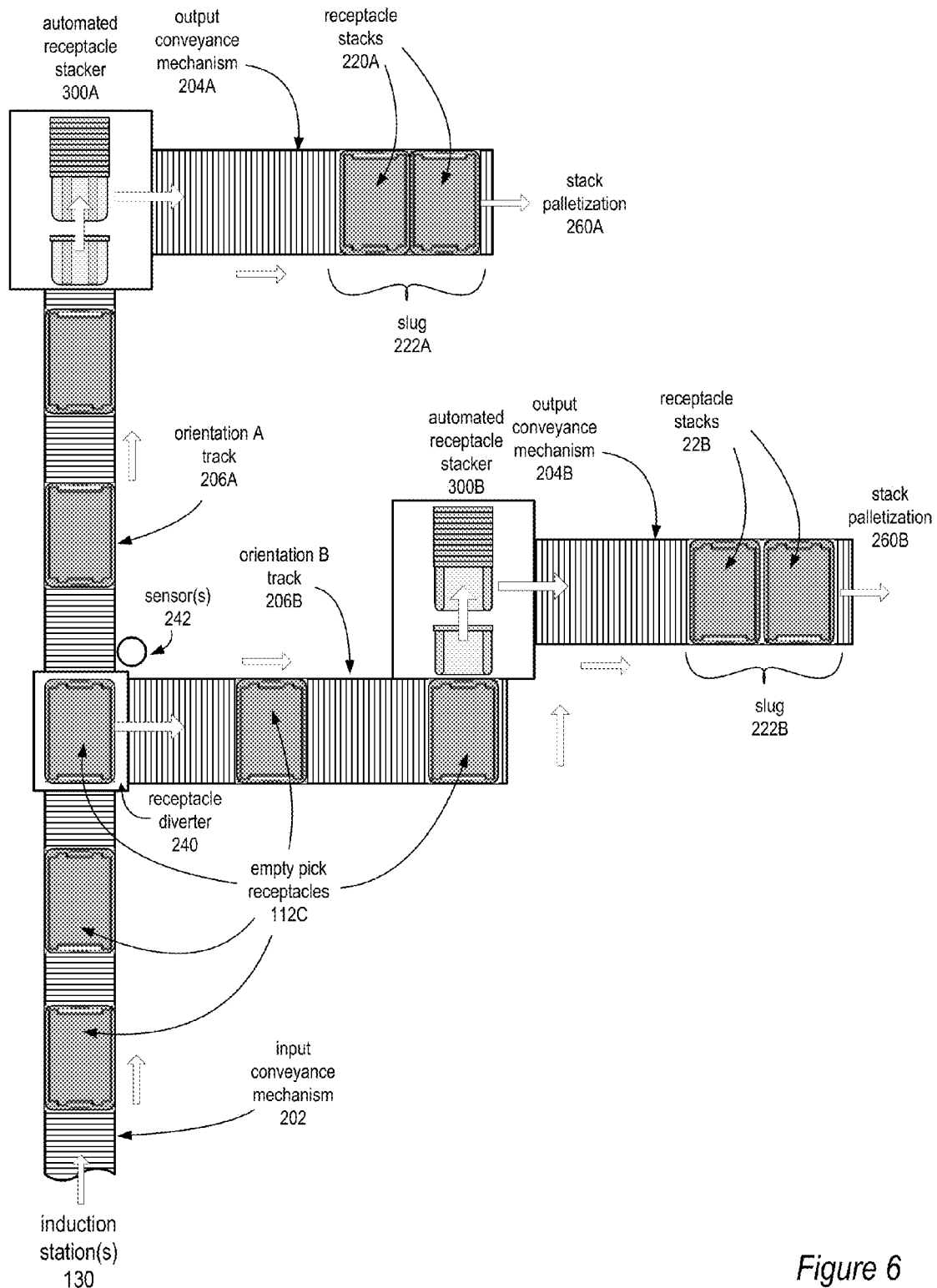
FIG. 6 illustrates an automated receptacle stacker implementation that includes two receptacle stackers and a receptacle diverter mechanism on the input conveyance mechanism, according to some embodiments.
Figure 7:
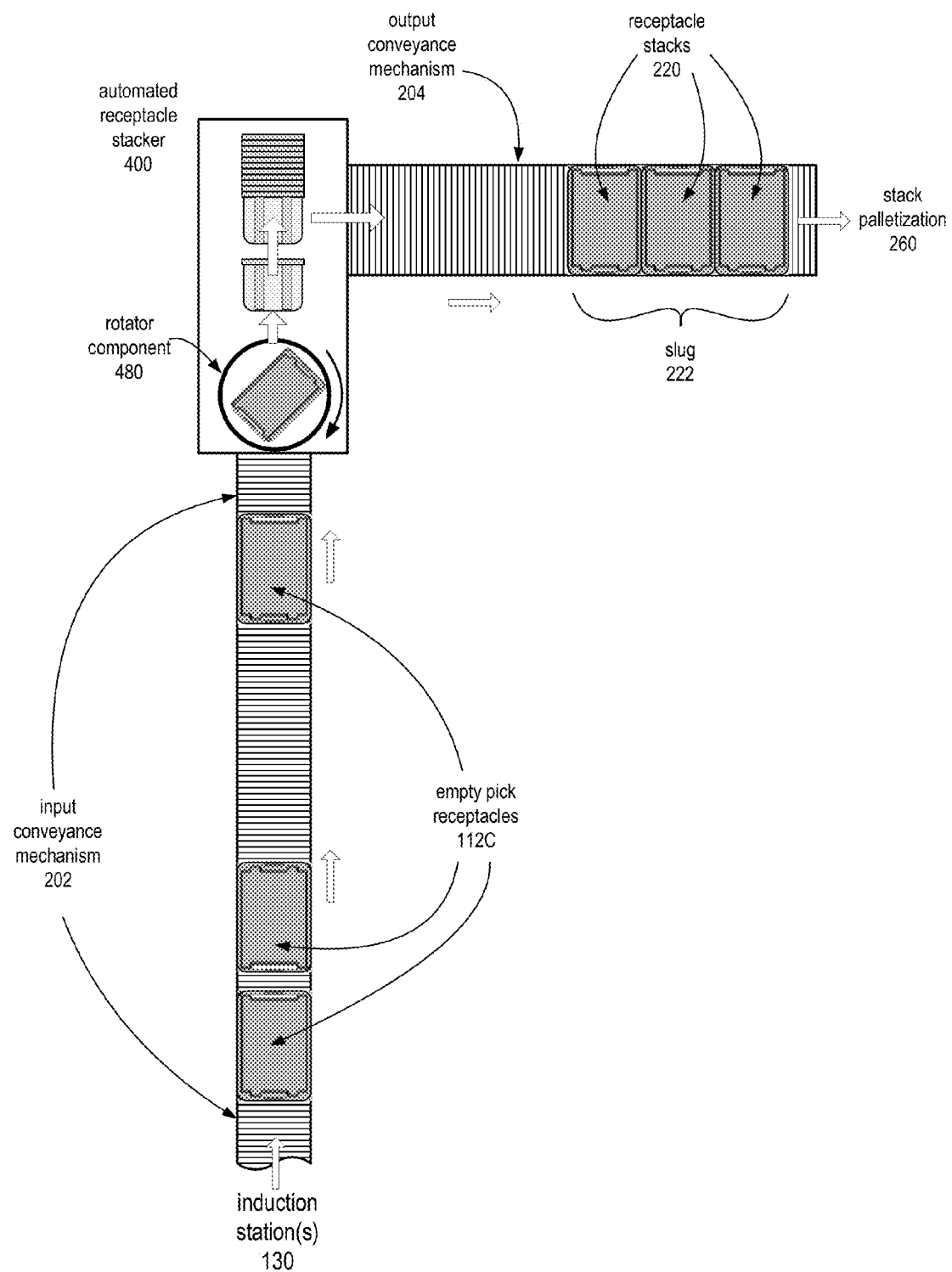
FIG. 7 illustrates an example implementation that includes a receptacle stacker 400 with an integrated rotator component that detects and rotates incorrectly oriented receptacles input to the receptacle stacker to insure that the receptacles are correctly oriented before stacking the receptacles, according to some embodiments.

FIGS. 5 and 6 illustrate example implementations that automatically handle randomly oriented receptacles 112 on the input conveyance mechanism 202 to insure that the receptacles 112 are correctly oriented before inputting the receptacles 112 to the stacker(s) 300. These implementations may use receptacle stacker(s) 300 as illustrated in FIGS. 9 through 19. However, in some implementations, receptacle stackers(s) 400 as illustrated in FIGS. 20 through 27 may be used that include a receptacle rotator component 480 in the receptacle stacker 400 itself. FIG. 7 illustrates an example implementation that includes a receptacle stacker 400 with an integrated rotator component 480 that detects and rotates incorrectly oriented receptacles 112 input to the receptacle stacker 400 to insure that the receptacles 112 are correctly oriented before stacking the receptacles 112.

FIG. 5 illustrates an automated receptacle stacker implementation that includes a rotator mechanism on the input conveyance mechanism to correctly orient receptacles before input to the receptacle stacker, according to some embodiments. Note that the general operation of the receptacle stacker 300 implementation shown in FIG. 5 may be the same as or similar to the general operation of the implementation shown in FIG. 4. However, a receptacle rotator 230 mechanism may be located on the input conveyance mechanism 202 to correctly orient the receptacles 112. As an empty receptacle 112 approaches or enters the rotator 230, one or more sensors 232 positioned on, above, or adjacent to the input conveyance mechanism 202 or rotator mechanism 230 may detect the orientation of the receptacle 112. For example, the sensor(s) 232 may be optical sensors that detect mark(s) or physical characteristics of the receptacle 112 to determine the orientation. As another example, the sensor(s) 232 may be RFID readers that read RFID tag(s) on the receptacle 112 to determine the orientation. If a receptacle 112 is detected to be in the correct orientation, then the receptacle 112 may be allowed to pass over the rotator 230 without action. However, if the receptacle 112 is detected to be in the incorrect (opposite) orientation, then the rotator 230 may be activated to rotate the receptacle 180 degrees so that it is correctly oriented for the receptacle stacker 300.

The stacker 300 may thus receive correctly oriented empty receptacles 112 via input conveyance mechanism 202, add the empty receptacles 112 to a stack, detect when the stack is complete, and output the stack onto output conveyance mechanism 204. Output conveyance mechanism 204 may convey the stack towards stack palletization 260 station, and the stacker 300 may begin another stack.

FIG. 6 illustrates an automated receptacle stacker implementation that includes two receptacle stackers and a receptacle diverter mechanism, according to some embodiments. Note that the general operation of the receptacle stacker 300 implementation shown in FIG. 5 may be the same as or similar to the general operation of the implementation shown in FIG. 4. However, this implementation may include a first receptacle stacker 300A, a second receptacle stacker 300B, and a receptacle diverter 240 mechanism that diverts receptacles 112 oriented a particular way to the second receptacle stacker 300B while allowing receptacles oriented in the opposite direction to pass through to the first receptacle stacker 300A. As an empty receptacle 112 approaches or enters the receptacle diverter 240 on input conveyance mechanism 202, one or more sensors 242 positioned on, above, or adjacent to the input conveyance mechanism 202 or receptacle diverter 240 may detect the orientation of the receptacle 112. For example, the sensor(s) may be optical sensors that detect mark(s) or physical characteristics of the receptacle 112 to determine the orientation. As another example, the sensor(s) may be RFID readers that read RFID tag(s) on the receptacle 112 to determine the orientation. If a receptacle 112 is detected to be in the correct orientation for stacker 300A (referred to as orientation A), then the receptacle 112 may be allowed to pass over the receptacle diverter 240 onto orientation A track 206A. However, if the receptacle 112 is detected to be in the incorrect orientation for stacker 300A (orientation B, which is the correct orientation for stacker 300B), then the receptacle diverter 240 may be activated to divert the receptacle 112 onto orientation B track 206B. In some embodiments, to divert a receptacle onto orientation B track, an arm or gate component of diverter 240 may be lowered in front of the receptacle and a push or drive mechanism of diverter 240 may propel the receptacle 112 off the diverter 240 onto orientation B track 206B.

Orientation A track 206A may be a continuation of input conveyance mechanism 202 that conveys receptacles in orientation A to receptacle stacker 300A. However, in at least some embodiments, the receptacles 112 diverted onto orientation B track 206B are positioned sideways. Thus, orientation B track 206B may be a conveyance mechanism configured to convey receptacles 112 positioned sideways, similar to the output conveyance mechanism 204. However, at receptacle stacker 300B, the diverted receptacles 112 are inducted into the stacker 300B end first by the input drive mechanism. Note that, other than the orientation of the respective input tracks, receptacle stacker 300A and 300B may be substantially the same in configuration and operation.

Thus, in this implementation, the stacker 300A receives incoming empty receptacles 112 via orientation A track 206A, adds the empty receptacles 112 to a stack, detects when the stack is complete, and outputs the stack onto output conveyance mechanism 204A. Output conveyance mechanism 204A may convey the stack(s) towards stack palletization 260A station, and the stacker 300A may begin another stack. The stacker 300B receives incoming empty receptacles 112 that were diverted by diverter 240 onto orientation B track 206B, adds the empty receptacles 112 to a stack, detects when the stack is complete, and outputs the stack onto output conveyance mechanism 204B. Output conveyance mechanism 204B may convey the stack(s) towards stack palletization 260B station, and the stacker 300B may begin another stack.

Some materials handling facilities may use two or more different types of receptacles in a process. For example, a facility may use two or more types of receptacles that are of similar width and length, but different heights. As another example, a facility may use two or more types of receptacles that differ in length and/or width. Another example would be a facility that uses receptacles that are the same except for color, e.g. green receptacles and yellow receptacles, with the different colors used in different areas or processes. An automated receptacle stacker implementation that includes two or more receptacle stackers 300 and one or more receptacle diverter mechanisms as illustrated in FIG. 6 may be adapted to detect different types of receptacles and direct or divert the receptacles of different types (e.g., different sizes or colors) to different receptacle stackers. In some implementations, additional receptacle diverter mechanisms may be included downstream from the receptacle stacker(s) that sort receptacles by type onto different conveyance tracks to sort receptacles according to their orientation to different receptacle stackers. Alternatively, a receptacle diverter mechanism that sorts receptacles according to their orientation may be upstream from receptacle diverter mechanisms that sort receptacles according to type. As another alternative, one or more receptacle rotators 230 as shown in FIG. 5 may be upstream or downstream of a receptacle diverter mechanism. In some implementations, receptacle stackers 400 with integrated rotator components may be used with one or more receptacle diverter mechanisms as illustrated in FIG. 6 that are adapted to detect types of receptacles and direct or divert receptacles of different types (e.g., sizes or colors) to different receptacle stackers 400.

FIG. 7 illustrates an example implementation that includes a receptacle stacker 400 with an integrated rotator component that detects and rotates incorrectly oriented receptacles input to the receptacle stacker to insure that the receptacles are correctly oriented before stacking the receptacles, according to some embodiments. This implementation may be used, for example, where the ends of the receptacles are different as in the example receptacle shown in FIGS. 3A through 3C. General operations of the automated receptacle stacker 400 and the process for using the stacker 400 in a materials handling facility may be similar to the example implementation described in reference to FIG. 4; however, using receptacle stacker 400 removes the reliance on the operators at the induction station(s) 130 to correctly orient the receptacles on the input conveyance mechanism 202. FIGS. 20 through 27 further illustrate and describe an example physical configuration for and the various components of an automated receptacle stacker 400 that may be used in the implementation shown in FIG. 7, according to at least some embodiments.

As described in reference to FIG. 4, after a pick receptacle 112 is emptied at induction station(s) 130, the empty receptacle may be placed on an input conveyance mechanism 202 (e.g., a conveyor belt, roller system, or other conveyance mechanism).

In at least some embodiments, when an empty receptacle 112 reaches receptacle stacker 400, the receptacle 112 may be stopped by a stop mechanism of the stacker 400. The stop mechanism may hold an incoming receptacle 112 at the input component until a rotator component 480 of the stacker 400 is clear. Once the rotator component 480 is clear, the stop mechanism may release the receptacle 112, and an input component of the stacker 400 may propel the receptacle 112 into the rotator component 480. For example, stacker 400 may include a stacker input component that is configured to abut with or couple to the input conveyance mechanism 202. The stacker input component may, for example, include a roller conveyance mechanism. In at least some embodiments, one or more rollers of the roller mechanism may be drive rollers that operate to propel the receptacle 112 into the rotator component 480. The stacker input component may include one or more guides that may serve to properly guide the receptacle 112 into the rotator component 480 of the stacker 400.

Stacker 400 may also include one or more sensors that may detect the orientation of the receptacle prior to, during, or after input to the rotator component 480. If stacker 400 detects that the receptacle 112 in the rotator component 480 is in the wrong orientation, the stacker 400 may direct the rotator component 480 to rotate the receptacle 112 to the proper orientation. Otherwise, the receptacle 112 is allowed to pass through the rotator component 480 without being rotated. In at least some embodiments, to rotate a receptacle 112, the rotator component 480 may include a plate mechanism that is activated to lift the receptacle off the track component and towards a rotator mechanism. The rotator mechanism may then be activated to rotate the receptacle 112 on the plate mechanism. The rotator mechanism may, for example, include a rotator attachment configured to fit inside the top of the receptacle 112 when lifted by the plate mechanism and a rotator motor configured to rotate the rotator attachment to thus rotate the receptacle 112 on the plate mechanism. An example rotator component 480 of a stacker 400 is shown in FIGS. 20 through 23.

In at least some embodiments the stacker 400 may include a track component that extends from the roller component 480 into the lift component that may be activated to convey a receptacle 112 from the rotator component 480 into the lift component. The stacker input component may propel the receptacle 112 onto the track component within the rotator component 480. The track component may, for example, include a parallel pair of motor-driven belts (see, e.g., FIGS. 23 and 24). The rotator component 480 may include another stop mechanism that may hold the properly oriented receptacle 112 in the rotator component 480 until a lift component of the stacker 400 is clear. Once the lift component is clear, the stop mechanism may release the receptacle 112, and the track component of the stacker 400 may propel the receptacle 112 from the rotator component 480 into the lift component of the stacker 400.

Stacker 400 may include one or more sensors that detect if and when a receptacle is at the input component, in the rotator component 480, and/or in the lift component.

Stacker 400 may include a lift component, a stacking component, a stack push component, and an output component that operate substantially similar to the components as described in reference to the example receptacle stacker 300 in FIG. 4 to add the empty receptacles 112 to a current stack in a stack hopper, detect when the stack is complete within the hopper, and output the stack 220 onto an output conveyance mechanism 204. The output conveyance mechanism 204 may convey the stack 220 towards stack palletization 260 station, and the stacker 400 may begin another stack. When that stack is complete, the stack 220 is also output onto output conveyance mechanism 204. This process may continue to automatically build and output a slug 222 of stacks 220 at the station 260, where one or more agents may periodically or aperiodically place the stacks 220 on pallets, as previously described.

Figure 8:
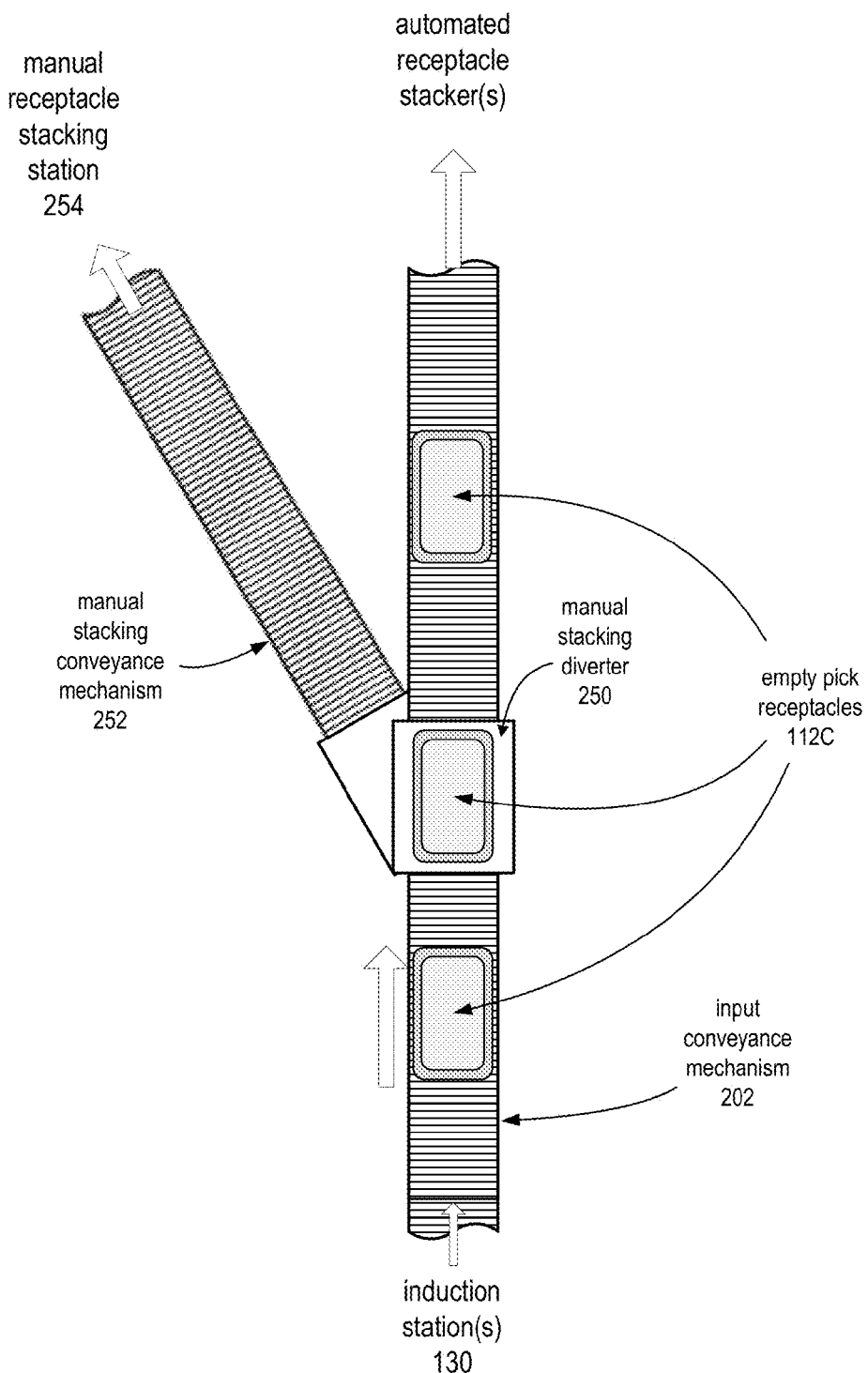
FIG. 8 illustrates an automated receptacle stacker implementation that includes a mechanism for diverting at least some receptacles to a manual stacking station, according to some embodiments.

An automated receptacle stacker may occasionally be shut down, for example for maintenance or repair. In addition, at peak or busy periods in the materials handling facility, the flow of empty receptacles 112 from the downstream station(s) to the receptacle stacker(s) may occasionally exceed capacity of the stacker(s). FIG. 8 illustrates an automated receptacle stacker implementation that includes a mechanism for diverting at least some receptacles 112 to a manual stacking station, for example when the receptacle stacker(s) are not operating or during peak periods. During normal operations, empty receptacles 112 on input conveyance mechanism 202 may pass over manual stacking diverter 250 and proceed to the receptacle stacker(s). If the receptacle stacker(s) are shut down, manual stacking diverter 250 may be activated to divert the receptacles 112 off input conveyance mechanism 202 onto manual stacking conveyance mechanism 252, which conveys the receptacles to a manual receptacle stacking station 254, where the empty receptacles 112 may be manually stacked and palletized. For example, to activate diverter 250, a gate or bar may be lowered or otherwise put in place to divert the receptacles 112 off input conveyance mechanism 202 onto manual stacking conveyance mechanism 252.

In some embodiments, manual stacking diverter 250 may be configured to divert only a portion receptacles 112 to the manual receptacle stacking station 254. For example, during peak times, the manual stacking diverter 250 may be configured to automatically divert every other receptacle, or every third receptacle, or some other portion of the receptacles to the manual receptacle stacking station 254. Alternatively, the system may be configured to automatically detect when the number of receptacles on input conveyance mechanism 202 nears or reaches some load threshold, and divert at least some receptacles to the manual receptacle stacking station 254 until the load diminishes sufficiently.

While FIG. 8 describes receptacles as being diverted to a manual stacking station 254, a diverter 250 as illustrated in FIG. 8 may be used to divert receptacles 112 to other destinations. For example, the diverter 250 may be used to divert at least some receptacles 112 to a backup or secondary automated receptacle stacker, or onto a conveyance mechanism that carries the receptacles directly to one or more other types of stations in the facility such as induction stations(s) 130. Note that the manual stacking diverter 250 as illustrated in FIG. 8 may be integrated with any of the example implementations illustrated in FIGS. 4 through 7, or with other implementations, to divert receptacles off the input conveyance mechanism to a manual stacking station or to some other destination.

From the above example implementations, it is clear that the various components described in relation to the implementations (automated receptacle stackers 300 and 400, input and output conveyance mechanisms and tracks, receptacle rotators 230, and diverters 240 and 250) may be combined in a variety of ways to create custom implementations according to the needs of the particular materials handling process and particular materials handling facility. Moreover, these implementations may be configured to be adaptable to changes in receptacle throughput, for example peak periods when many receptacles are being processed through the system, and to changes in receptacles, for example the addition of different types of receptacles.

Example Automated Receptacle Stacker Configurations and Operations

FIGS. 9 through 19 illustrate an example physical configuration for and components of an automated receptacle stacker 300, according to at least some embodiments. FIGS. 20 through 27 illustrate an example physical configuration for and components of an automated receptacle stacker 400 that includes a receptacle rotator component for correctly orienting receptacles before stacking, according to at least some embodiments. Note that these example physical configurations are not intended to be limiting. Other embodiments are possible in which the described components are otherwise arranged or configured, and other components than those described may be included in some embodiments.

Figure 9:
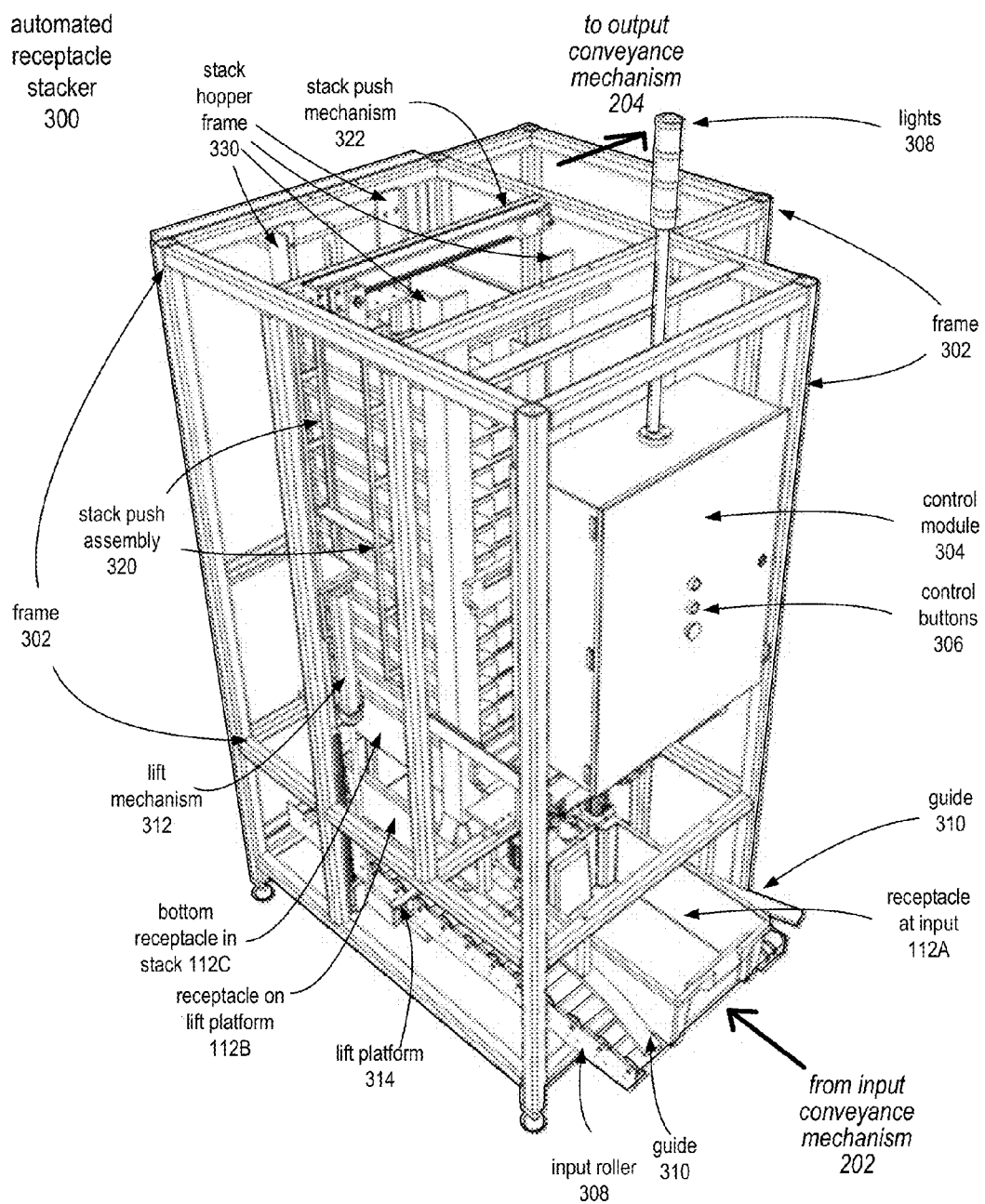
FIG. 9 is a perspective view of an example automated receptacle stacker, according to at least some embodiments.

FIG. 9 is a perspective view of an example automated receptacle stacker 300, according to at least some embodiments. This perspective view shows the top, input side, and side opposite the output side of the stacker 300. Various components of the stacker 300 may be mounted to or otherwise contained in a frame 302 assembly. The frame 302 assembly may be composed of several vertical, horizontal, or otherwise oriented outer members (e.g., bars, rails, tubes, plates, etc.) that are coupled together (e.g., by welds, bolts, screws, or other coupling methods) to form the frame 302 that contains the various stacker 300 components and mechanisms. While not shown, at least some of the spaces in the outer surfaces of the frame 302 may be covered with plates, panels, or doors during normal operations.

A control module 304 is shown attached to the input side of the frame 302. Note that the control module 304 may alternatively be located elsewhere, for example on one of the other sides of the frame 302. The control module 304 may contain one or more control components for directing and controlling operations of the stacker 300 as described herein. For example, the control components may include computing devices, circuit boards, or other electronic devices that are configured to receive signals from one or more sensors or other components of the stacker 300 via wired or wireless communications, and to direct or control operations of various components of the stacker 300 such as lift mechanism 312 and stack push mechanism 322 via wired or wireless communications. An example computer system that may be used as a control component of stacker 300 is illustrated in FIG. 30.

The control module 304 may also contain communications components that are configured to communicate via wired or wireless communications with a control system of the materials handling facility, for example control system 190 as illustrated in FIG. 2, or with other devices in the materials handling facility such as hand-held devices carried by agents in the materials handling facility.

The control module 304 may include a door or panel via which an operator or service personnel can access the internal components. One or more buttons 306 or other controls may be positioned on the outside of the control module 304, for example on the door or panel as shown in FIG. 9. The buttons 306 may include, but are not limited to, an off button that shuts down the stacker 300 operations and an on button that starts the stacker 300 operations.

In at least some embodiments, the control module 304 may include one or more lights 308 that may be used to visually signal stacker 300 events, status, or conditions to agents in the materials handling facility. In FIG. 9, the lights 308 are shown mounted on a conduit or rod that extends above the control module 304 and frame 302. For example, lights 308 may include a green light to visually indicate that the stacker 300 is in operation, an amber light to visually indicate that the stacker 300 has detected a problem (e.g., a misstack or jam), and a red light to visually indicate that the stacker 300 is shut down. Lights 308 may be used to indicate other conditions to the agents, for example that a slug of stacks is ready for palletization on output conveyance mechanism 204.

Stacker 300 may include an input component that includes at least an input roller 308, guides 310, one or more input sensors, and a stop mechanism 340. The input component may abut with or couple to the input conveyance mechanism 202. In at least some embodiments, the input roller 308 may include one or more drive rollers that operate to propel the receptacle into the lift component of the stacker 300. The stop mechanism 340 may, for example, include one or more pins, pistons, or plates that can be extended (e.g., dropped or raised) to hold an incoming receptacle and retracted to release the receptacle. The input sensors may detect an incoming receptacle from input conveyance mechanism 202. The stop mechanism 340 may hold the receptacle until the lift component of the stacker 300 is clear. Once clear, the control module 304 may direct the stop mechanism 340 to release the receptacle and direct the drive rollers of the input roller 308 to propel the receptacle into the lift component. The guides 310 may serve to properly guide the receptacle into the lift component. FIG. 9 shows a receptacle positioned in the input component being held by the stop mechanism 340 (receptacle at input 112A) and also shows a receptacle in the lift component (receptacle on lift platform 112B).

Stacker 300 may further include a lift component that includes at least a lift platform 314 and a lift mechanism 312 coupled to the lift platform 314. FIG. 9 shows a receptacle in the lift component on the lift platform 314 (receptacle on lift platform 112B). The lift platform 314 may be a solid piece, two or more bars or tubes, or of some other configuration. The lift mechanism 312 operates to lift the platform 314 holding the receptacle upwards within the stacker 300 into the stack hopper (see hopper frame 330). The lift mechanism 312 may be a pneumatic-driven (e.g., pneumatic cylinder) mechanism operable to lift the platform 314 containing a receptacle upwards towards the stack hopper. Other types of mechanisms may be used as the lift mechanism 312, for example hydraulic-driven mechanisms or electric motor-driven mechanisms. In at least some embodiments, the lift component may further include one or more lift sensors that detect when a receptacle is in the lift component and fully on the lift platform 314 and thus ready to be lifted into the stack hopper frame 330.

Stacker 300 may further include a stacking component into which the receptacle is lifted by the lift component. The stacking component may include a stack hopper mounted within the stacker 300; receptacles are lifted and pushed onto the bottom of a stack of receptacles 112 held within the stack hopper by two or more catch or clip mechanisms. In FIGS. 9 through 19, the stack hopper is shown as stack hopper frame 330 comprising two vertically mounted angle members located within the stacker frame 302 towards the side opposite the output side, and two vertically mounted flat members located within the frame 302 towards the output side The bottom end of these vertically mounted members may be flared or otherwise configured to assist in guiding a receptacle being lifted by the lift component onto the bottom of a stack in the stack hopper frame 330.

The stack hopper frame 330 is initially empty when a first receptacle is lifted into the stacking component by the lift component at the start of a new stack. The stacking component may further include two or more mechanical catch or clip mechanisms attached to or integrated with the stack hopper frame 330. In at least some embodiments, the catch mechanisms may be positioned on the sides of the stack hopper frame 330 that correspond to the ends of the receptacle. The catch mechanisms may, for example, be mechanical catch mechanisms such as spring-loaded bars or plates positioned so as to retract as the receptacle is pushed upwards into the stack hopper frame 330 by the lift mechanism, and that automatically extend under the lip of the receptacle being lifted once the lip of the receptacle is past the top of the catch mechanisms to thus hold the receptacle in place in the stack hopper frame 330. Alternatively, the catch mechanisms may be pneumatically powered pins or cylinders that are extended to hold the receptacle 112 in place and retracted when pushing a new receptacle onto the stack. Once the receptacle has been caught by the catch mechanisms, the lift mechanism 312 may lower the lift platform 314 to prepare for receiving a next empty receptacle from the input component. Note that the distance from the bottom receptacle 112C in the stack to the lift platform 314 when fully lowered is sufficient to allow another receptacle to fit under the stack in the stack hopper frame 330.

As the lift component lifts a receptacle upwards into the stack hopper frame 330, if there are one or more receptacles already in a stack held in the stack hopper frame 330, the receptacle 112B on the lift platform 314 may slide over the bottom receptacle 112C in the stack until the top of the lip of the receptacle 112B being lifted contacts the bottom receptacle 112C. The lift component continues to push the receptacle 112B upwards, resulting in the entire stack being lifted within the stack hopper frame 330. Once the lip of receptacle 112B clears the catch mechanism, the catch mechanism catches the receptacle 112B and the lift platform 314 is lowered. In at least some embodiments, two or more secondary mechanical catch mechanisms may be positioned on the sides of the stack hopper frame 330 at some distance above the primary catch mechanisms that hold the bottommost receptacle 112B in a stack. These secondary catch mechanisms may be operable to catch and hold a portion of the stack pushed above the secondary catch mechanisms.

The stacking component may be configured to hold a specific number of receptacles in a stack and/or a specific height for the stack. For example, in some embodiments, the stacking component may be configured to hold a stack of 12 receptacles, or a stack of 15 receptacles. In at least some embodiments, the stacking component may further include one or more sensors (e.g., optical sensors) or other mechanisms that track the number of receptacles in a stack and/or that detect when the stack has reached a certain height within the stack hopper frame 330 and is thus ready to be output from the stacker 300.

Once the stacker 300 detects that a stack is complete (e.g., that the correct number of receptacles have been lifted into the stack, and/or that the stack is at or above a threshold height), a stack push component of the stacker 300 may push the stack out of the stack hopper frame 330 and onto an output conveyance mechanism 204 via an output component of the stacker 300. In at least some embodiments, the stack push component may include at least a stack push mechanism 322 mounted to the frame 302 and a stack push assembly 320 mounted to the stack push mechanism 322. The stack push mechanism 322 may be operable to pull the stack push assembly 320 towards the output side of the stacker 300 to thus push the stack of receptacles out of the stack hopper frame 330 onto the output component of the stacker 300. The stack push mechanism 322 may, for example, be a pneumatic-driven (e.g., pneumatic cylinder) mechanism operable to pull the stack push assembly 320 towards the output side of the stacker 300 to thus push the stack out of the stack hopper frame 330 onto the stacker output component. Other types of mechanisms may be used as the stack push mechanism 322, for example hydraulic-driven mechanisms or electric motor-driven mechanisms.

In at least some embodiments, the stack hopper frame 330 may include one or more gates on the output side that are closed when a stack is being formed within the stack hopper frame 330 to help hold the stack in place. In some embodiments, the gates may be mechanical gates that are pushed open by the stack during operation of the stack push component. Alternatively, the gates may be automatically opened, for example using a pneumatic or electric device, when the stack push component is activated to push the stack out of the stack hopper frame 330.

The stacker output component (not visible in FIG. 9) may be configured to abut with or couple to the output conveyance mechanism 204. The stacker output component may, for example, be a roller conveyance mechanism the top of which is substantially aligned with the bottom of a stack as held in the stack hopper frame 330. One or more rollers of the roller mechanism may be drive rollers that operate to propel the stacks being output from stacker 300 onto the output conveyance mechanism 204.

Figure 10:
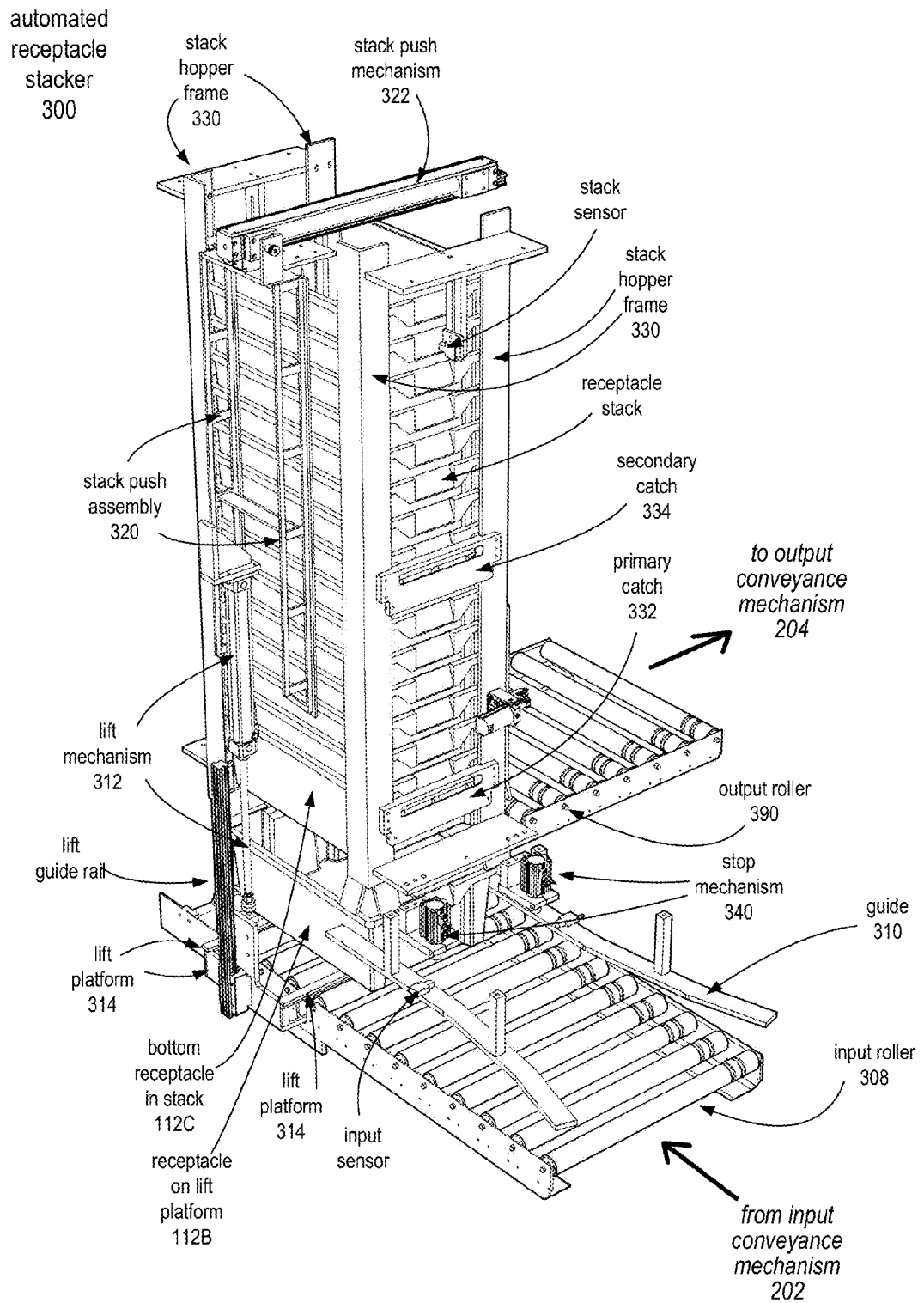
FIG. 10 is a similar perspective view of the example automated receptacle stacker as shown in FIG. 9 with the stacker frame removed, according to at least some embodiments.

FIG. 10 is a similar perspective view of the example automated receptacle stacker 300 as shown in FIG. 9 with the stacker frame, control module, and receptacle at input removed to better view various components of the stacker 300 as described in reference to FIG. 9, according to at least some embodiments.

Stacker 300 may include an input component that includes at least an input roller 308, guides 310, one or more input sensors, and a stop mechanism 340. The input component may abut with or couple to the input conveyance mechanism 202. In at least some embodiments, the input roller 308 may include one or more drive rollers that operate to propel the receptacle into the lift component of the stacker 300. The stop mechanism 340 may, for example, include one or more pins or pistons that can be dropped into place to hold an incoming receptacle and retracted to release the receptacle. The input sensors may detect an incoming receptacle from input conveyance mechanism 202. The stop mechanism 340 may hold the receptacle until the lift component of the stacker 300 is clear. Once clear, the stop mechanism 340 releases the receptacle and the drive rollers of the input roller 308 propel the receptacle into the lift component. The guides 310 may serve to properly guide the receptacle into the lift component.

Stacker 300 may further include a lift component that includes at least a lift platform 314 and a lift mechanism 312 coupled to the lift platform 314. The lift platform 314 may be a solid piece, two or more bars or tubes, or of some other configuration. The lift mechanism 312 operates to lift the platform 314 holding the receptacle upwards within the stacker 300 into the stack hopper frame 330. FIG. 10 shows a lift guide rail that may be mounted to the frame 302 to properly guide the lift platform 314 when lifted and lowered by the lift mechanism 312.

Stacker 300 may further include a stacking component into which the receptacle is lifted by the lift component. The stacking component may include a stack hopper. In at least some embodiments, the stack hopper may be implemented as a stack hopper frame 330 comprising two vertically mounted angle members located within the frame 302 towards the side opposite the output side, and two vertically mounted flat members located within the frame towards the output side The bottom end of these vertically mounted members may be flared or otherwise configured to assist in guiding a receptacle being lifted by the lift component onto the bottom of a stack in the stack hopper frame 330.

The stacking component may further include mechanical catch or clip mechanisms 332 attached to or integrated with the stack hopper frame 330. In at least some embodiments, the catch mechanisms 332 may be positioned on the sides of the stack hopper frame 330 that correspond to the ends of the receptacle, as shown in FIG. 10. The catch mechanisms 332 may, for example, be mechanical catch mechanisms such as spring-loaded bars or plates positioned so as to retract as a receptacle is pushed upwards into the stack hopper frame 330 by the lift mechanism, and that automatically extend under the lip of the receptacle being lifted once the lip of the receptacle is past the top of the catch mechanisms 332 to thus hold the receptacle in place in the stack hopper frame 330. Alternatively, the catch mechanisms 332 may be pneumatically powered pins or cylinders that are extended to hold the receptacle 112 in place and retracted when pushing a new receptacle onto the stack. In at least some embodiments, two or more secondary mechanical catch mechanisms 334 may be positioned on the sides of the stack hopper frame 330 at some distance above the primary catch mechanisms 332 that hold the bottommost receptacle 112B in a stack. These secondary catch mechanisms 334 may be operable to catch and hold a portion of the stack pushed above the secondary catch mechanisms.

In at least some embodiments, the stacking component may further include one or more stack sensors (e.g., optical sensors) or other mechanisms that detect when the stack has reached a certain height within the stack hopper frame 330 and is thus ready to be output from the stacker 300.

Stacker 300 may further include a stack push component that may push a stack out of the stack hopper frame 330 and onto an output component of the stacker 300. In at least some embodiments, the stack push component may include at least a stack push mechanism 322 mounted to the frame 302 and a stack push assembly 320 mounted to the stack push mechanism 322. The stack push mechanism 322 may be operable pull the stack push assembly 320 towards the output side of the stacker 300 to thus push the stack of receptacles out of the stack hopper frame 330 onto the output component of the stacker 300.

The stacker output component may be configured to abut with or couple to the output conveyance mechanism 204. The stacker output component may, for example, be a roller conveyance mechanism (output roller 390), the top of which is substantially aligned with the bottom of a stack as held in the stack hopper frame 330. In at least some embodiments, one or more rollers of the output roller 390 may be drive rollers that operate to propel the stacks being output from stacker 300 onto the output conveyance mechanism 204.

Figure 11:
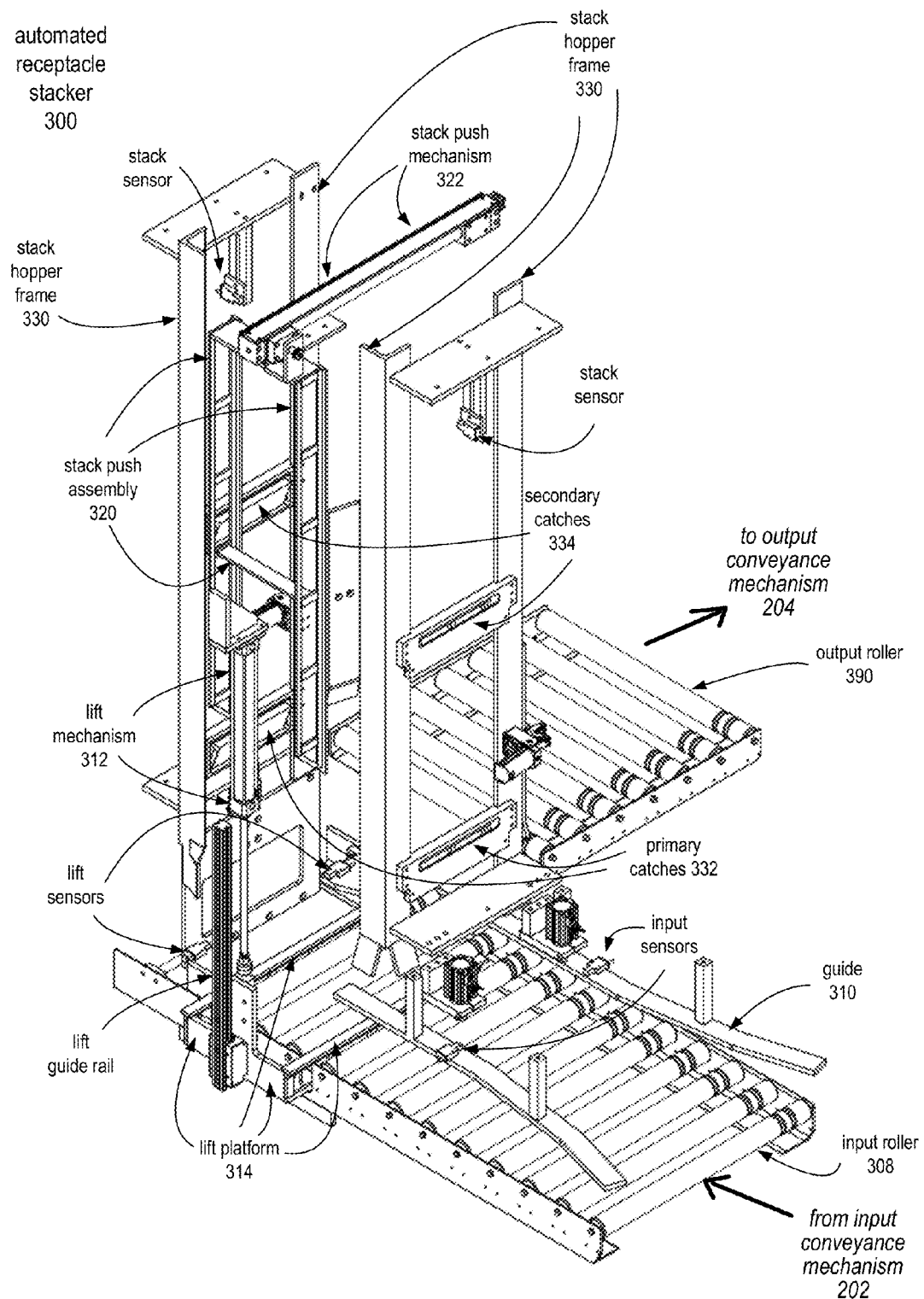
FIG. 11 is a similar perspective view of the example automated receptacle stacker as shown in FIGS. 9 and 10 with the stacker frame removed and with all receptacles removed, according to at least some embodiments.

FIG. 11 is a similar perspective view of the example automated receptacle stacker 300 as shown in FIGS. 9 and 10 with the stacker frame and control module removed, and with all receptacles removed to better view various components of the stacker 300 as described in reference to FIGS. 9 and 10, according to at least some embodiments. FIG. 11 shows that a primary catch 332, secondary catch 334, and stack sensor may be mounted on both sides of the stack hopper frame 330, in at least some embodiments. FIG. 11 also provides a better view of the lift platform 314 and shows that the lift platform 314 fits into notches on input roller 308 when in the full down position to allow a receptacle to roll over the platform 314 into position for lifting, in at least some embodiments. FIG. 11 also shows that the lift component may include one or more lift sensors that detect when a receptacle is in the lift component and fully on the lift platform 314 and thus ready to be lifted into the stack hopper frame 330.

Figure 12:
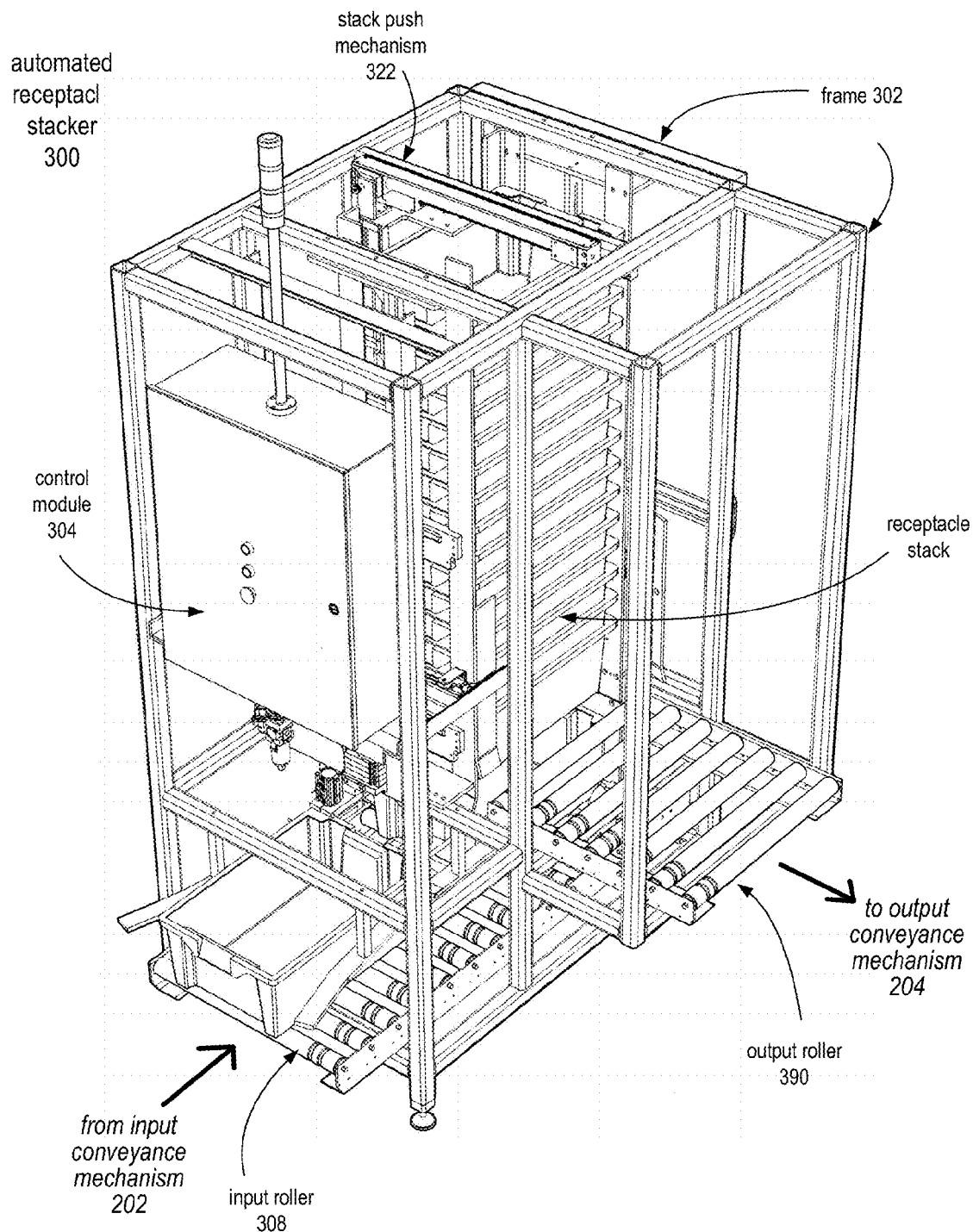
FIG. 12 is another perspective view of the example automated receptacle stacker shown in FIG. 9, according to at least some embodiments.

FIG. 12 is another perspective view of the example automated receptacle stacker 300, according to at least some embodiments. This perspective view shows the top, input side, and output side of the stacker 300. FIG. 12 shows the input roller 308 and output roller 390 as positioned in the frame 302, and shows that the top of the output roller 390 aligns with the bottom of the receptacle stack in the stack hopper frame. FIG. 12 also shows the stack push mechanism 322 mounted to the top of the frame 302, and the control module 304 mounted on the input side of the frame 302. While not shown, at least some of the spaces in the outer surfaces of the frame 302 may be covered with plates, panels, or doors during normal operations.

Figure 13:
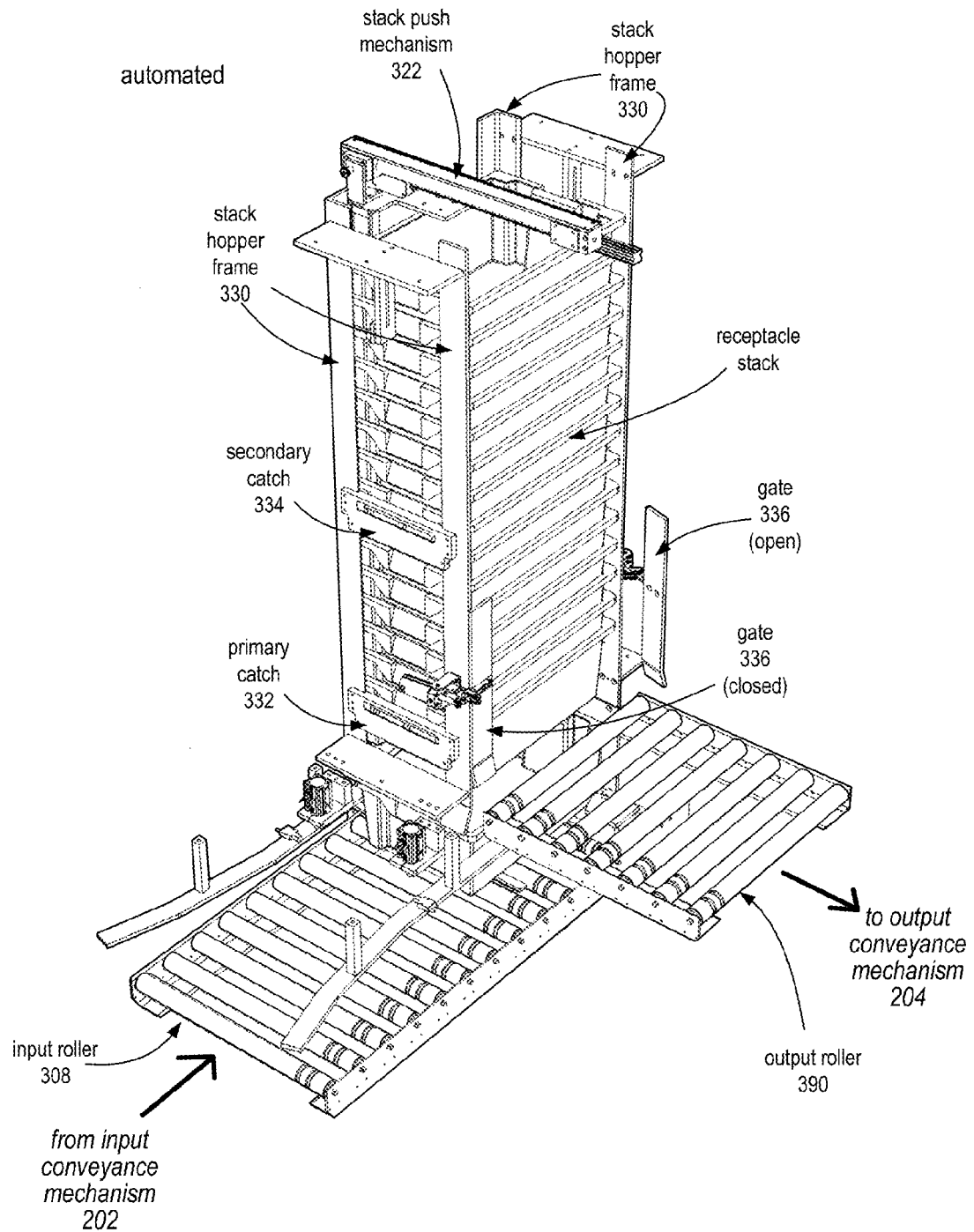
FIG. 13 is the same perspective view of the example automated receptacle stacker as shown in FIG. 12 with the stacker frame removed, according to at least some embodiments.

FIG. 13 is the same perspective view of the example automated receptacle stacker 300 as shown in FIG. 12 with the stacker frame, control module, and receptacle at input removed to better view various components of the stacker 300 as described in reference to FIG. 12, according to at least some embodiments. In particular, FIG. 13 shows that the stack hopper frame 330 may include one or more gates 336 on the output side that are closed when a stack is being formed within the stack hopper frame 330 to help hold the stack in place. In some embodiments, the gates 336 may be mechanical gates that are pushed open by the stack during operation of the stack push component. Alternatively, the gates 336 may be automatically opened, for example using a pneumatic or electric device, when the stack push component is activated to push the stack out of the stack hopper frame 330. Note that FIG. 13 shows one gate 336 closed and the other gate 336 open for illustrative purposes.

Figure 14:
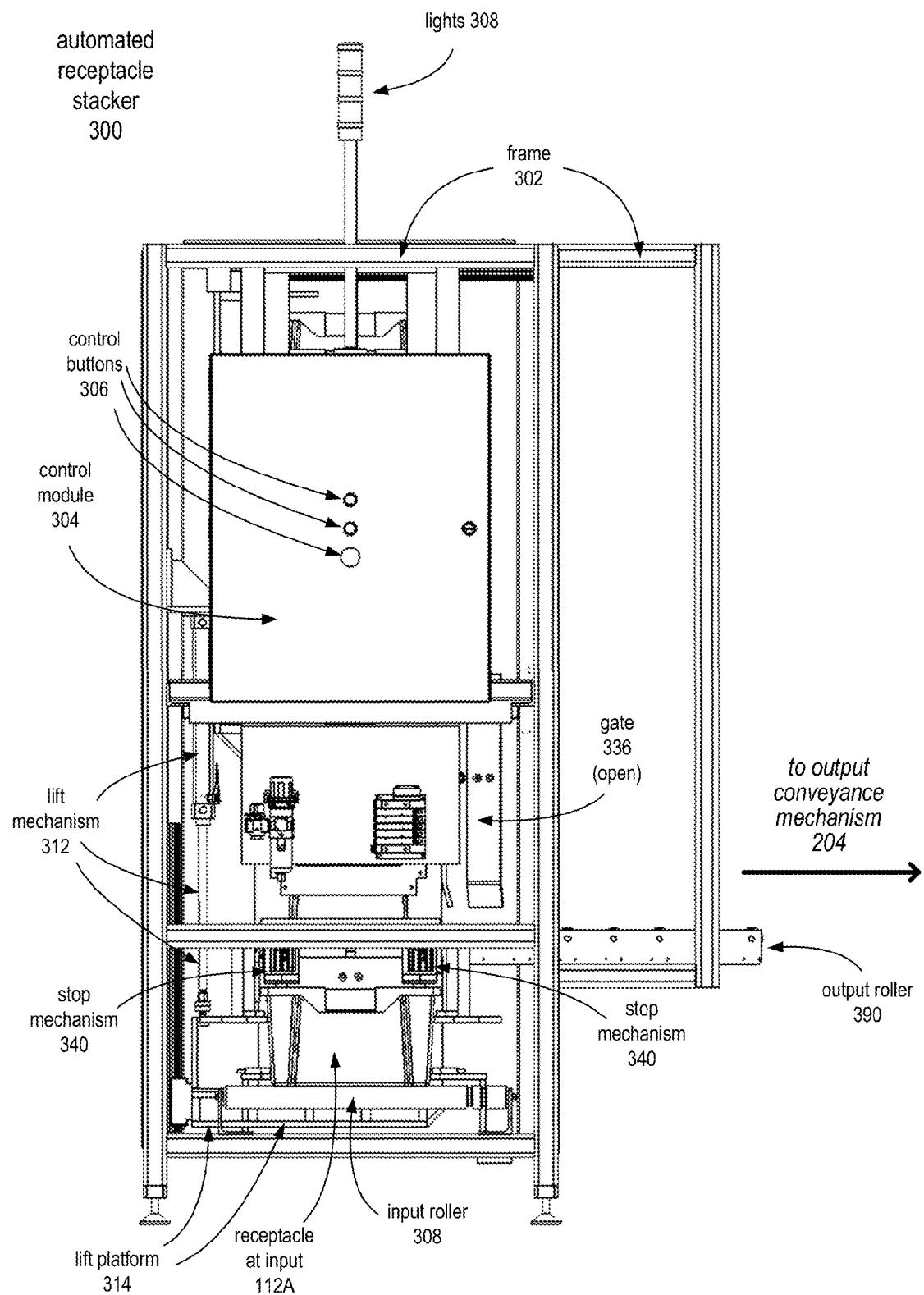
FIG. 14 shows the input side of the example automated receptacle stacker shown in FIG. 9, according to at least some embodiments.

FIG. 14 shows the input side of the example automated receptacle stacker 300 as shown in the perspective views of FIGS. 9 and 12, according to at least some embodiments. The front of control module 304 can be seen, including one or more control buttons 306. A portion of the lift platform 314 can be seen from the side, along with the lift mechanism 312. Two stop mechanisms 340 are visible that may hold the receptacle at input 112A until the lift component is cleared. One of gates 336 is visible in the open position.

Figure 15:
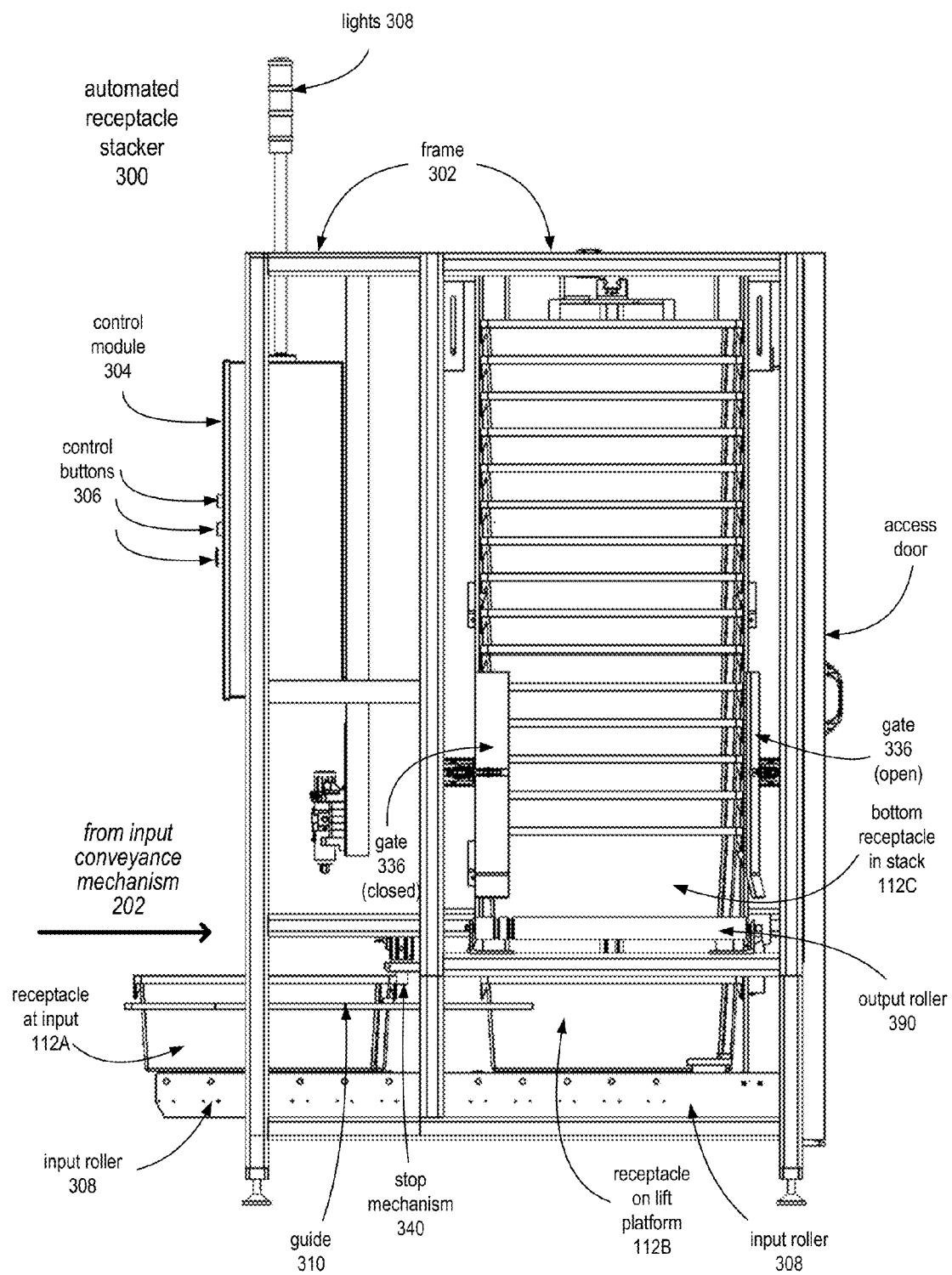
FIG. 15 shows the output side of the example automated receptacle stacker shown in FIG. 9, according to at least some embodiments.

FIG. 15 shows the output side of the example automated receptacle stacker 300 as shown in the perspective views of FIGS. 9 and 12, according to at least some embodiments. The side of control module 304 can be seen, including one or more control buttons 306. A stop mechanism 340 is shown in the extended position that holds the receptacle at input 112A until the lift component is cleared. One of gates 336 is shown in the open position, while the other gate is shown in the closed position, for illustrative purposes. FIG. 15 indicates that there may be an access door on the right side of the stacker 300 when viewed from the output side shown in this Figure.

Figure 16:
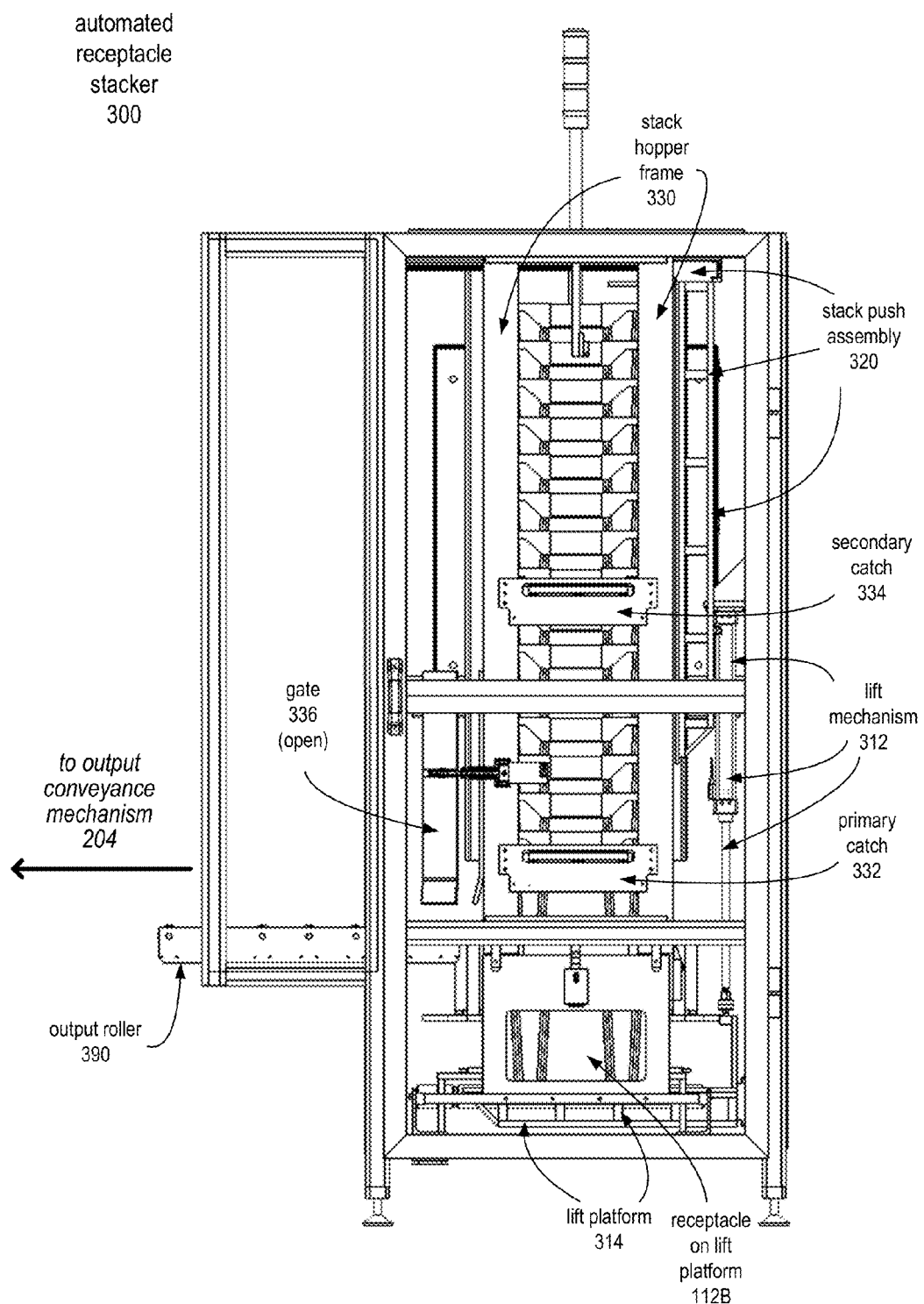
FIG. 16 shows the side opposite the input side of the example automated receptacle stacker shown in FIG. 9, according to at least some embodiments.

FIG. 16 shows the side opposite the input side of the example automated receptacle stacker 300 shown in the perspective views of FIGS. 9 and 12, according to at least some embodiments. A portion of the lift platform 314 can be seen from the side, along with the lift mechanism 312. In addition, a side view of the stack push assembly 320 can be seen. The primary catch 332 and secondary catch 334 on this side of the stack hopper frame 330 are visible. One of gates 336 is visible in the open position.

Figure 17:
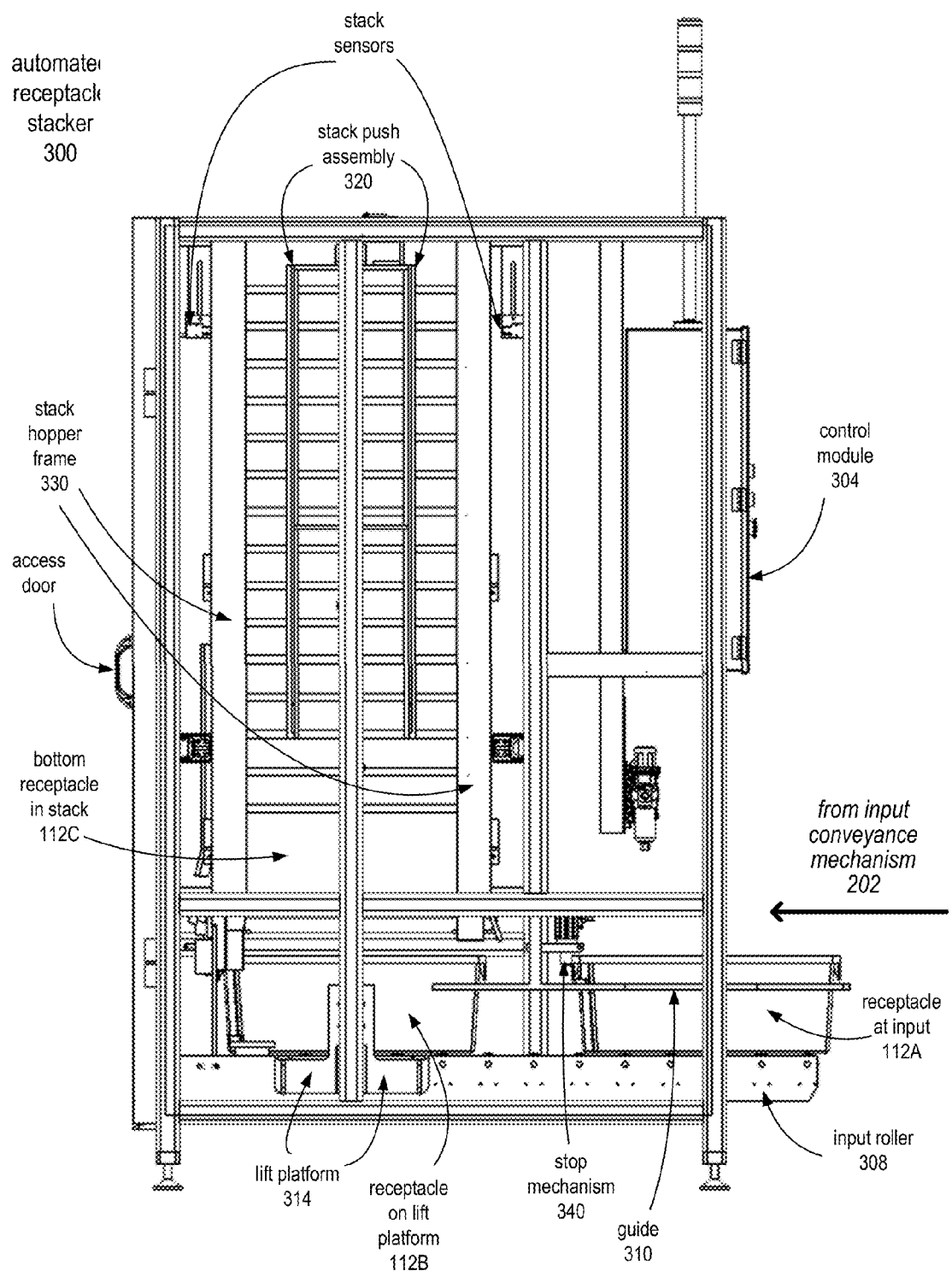
FIG. 17 shows the side opposite the output side of the example automated receptacle stacker shown in FIG. 9, according to at least some embodiments.

FIG. 17 shows the side opposite the output side of the example automated receptacle stacker 300 shown in the perspective views of FIGS. 9 and 12, according to at least some embodiments. The side of control module 304 can be seen, including one or more control buttons 306. A stop mechanism 340 is shown in the extended position that holds the receptacle at input 112A until the lift component is cleared. This view shows the lift platform 314 in the full down position, slotted into the input roller 308. The stack push assembly 320 is visible, and two stack sensors mounted on the stack hopper frame 330 can be seen.

Figure 18:
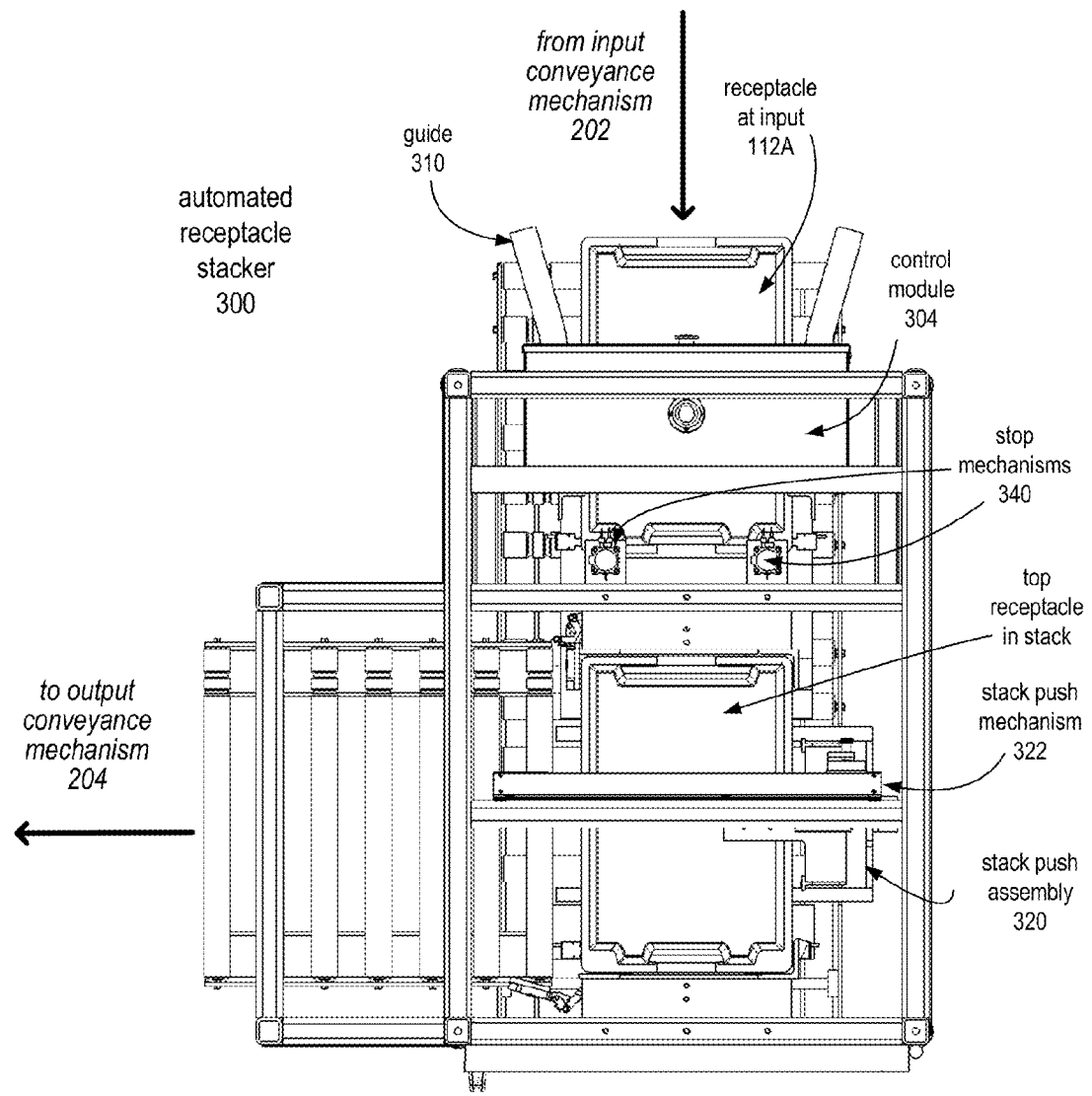
FIG. 18 is a top view of the example automated receptacle stacker shown in FIG. 9, according to at least some embodiments.
Figure 19:
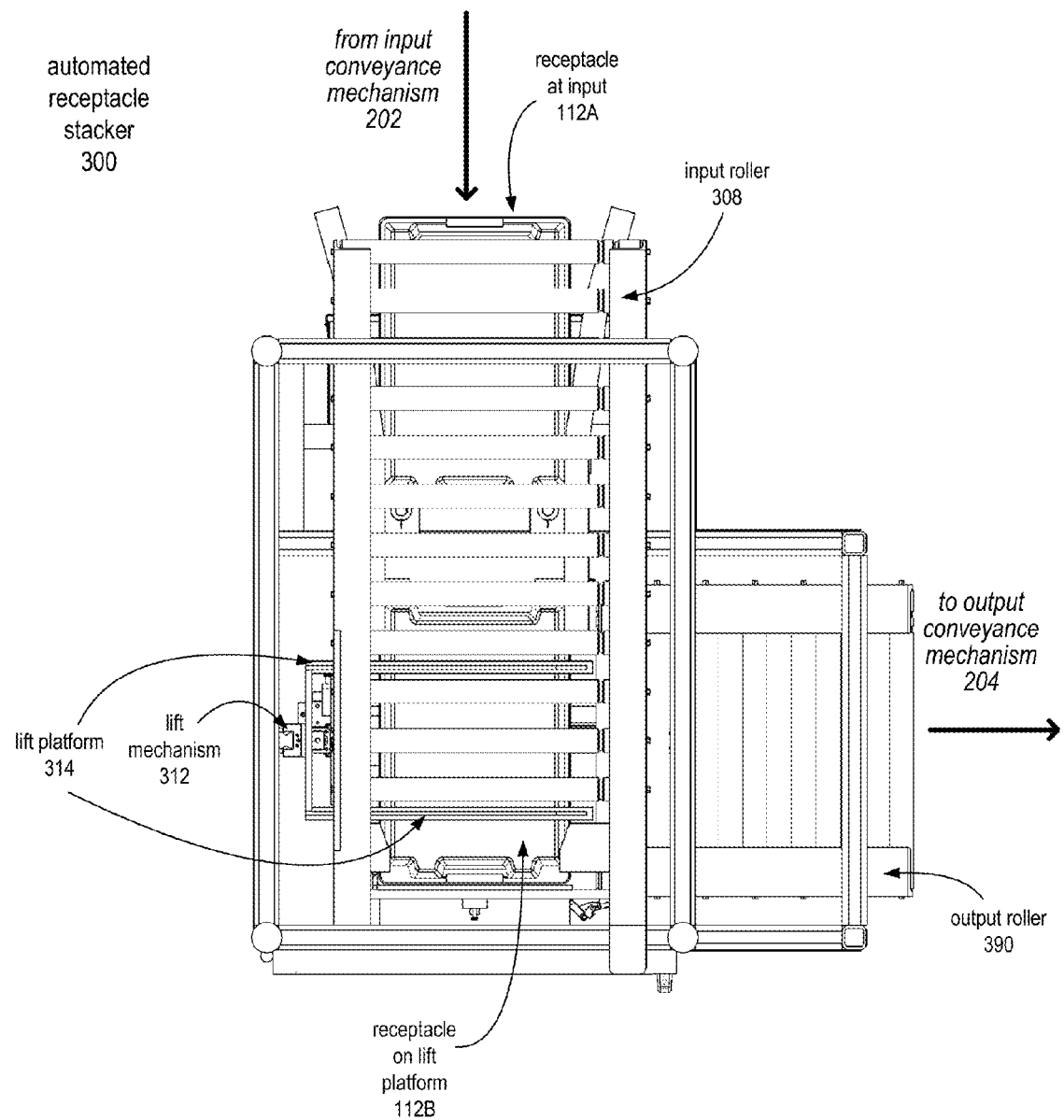
FIG. 19 is a bottom view of the example automated receptacle stacker shown in FIG. 9, according to at least some embodiments.

FIG. 18 is a top view of the example automated receptacle stacker 300 shown in the perspective views of FIGS. 9 and 12, according to at least some embodiments. This view shows the top of control module 304 and stop mechanisms 340. The stack push assembly 320 and stack push mechanism 322 can also be seen, as can the inside of the top receptacle in the stack currently held in the stack hopper frame FIG. 19 is a bottom view of the example automated receptacle stacker 300, according to at least some embodiments. This view shows the input roller 308 and output roller 390 from underneath. Also shown are bottom views of the lift platform 314 and lift mechanism 312.

FIGS. 20 through 27 illustrate an example physical configuration for and components of an automated receptacle stacker 400 that includes a receptacle rotator component 480 for correctly orienting receptacles before stacking, according to at least some embodiments. General operations of the components of receptacle stacker 400 shown in FIGS. 20 through 27 may be similar to operations of the components of receptacle stacker 300 as shown in FIGS. 9 through 19 and described above, with the addition of a receptacle rotator component 480 that is located between the input component and the lift component of the stacker 400. Note, however, that FIGS. 20 through 27 show that at least some of the components may be implemented differently. For example, the configurations of the lift component and the stack push component in the example stacker 400 as shown in FIGS. 20 through 27 is different than the configurations of those components in the example stacker 300 as shown in FIGS. 9 through 19. However, as noted, the general operations of the stacker 400 are similar to those described for stacker 300; the changes in configurations of the components are generally implementation details and do not change the overall method of operation of the stacker 400. Moreover, the components may be implemented or arranged as shown in any of the FIGS. 9 through 27, which are given by way of example, or may be otherwise implemented or arranged, without changing the overall method of operation of the automated receptacle stacker.

Note that FIGS. 20 through 27 do not show a control module 304 as is shown in FIGS. 9 through 19. However, it may be assumed that the receptacle stacker 400 shown in FIGS. 20 through 27 includes a similar control module that is configured to direct the various operations of the stacker 400 in a similar manner as the control module 304 as described for stacker 300 in reference to FIGS. 9 through 19. An example computer system that may be used as a control component of stacker 400 is illustrated in FIG. 30.

Figure 20:
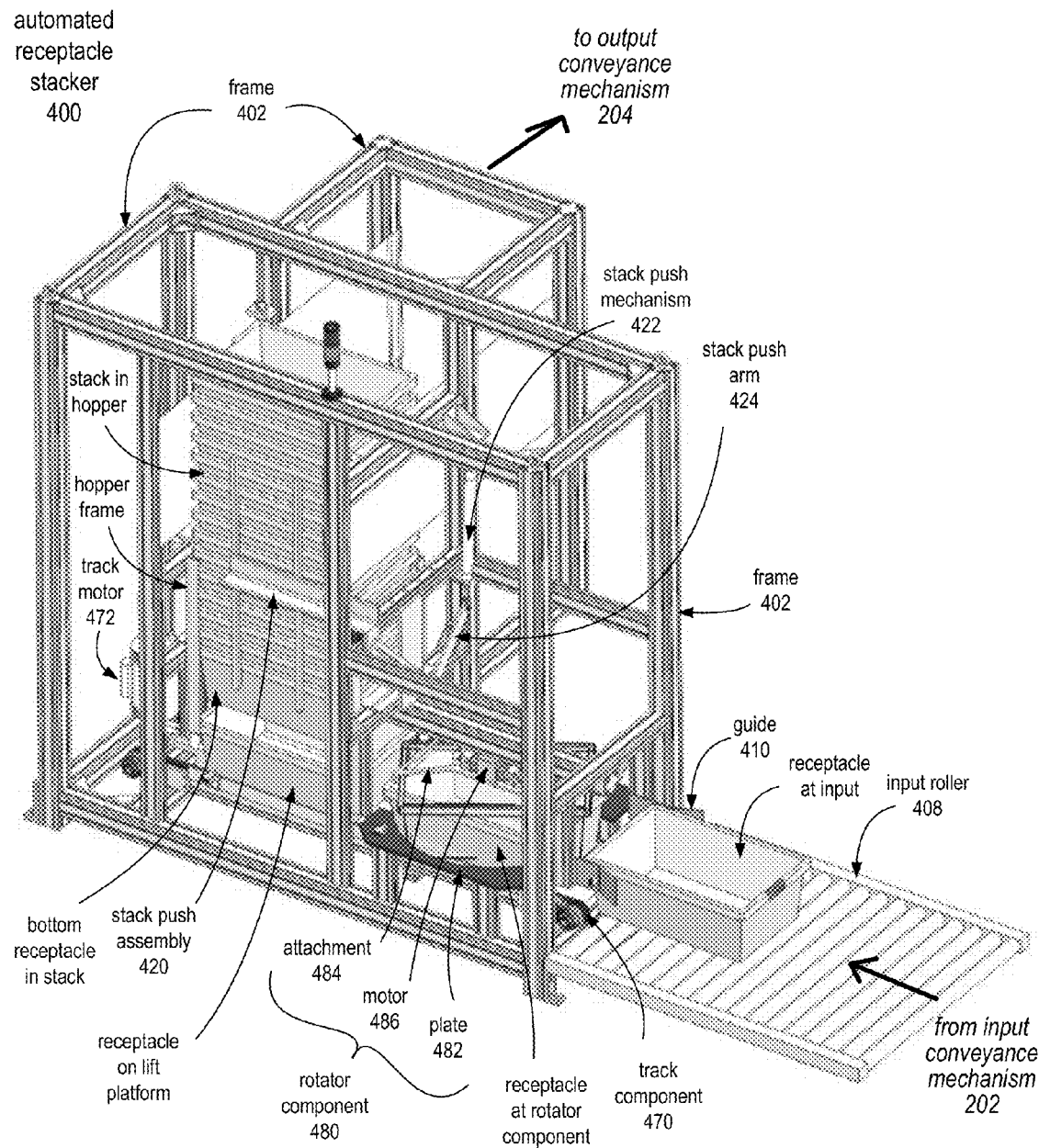
FIG. 20 is a perspective view of an example automated receptacle stacker that includes a rotator component, according to at least some embodiments.

FIG. 20 is a perspective view of an example automated receptacle stacker 400 that includes a rotator component, according to at least some embodiments. This perspective view shows the top, input side, and side opposite the output side of the stacker 400. Various components of the stacker 400 may be mounted to or otherwise contained in a frame 402 assembly. The frame 402 assembly may be composed of several vertical, horizontal, or otherwise oriented outer members (e.g., bars, rails, tubes, plates, etc.) that are coupled together (e.g., by welds, bolts, screws, or other coupling methods) to form the frame 402 that contains the various stacker 400 components and mechanisms. While not shown, at least some of the spaces in the outer surfaces of the frame 402 may be covered with plates, panels, or doors during normal operations.

Stacker 400 may include an input component that may include at least an input roller 408, one or more guides 410, one or more input sensors, and a stop mechanism. The input component may abut with or couple to the input conveyance mechanism 202. In at least some embodiments, the input roller 408 may include one or more drive rollers that operate to propel the receptacle into the rotator component 480 of the stacker 400. The stop mechanism may, for example, include one or more pins, pistons, or plates that can be extended (e.g., dropped or raised) to hold an incoming receptacle and retracted to release the receptacle. The input sensors may detect an incoming receptacle from input conveyance mechanism 202. The stop mechanism 340 may hold the receptacle until the rotator component 480 of the stacker 400 is clear. Once clear, a control module of stacker 400 may direct the stop mechanism to release the receptacle and direct the drive rollers of the input roller 408 to propel the receptacle into the rotator component 480. The guides 410 may serve to properly guide the receptacle into the rotator component 480. FIG. 20 shows a receptacle positioned in the input component being held by the stop mechanism and also shows a receptacle in the rotator component and a receptacle in the lift component (receptacle on lift platform).

Stacker 400 may further include a rotator component 480 that detects and rotates incorrectly oriented receptacles input to the receptacle stacker 400 to insure that the receptacles are correctly oriented before stacking the receptacles. If the rotator component 480 is clear, a stop mechanism at the input component may release the receptacle, and the input component of the stacker 400 may propel the receptacle into the rotator component 480. Stacker 400 may also include one or more sensors that may detect the orientation of the receptacle prior to, during, or after input to the rotator component 480, and communicate the orientation to a control module of the stacker 400. If it is detected that the receptacle in the rotator component 480 is in the wrong orientation, the control module may direct the rotator component 480 to rotate the receptacle to the proper orientation. Otherwise, the receptacle is allowed to pass through the rotator component 480 without being rotated. In at least some embodiments, to rotate a receptacle, the rotator component 480 may include a plate mechanism 482 that is activated to lift the receptacle off a track component 470 of the stacker 400 and towards a rotator mechanism. The rotator mechanism may then be activated to rotate the receptacle on the plate mechanism 482. The rotator mechanism may, for example, include a rotator attachment 484 configured to fit inside the top of the receptacle when lifted by the plate mechanism 482 and a rotator motor 486 configured to rotate the rotator attachment 484 to thus rotate the receptacle on the plate mechanism 482. Once rotated, the plate mechanism 482 may lower the receptacle back onto the track 470.

In at least some embodiments the stacker 400 may include a track component 470 that extends from the roller component 480 into the lift component that may be activated to convey a receptacle from the rotator component 480 into the lift component, and a track motor 472 operable to drive the track 470. The input component may propel the receptacle onto the track component 470 within the rotator component 480. The track component 470 may, for example, include a parallel pair of motor-driven belts (see, e.g., FIGS. 23 and 24). The rotator component 480 may include another stop mechanism that may hold the properly oriented receptacle in the rotator component 480 until the lift component of the stacker 400 is clear. Once the lift component is clear, the stop mechanism may release the receptacle, and the track component 470 of the stacker 400 may propel the receptacle from the rotator component 480 into the lift component of the stacker 400.

Stacker 400 may further include a lift component that includes at least a lift platform 414 (see, e.g., FIG. 24) and a lift mechanism 412 (see, e.g., FIG. 26) coupled to the lift platform 414. FIG. 20 shows a receptacle in the lift component on the lift platform 414 (receptacle on lift platform). The lift platform 414 may be a solid piece, two or more bars or tubes, or of some other configuration. The lift mechanism 412 operates to lift the platform 414 holding the receptacle upwards within the stacker 400 into a stack hopper 430 (see, e.g., FIG. 26). The lift mechanism 412 may be a pneumatic-driven (e.g., pneumatic cylinder) mechanism operable to lift the platform 414 containing a receptacle upwards towards the stack hopper 430. Other types of mechanisms may be used as the lift mechanism 412, for example hydraulic-driven mechanisms or electric motor-driven mechanisms. In at least some embodiments, the lift component may further include one or more lift sensors that detect when a receptacle is in the lift component and fully on the lift platform 414 and thus ready to be lifted into the stack hopper frame 430.

Stacker 400 may further include a stacking component into which the receptacle is lifted by the lift component. The stacking component may include a stack hopper 430 mounted within the stacker 400; receptacles are lifted and pushed onto the bottom of a stack of receptacles held within the stack hopper 430 by two or more catch or clip mechanisms. In some embodiments, the stack hopper 430 may be implemented as a stack hopper frame comprising two vertically mounted angle members located within the stacker frame 402 towards the side opposite the output side, and two vertically mounted flat members located within the frame 402 towards the output side The bottom end of these vertically mounted members may be flared or otherwise configured to assist in guiding a receptacle being lifted by the lift component onto the bottom of a stack in the stack hopper 430.

The stack hopper 430 is initially empty when a first receptacle is lifted into the stacking component by the lift component at the start of a new stack. The stacking component may further include two or more mechanical catch or clip mechanisms attached to or integrated with the stack hopper 430. In at least some embodiments, the catch mechanisms may be positioned on the sides of the stack hopper 430 that correspond to the ends of the receptacle. The catch mechanisms may, for example, be mechanical catch mechanisms such as spring-loaded bars or plates positioned so as to retract as the receptacle is pushed upwards into the stack hopper 430 by the lift mechanism, and that automatically extend under the lip of the receptacle being lifted once the lip of the receptacle is past the top of the catch mechanisms to thus hold the receptacle in place in the stack hopper 430. Alternatively, the catch mechanisms may be pneumatically powered pins or cylinders that are extended to hold the receptacle 112 in place and retracted when pushing a new receptacle onto the stack. Once the receptacle has been caught by the catch mechanisms, the lift mechanism 412 may lower the lift platform 414 to prepare for receiving a next empty receptacle from the rotator component 480. Note that the distance from the bottom receptacle in the stack hopper 430 to the lift platform 414 when fully lowered is sufficient to allow another receptacle to fit under the stack in the stack hopper 430.

As the lift component lifts a receptacle upwards into the stack hopper 430, if there are one or more receptacles already in a stack held in the stack hopper 430, the receptacle on the lift platform 414 may slide over the bottom receptacle in the stack until the top of the lip of the receptacle being lifted contacts the bottom receptacle. The lift component continues to push the receptacle upwards, resulting in the entire stack being lifted within the stack hopper 430. Once the lip of receptacle clears the catch mechanism, the catch mechanism catches the receptacle and the lift platform 414 is lowered. In some embodiments, two or more secondary mechanical catch mechanisms may be positioned on the sides of the stack hopper frame 430 at some distance above the primary catch mechanisms that hold the bottommost receptacle in a stack. These secondary catch mechanisms may be operable to catch and hold a portion of the stack pushed above the secondary catch mechanisms.

The stacking component may be configured to hold a specific number of receptacles in a stack and/or a specific height for the stack. For example, in some embodiments, the stacking component may be configured to hold a stack of 12 receptacles, or a stack of 15 receptacles. In at least some embodiments, the stacking component may further include one or more sensors (e.g., optical sensors) or other mechanisms that track the number of receptacles in a stack and/or that detect when the stack has reached a certain height within the stack hopper 430 and is thus ready to be output from the stacker 400.

Once the stacker 400 detects that a stack is complete (e.g., that the correct number of receptacles have been lifted into the stack, and/or that the stack is at or above a threshold height), a stack push component of the stacker 400 may push the stack out of the stack hopper frame 430 and onto an output conveyance mechanism 204 via an output component of the stacker 400. In at least some embodiments, the stack push component may include at least a stack push mechanism 422 mounted to the frame 402 and a stack push assembly 420 coupled to the stack push mechanism 422 via an articulated stack push arm 424. The stack push mechanism 322 and stack push arm 424 may be operable pull the stack push assembly 420 towards the output side of the stacker 400 to thus push the stack of receptacles out of the stack hopper 430 onto the output component of the stacker 400. The stack push mechanism 422 may, for example, be a pneumatic-driven (e.g., pneumatic cylinder) mechanism operable to pull the stack push assembly 420 via the stack push arm 424 towards the output side of the stacker 400 to thus push the stack out of the stack hopper frame 430 onto the stacker output component. Other types of mechanisms may be used as the stack push mechanism 422, for example hydraulic-driven mechanisms or electric motor-driven mechanisms.

In at least some embodiments, the stack hopper 430 may include one or more gates on the output side that are closed when a stack is being formed within the stack hopper 430 to help hold the stack in place. In some embodiments, the gates may be mechanical gates that are pushed open by the stack during operation of the stack push component. Alternatively, the gates may be automatically opened, for example using a pneumatic or electric device, when the stack push component is activated to push the stack out of the stack hopper frame 430.

The stacker output component (not visible in FIG. 20) may be configured to abut with or couple to the output conveyance mechanism 204. In some embodiments, the stacker output component may include a roller conveyance mechanism the top of which is substantially aligned with the bottom of a stack as held in the stack hopper frame 430. One or more rollers of the roller mechanism may be drive rollers that operate to propel the stacks being output from stacker 400 onto the output conveyance mechanism 204.

Figure 21:
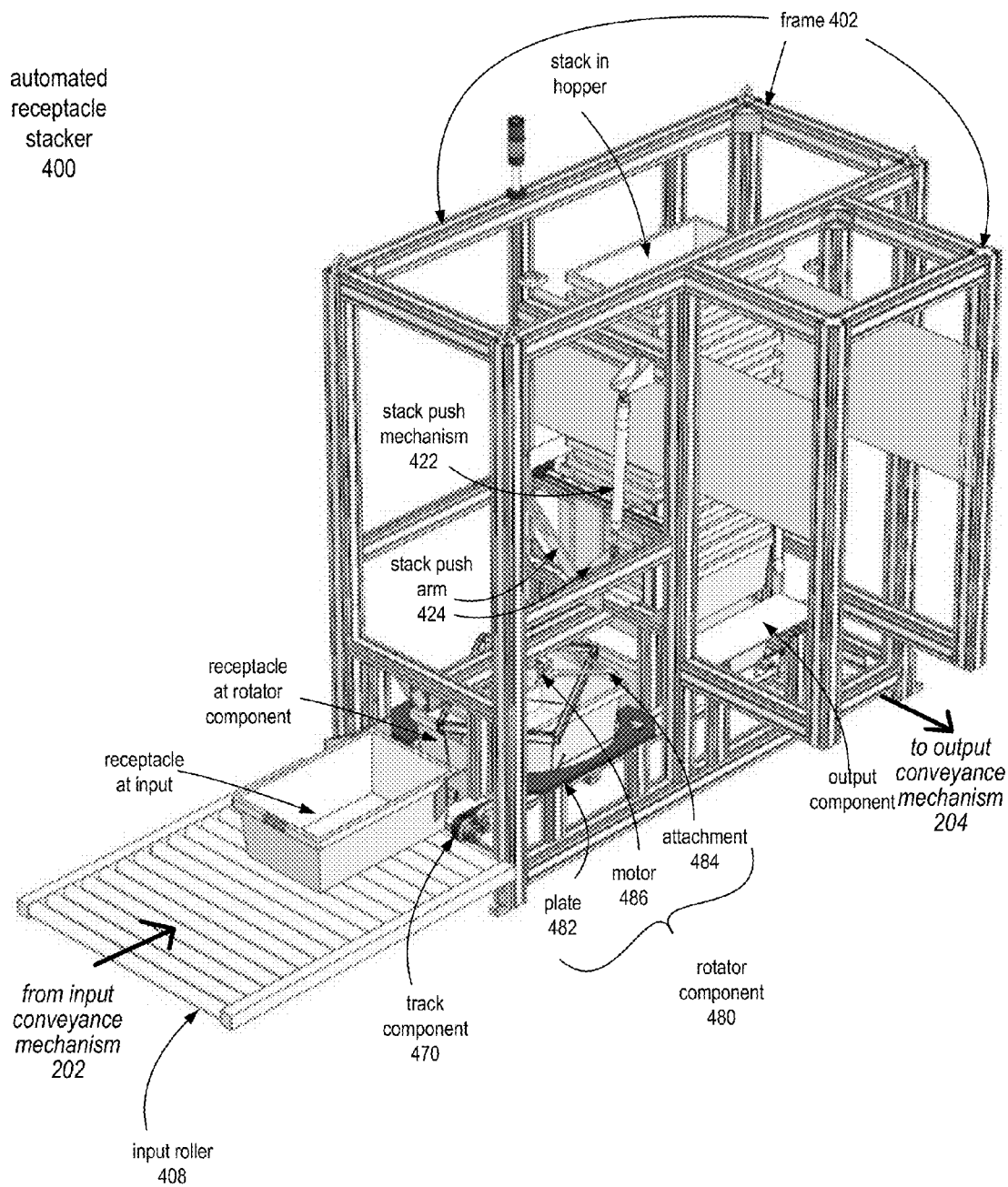
FIG. 21 is another perspective view of the example automated receptacle stacker shown in FIG. 20, according to at least some embodiments.

FIG. 21 is another perspective view of the example automated receptacle stacker shown in FIG. 20, according to at least some embodiments. This perspective view shows the top, input side, and output side of the stacker 400. FIG. 21 shows the input roller 408 and output component as positioned in the frame 402, and shows that the output component aligns with the bottom of the receptacle stack in the stack hopper 430. FIG. 21 also shows the plate 422, attachment 484, and motor 486 elements of the rotator component 480 from this side. FIG. 21 also shows the stack push mechanism 422 mounted to a cross member of the frame 402, and the articulated stack push arm 424 attached to the stack push mechanism 422. While not shown, at least some of the spaces in the outer surfaces of the frame 402 may be covered with plates, panels, or doors during normal operations.

Figure 22:
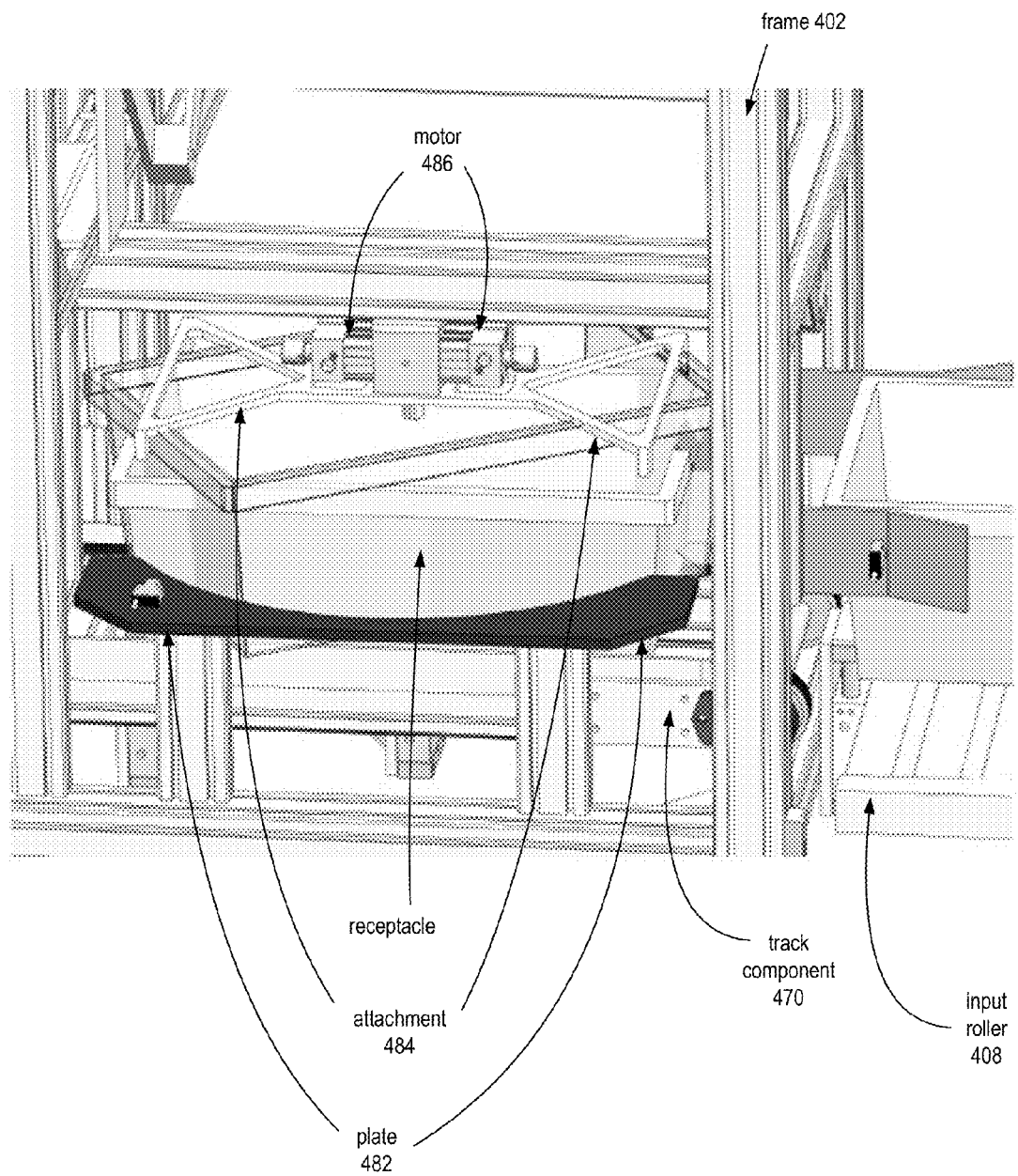
FIG. 22 is a close-up view of the rotator component of the example automated receptacle stacker shown in FIG. 20, according to at least some embodiments.
Figure 23:
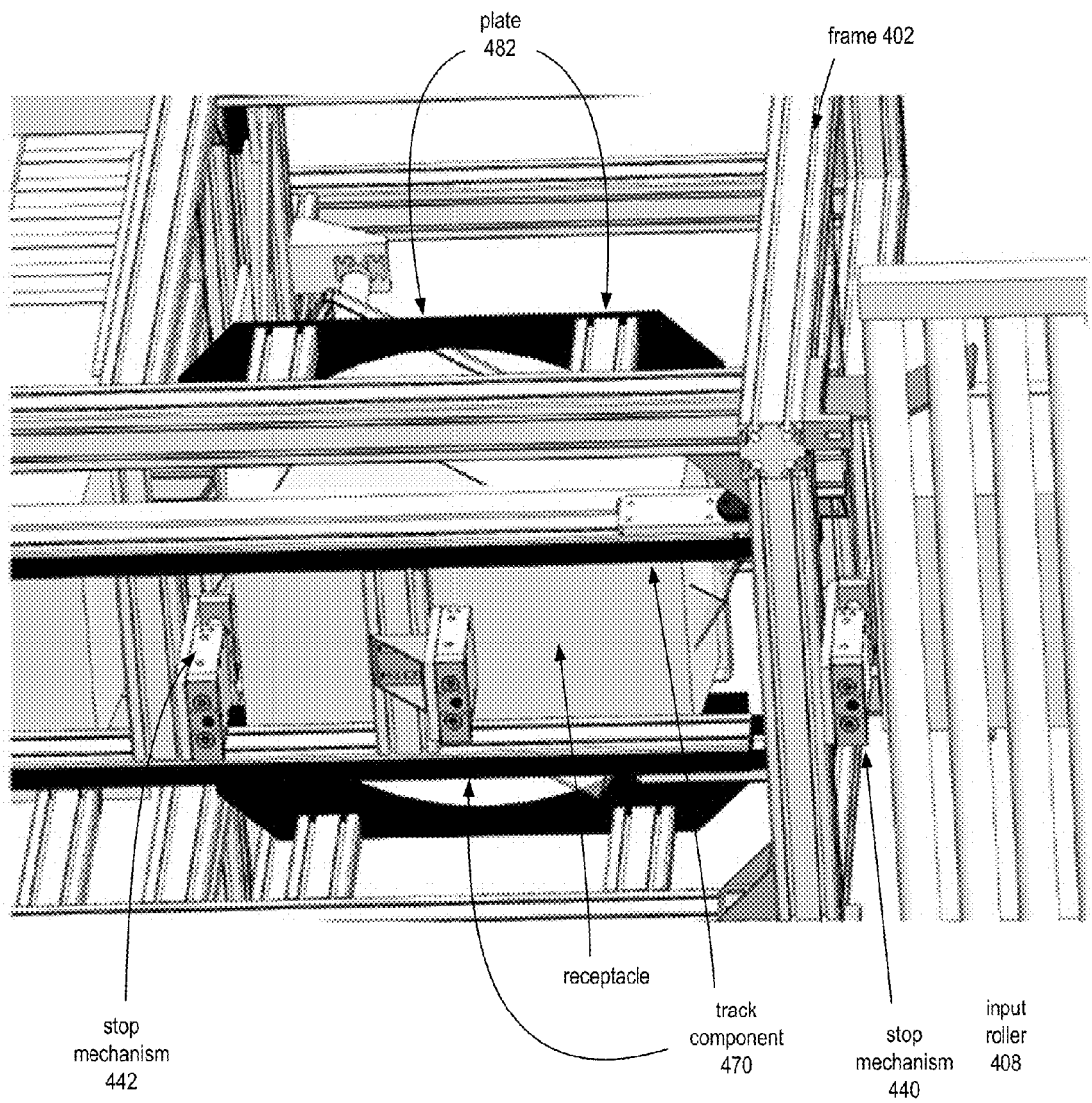
FIG. 23 is a bottom view of the rotator component of the example automated receptacle stacker shown in FIG. 20, according to at least some embodiments.

FIG. 22 is a close-up view of the rotator component of the example automated receptacle stacker shown in FIG. 20, and FIG. 23 is a bottom view of the rotator component of the example automated receptacle stacker shown in FIG. 20, according to at least some embodiments. The rotator component 480 may include one or more sensors that may detect the orientation of the receptacle prior to, during, or after input to the rotator component 480, and communicate the orientation to a control module of the stacker 400. If it is detected that the receptacle in the rotator component 480 is in the wrong orientation, the control module may direct the rotator component 480 to rotate the receptacle to the proper orientation. Otherwise, the receptacle is allowed to pass through the rotator component 480 without being rotated. In at least some embodiments, to rotate a receptacle, the rotator component 480 may include a plate mechanism 482 that is activated to lift the receptacle off the track component 470 of the stacker 400 and towards a rotator mechanism. The rotator mechanism may then be activated to rotate the receptacle on the plate mechanism 482. The rotator mechanism may, for example, include a rotator attachment 484 configured to fit inside the top of the receptacle when lifted by the plate mechanism 482 and a rotator motor 486 configured to rotate the rotator attachment 484 to thus rotate the receptacle on the plate mechanism 482. Once rotated, the plate mechanism 482 may lower the receptacle back onto the track 470.

The track component 470 may extend from the roller component 480 into the lift component, and may be activated to convey a receptacle from the rotator component 480 into the lift component. When a receptacle at the input component is released by stop mechanism 440, the input roller 408 may propel the receptacle onto the track component 470 within the rotator component 480. The track component 470 may, for example, include a parallel pair of motor-driven belts (see, e.g., FIG. 23). The rotator component 480 may include a stop mechanism 442 that may hold the properly oriented receptacle in the rotator component 480 until the lift component of the stacker 400 is clear. Once the lift component is clear, the stop mechanism 442 may release the receptacle, and the track component 470 of the stacker 400 may propel the receptacle from the rotator component 480 into the lift component of the stacker 400.

Figure 24:
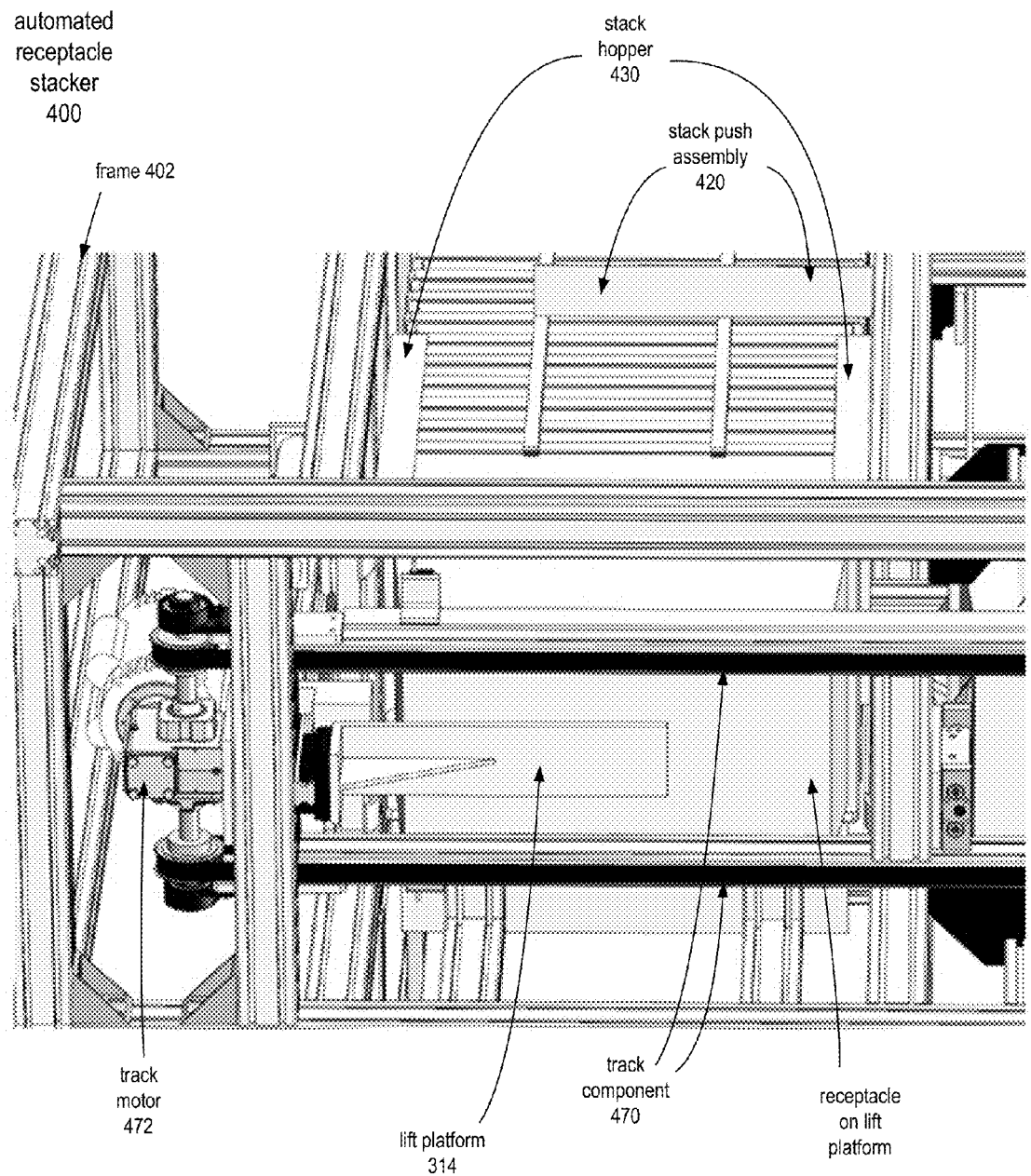
FIG. 24 is a bottom view of the lift component of the example automated receptacle stacker shown in FIG. 20, according to at least some embodiments.

FIG. 24 is a bottom view of the lift component of the example automated receptacle stacker shown in FIG. 20, according to at least some embodiments. This Figure shows the lift platform 414 extending under the receptacle in the lift component, and between the two tracks of the track component 470. This Figure also shows the bottom of the track motor, and the configuration of the axle and two drive wheels for the two tracks of the track component 470. This Figure also shows a portion of the stack push assembly 420 and a portion of the stack hopper 430 frame.

Figure 25:
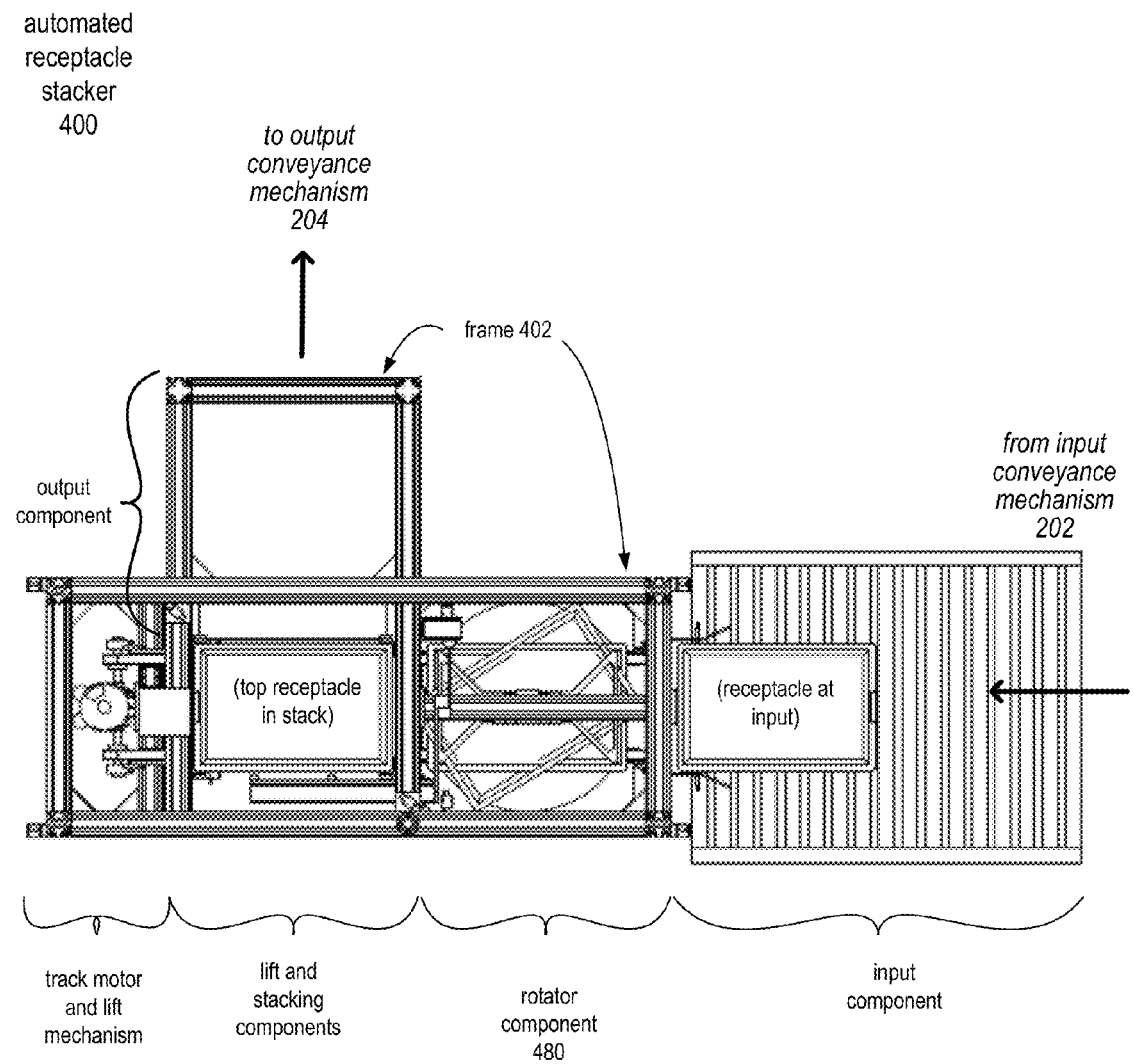
FIG. 25 is a top view of the example automated receptacle stacker shown in FIG. 20, according to at least some embodiments.

FIG. 25 is a top view of the example automated receptacle stacker shown in FIG. 20, according to at least some embodiments. FIG. 25 shows an example configuration for the input component, rotator component 480, lift and stacking components, output components, and track motor and lift mechanism in the example stacker 400.

Figure 26:
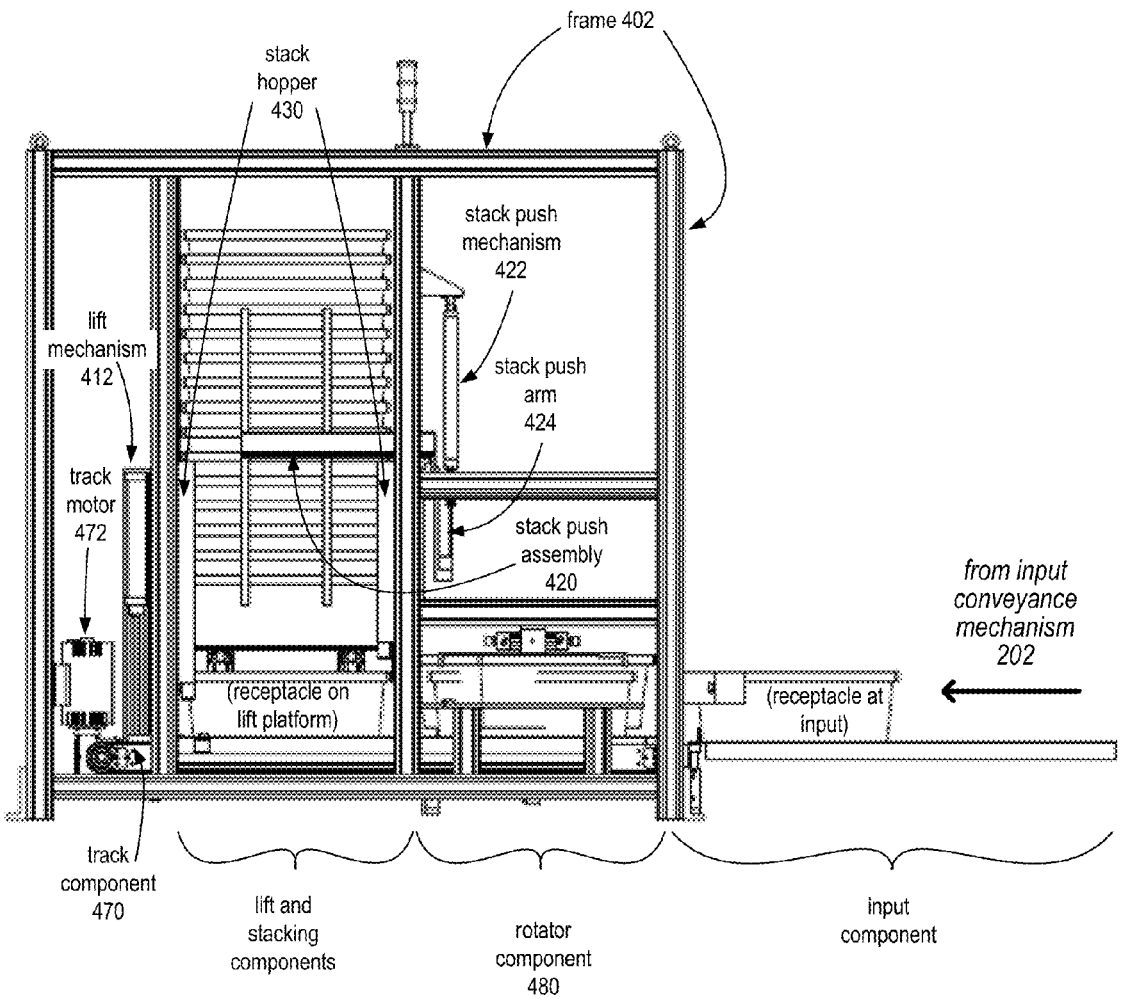
FIG. 26 shows the side opposite the output side of the example automated receptacle stacker shown in FIG. 20, according to at least some embodiments.

FIG. 26 shows the side opposite the output side of the example automated receptacle stacker shown in FIG. 20, according to at least some embodiments. FIG. 26 shows an example configuration for the input component, rotator component 480, lift and stacking components, and track motor 472 and lift mechanism 412 in the example stacker 400. FIG. 26 shows this side of the stack hopper 430 of the stacking component, as well as the stack push mechanism 422, stack push arm 424, and stack push assembly 420 of the stack push component.

Figure 27:
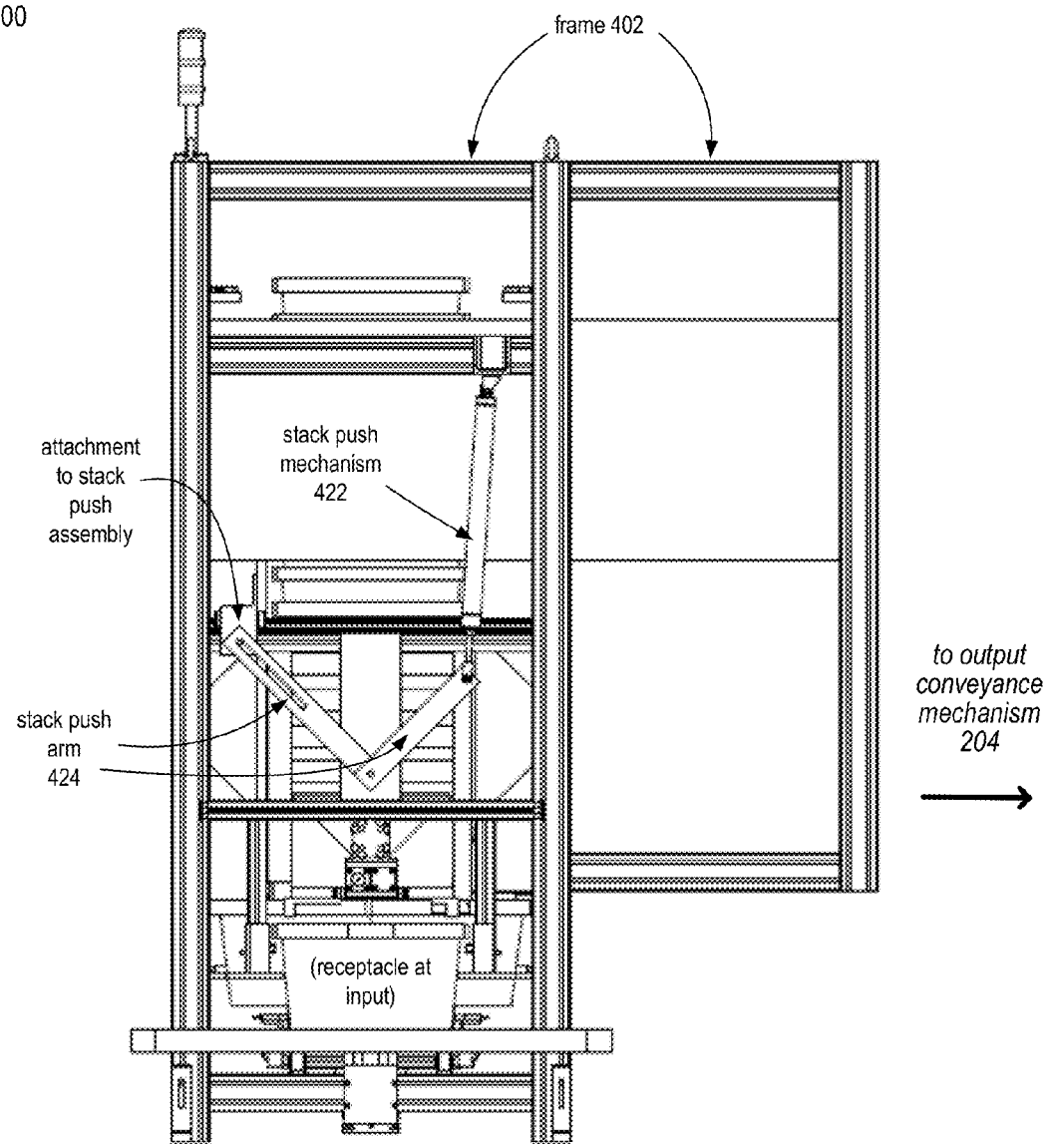
FIG. 27 shows the input side of the example automated receptacle stacker shown in FIG. 20, according to at least some embodiments.

FIG. 27 shows the input side of the example automated receptacle stacker shown in FIG. 20, according to at least some embodiments. FIG. 27 shows the stack push mechanism 422, articulated stack push arm 424, and stack push assembly 420 of the stack push component.

Automated Receptacle Stacker Methods of Operation

Figure 28:
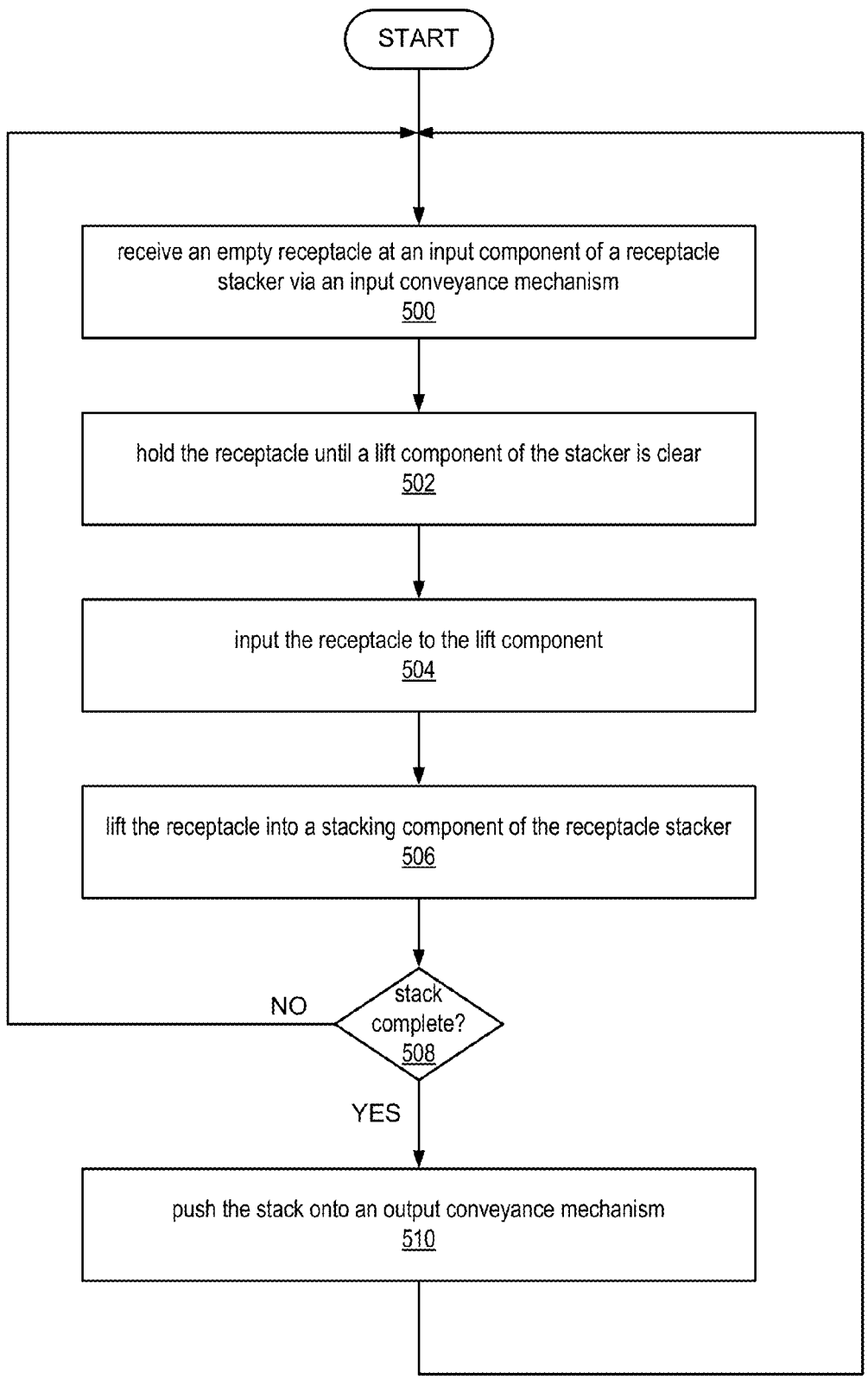
FIG. 28 is a flowchart of a method of operation of an automated receptacle stacker as shown in FIGS. 9 through 19, according to at least some embodiments.

FIG. 28 is a flowchart of a method of operation of an automated receptacle stacker, according to at least some embodiments.

As indicated at 500, an empty receptacle may be received at an input component of the receptacle stacker via an input conveyance mechanism. The input component may include at least an input roller, guides, one or more input sensors, and a stop mechanism. In at least some embodiments, the input sensors may detect when a receptacle arrives at the input component. As indicated at 502, the receptacle may be held until a lift component of the stacker is clear. For example, a stop mechanism of the receptacle stacker may extend to hold the receptacle until the lift component is cleared.

As indicated at 504, the receptacle may be input to the lift component of the stacker. In at least some embodiments, the stop mechanism may release the receptacle, and one or more drive rollers of the input roller may propel the receptacle into the lift component. The guides may serve to properly guide the receptacle into the lift component.

As indicated at 506, the receptacle may be lifted into a stacking component of the receptacle stacker. The stacker may further include a lift component that includes at least a lift platform and a lift mechanism coupled to the lift platform. The lift mechanism operates to lift the platform holding the receptacle upwards within the stacker into a stack hopper of the stacking component. Mechanical catch or clip mechanisms may be attached to or integrated with the stack hopper. The catch mechanisms may, for example, be spring-loaded bars or plates positioned so as to retract as the receptacle is pushed upwards into the stack hopper by the lift mechanism, and that automatically extend under the lip of the receptacle being lifted once the lip of the receptacle is past the top of the catch mechanisms to thus hold the receptacle in place in the stack hopper frame. Alternatively, the catch mechanisms may be pneumatically powered pins or cylinders that are extended to hold the receptacle in place and retracted when pushing a new receptacle onto the stack.

The stacker may detect when a stack is complete. For example, in at least some embodiments, the stacking component may include one or more stack sensors (e.g., optical sensors) or other mechanisms that detect when the stack has reached a certain height within the stack hopper frame and is thus ready to be output from the stacker. At 508, if the stack is not complete, the method may return to element 500 to lift another empty receptacle onto the bottom of the stack.

At 508, if the stack is complete, the stack is pushed onto an output conveyance mechanism, as indicated at 510. In at least some embodiments, the stacker may further include a stack push component that may push a stack out of the stack hopper frame and onto an output component of the stacker. In at least some embodiments, the stack push component may include at least a stack push mechanism mounted to the stacker frame and a stack push assembly mounted to the stack push mechanism. The stack push mechanism may be operable pull the stack push assembly towards the output side of the stacker to thus push the stack of receptacles out of the stack hopper onto the output component of the stacker. The output component may be configured to abut with or couple to an output conveyance mechanism. The stacker output component may, for example, be a roller conveyance mechanism, the top of which is substantially aligned with the bottom of a stack as held in the stack hopper. In at least some embodiments, one or more rollers of the roller conveyance mechanism may be drive rollers that operate to propel the stacks being output from the stacker onto the output conveyance mechanism.

After a stack is output at 510, the method may return to element 500 to begin a new stack.

Figure 29:
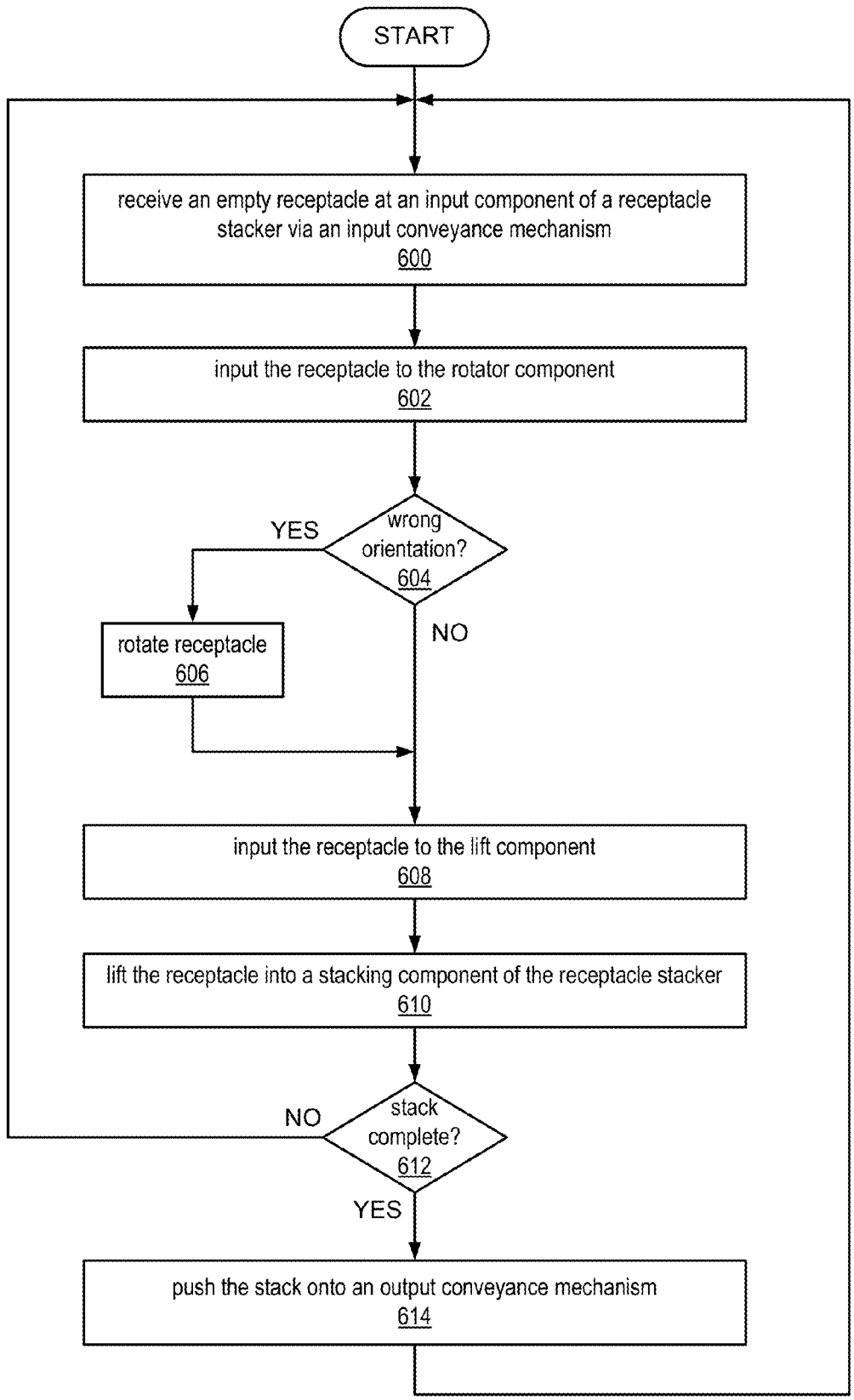
FIG. 29 is a flowchart of a method of operation of an automated receptacle stacker that includes a rotator component as shown in FIGS. 20 through 27, according to at least some embodiments.

FIG. 29 is a flowchart of a method of operation of an automated receptacle stacker that includes a rotator component, according to at least some embodiments.

As indicated at 600, an empty receptacle may be received at an input component of the receptacle stacker via an input conveyance mechanism. The input component may include at least an input roller, guides, one or more input sensors, and a stop mechanism. In at least some embodiments, the input sensors may detect when a receptacle arrives at the input component. The receptacle may be held at the input component until a rotator component of the stacker is clear. For example, a stop mechanism of the receptacle stacker may extend to hold the receptacle until the rotator component is cleared.

As indicated at 602, the receptacle may be input to the rotator component of the stacker. In at least some embodiments, the stop mechanism at the input component may release the receptacle, and one or more drive rollers of the input roller may propel the receptacle into the rotator component. The guides may serve to properly guide the receptacle into the rotator component.

The rotator component may detect the orientation of the receptacle and rotate the receptacle if necessary. For example, the rotator component may include one or more sensors that may detect the orientation of the receptacle prior to, during, or after input to the rotator component, and communicate the orientation to a control module of the stacker. At 604, if it is detected that the receptacle in the rotator component is in the wrong orientation, the control module may direct the rotator component to rotate the receptacle to the proper orientation, as indicated at 606. Otherwise, the receptacle is allowed to pass through the rotator component without being rotated.

As indicated at 608, the properly oriented receptacle may be input to the input component of the stacker. In at least some embodiments, a stop mechanism at the rotator component may release the receptacle, and a track component of the receptacle stacker may propel the receptacle into the input component.

As indicated at 610, once in the lift component, the receptacle may be lifted into a stacking component of the receptacle stacker. For example, the lift component may include at least a lift platform and a lift mechanism coupled to the lift platform. The lift mechanism operates to lift the platform holding the receptacle upwards within the stacker into a stack hopper of the stacking component. Mechanical catch or clip mechanisms may be attached to or integrated with the stack hopper. The catch mechanisms may, for example, be spring-loaded bars or plates positioned so as to retract as the receptacle is pushed upwards into the stack hopper by the lift mechanism, and that automatically extend under the lip of the receptacle being lifted once the lip of the receptacle is past the top of the catch mechanisms to thus hold the receptacle in place in the stack hopper frame. Alternatively, the catch mechanisms may be pneumatically powered pins or cylinders that are extended to hold the receptacle in place and retracted when pushing a new receptacle onto the stack.

The stacker may detect when a stack is complete. For example, in at least some embodiments, the stacking component may include one or more stack sensors (e.g., optical sensors) or other mechanisms that detect when the stack has reached a certain height within the stack hopper and/or a threshold number of receptacles have been added to the stack and is thus ready to be output from the stacker. At 612, if the stack is not complete, the method may return to element 600. At 612, if the stack is complete, the stack is pushed onto an output conveyance mechanism, as indicated at 614. In at least some embodiments, the stacker may further include a stack push component that may push a stack out of the stack hopper frame and onto an output component of the stacker. In at least some embodiments, the stack push component may include at least a stack push mechanism mounted to the stacker frame and a stack push assembly mounted to the stack push mechanism. The stack push mechanism may be operable pull the stack push assembly towards the output side of the stacker to thus push the stack of receptacles out of the stack hopper onto the output component of the stacker. The output component may be configured to abut with or couple to an output conveyance mechanism. The stacker output component may, for example, include a roller conveyance mechanism, the top of which is substantially aligned with the bottom of a stack as held in the stack hopper. In at least some embodiments, one or more rollers of the roller conveyance mechanism may be drive rollers that operate to propel the stacks being output from the stacker onto the output conveyance mechanism.

After a stack is output at 614, the method may return to element 500 to begin a new stack.

In at least some embodiments, the stacker may include one or more sensors (e.g., optical sensors) or other mechanisms that may operate to detect problems with the stacker (e.g., a jam, misstack, or misalignment of the receptacles in the stacking component or lift component) at any point during the methods described in FIGS. 28 and 29, and in response to detecting a problem, raise an alarm so that an agent can clear the problem. The alarm may be an audible signal such as a bell or beep or series thereof, a voice signal, a visual signal such as a light or lights, or a combination thereof. In some implementations, the agent(s) may carry hand-held devices to which a signal may be sent by the stacker to alert the agent(s) that a problem has been detected.

As described above, in at least some embodiments, the stacker may detect when a stack is complete. For example, in at least some embodiments, the stacker may include one or more stack sensors (e.g., optical sensors) or other mechanisms that detect when the stack has reached a certain height within the stack hopper. In addition, the stacker may keep track of how many receptacles are in a current stack, and detect when a threshold number of receptacles (e.g., 12 or 15, or some other number) have been added to the stack and is thus ready to be output from the stacker. These two conditions may be used to determine when a stack is complete. However, it is possible that a misstack of some sort may occur, resulting in the stack reaching the threshold height before the threshold number of receptacles is in the stack. In at least some embodiments, the stacker may be configured to detect that the stack has reached the threshold height and output the stack even if the stack includes fewer than the threshold number of receptacles. Thus, in some cases, the stacker may output incomplete stacks (i.e., stacks with fewer than the threshold number of receptacles).

Illustrative System

In at least some embodiments, a computer system that implements one or more components of a materials handling system in a materials handling facility as described herein, including but not limited to component(s) of an automated receptacle stacker that may be integrated into the materials handling system as described herein, may include a general-purpose computer system that includes or is configured to access one or more computer-accessible media, such as computer system 3000 illustrated in FIG. 30. In the illustrated embodiment, computer system 3000 includes one or more processors 3010 coupled to a system memory 3020 via an input/output (I/O) interface 3030. Computer system 3000 further includes a network interface 3040 coupled to I/O interface 3030.

In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an order fulfillment system and/or automated receptacle stacker, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices 3060 attached to a network or networks 3050, such as other computer systems or devices as illustrated in the other Figures described herein, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above in reference to the other Figures for implementing embodiments of an order fulfillment system and/or an automated receptacle stacker. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A materials handling facility, comprising:
an automated receptacle stacker comprising:
a stack hopper configured to hold a stack of empty receptacles, wherein the receptacles are used to hold and transport items in the materials handling facility;
a lift component operable to lift receptacles into the stack hopper; and
a stack push component operable to push a stack of receptacles out of the stack hopper;
an input conveyance mechanism configured to convey empty receptacles from one or more upstream stations in the materials handling facility to the receptacle stacker; and
an output conveyance mechanism configured to convey stacks of receptacles from the receptacle stacker to a downstream station in the materials handling facility;
wherein the receptacle stacker is operable to:
receive empty receptacles via the input conveyance mechanism;
for each received receptacle:
input the received receptacle to the lift component;
activate the lift component to lift the receptacle into the stack hopper;
determine if a current stack of receptacles in the stack hopper is completed; and
if the current stack is completed, activate the stack push component to push the completed stack out of the stack hopper onto the output conveyance mechanism.

2. The materials handling facility as recited in claim 1, wherein the receptacles are stackable by the receptacle stacker only if oriented correctly, and wherein the materials handling facility further comprises an automated receptacle rotator operable to:
automatically detect receptacles that are oriented incorrectly; and
rotate each incorrectly oriented receptacle to the correct orientation prior to said inputting the receptacle to the lift component.

3. The materials handling facility as recited in claim 1, wherein the receptacles are different on each end so that there are two orientations for the receptacles, wherein the materials handling facility further comprises:
a second automated receptacle stacker;
a receptacle diverter mechanism located on the input conveyance mechanism; and
a conveyance mechanism configured to convey empty receptacles from the receptacle diverter mechanism to the second receptacle stacker;
wherein the receptacle diverter mechanism is operable to:
automatically detect the orientation of the receptacles on the input conveyance mechanism;
for each receptacle in a first orientation, allow the receptacle to pass through on the input conveyance mechanism to the receptacle stacker;
for each receptacle in a second orientation, divert the receptacle onto the conveyance mechanism to the second receptacle stacker.

4. The materials handling facility as recited in claim 1, wherein the materials handling facility further comprises:
a diverter mechanism located on the input conveyance mechanism; and
a conveyance mechanism configured to convey empty receptacles from the diverter mechanism to a manual receptacle stacking station;
wherein the diverter mechanism is operable to divert at least some empty receptacles from the input conveyance mechanism onto the conveyance mechanism to the manual receptacle stacking station when activated.

5. The materials handling facility as recited in claim 1, wherein the one or more upstream stations are induction stations in an order fulfillment process, wherein the receptacles are pick receptacles used in the order fulfillment process to convey collections of mixed items to the induction stations under direction of a control system of the materials handling facility, and wherein the items are removed from the pick receptacles and inducted into a conveyance mechanism at the induction stations for conveyance to one or more downstream processing stations under direction of the control system of the materials handling facility.

6. The materials handling facility as recited in claim 1, wherein the downstream station is a stack palletization station at which the stacks of receptacles are removed from the output conveyance mechanism and placed onto pallets for transport to one or more locations within the materials handling facility.

7. A receptacle stacker apparatus, comprising:
an input component;
an output component;
a stack hopper configured to hold a stack of empty receptacles;
a lift component operable to lift receptacles into the stack hopper;
a stack push component operable to push a stack of receptacles out of the stack hopper onto the output component; and
a control module operable to:
detect an empty receptacle at the input component;
direct the input component to input the receptacle to the lift component;
direct the lift component to lift the receptacle into the stack hopper;
detect that a current stack of receptacles in the stack hopper is completed; and
direct the stack push component to push the completed stack out of the stack hopper onto the output component.

8. The receptacle stacker apparatus as recited in claim 7, wherein the receptacles are stackable only if oriented correctly, wherein the receptacle stacker apparatus further comprises a rotator component, and wherein, to direct the input component to input the receptacle to the lift component, the control module is further operable to:
direct the input component to input the receptacle to the rotator component;

detect that the receptacle at the rotator component is oriented incorrectly;
direct the rotator component to rotate the receptacle to the correct orientation; and
direct the rotator component to input the correctly oriented receptacle to the lift component.

9. The receptacle stacker apparatus as recited in claim 7, wherein the input component is configured to receive the empty receptacle via an input conveyance mechanism that conveys empty receptacles from one or more upstream stations of a materials handling system to the input component of the receptacle stacker apparatus.

10. The receptacle stacker apparatus as recited in claim 7, wherein the input component comprises a roller mechanism that includes one or more rollers, wherein at least one of the rollers is a driven roller that is activated to propel the empty receptacle into the lift component.

11. The receptacle stacker apparatus as recited in claim 7, wherein the receptacle stacker apparatus further comprises a stop mechanism that stops the empty receptacle at the input component, wherein the control module is further operable to direct the stop mechanism to release the empty receptacle upon determining that the lift component is ready to receive a next receptacle.

12. The receptacle stacker apparatus as recited in claim 7, wherein the output component is configured to output the completed stack to an output conveyance mechanism that conveys stacks of receptacles from the receptacle stacker apparatus to a downstream station of a materials handling system.

13. The receptacle stacker apparatus as recited in claim 12, wherein the output component comprises a roller mechanism that includes one or more rollers, wherein at least one of the rollers is a driven roller that is activated to propel the completed stack onto the output conveyance mechanism.

14. The receptacle stacker apparatus as recited in claim 7, wherein the lift component comprises a platform onto which the empty receptacle is input and a lift mechanism coupled to the platform and operable to lift the platform holding the empty receptacle upwards towards the stack hopper.

15. The receptacle stacker apparatus as recited in claim 7, wherein the stack hopper includes two or more catch mechanisms operable to catch and hold receptacles lifted into the stack hopper by the lift mechanism.

16. The receptacle stacker apparatus as recited in claim 15, wherein the catch mechanisms are mechanical catch mechanisms that are pushed open by a lip of a receptacle being lifted into the stack hopper and that extend to catch and hold the receptacle as the lip of the receptacle passes the catch mechanism.

17. The receptacle stacker apparatus as recited in claim 7, wherein the receptacle stacker apparatus includes one or more sensors operable to detect when the current stack in the stack hopper has reached a threshold height, and wherein, to detect that a current stack of receptacles in the stack hopper is completed, the control module is operable to receive a signal from the one or more sensors indicating that the current stack is at or above the threshold height.

18. The receptacle stacker apparatus as recited in claim 7, wherein, to detect that a current stack of receptacles in the stack hopper is completed, the control module is operable to count receptacles lifted into the stack hopper, wherein the stack is completed when a threshold number of receptacles have been lifted into the stack hopper.

19. The receptacle stacker apparatus as recited in claim 7, wherein the stack hopper comprises one or more gates that are in a closed position while a stack is being formed within the stack hopper, and wherein the control module is further operable to direct the gates to open prior to the stack push component pushing the completed stack out of the stack hopper onto the output conveyance mechanism.

20. A method, comprising:
receiving empty receptacles into a stack hopper at an automated receptacle stacker via an input conveyance mechanism that conveys the empty receptacles from one or more upstream stations to the receptacle stacker, wherein the stack hopper is configured to hold a stack of empty receptacles;
for each received receptacle, adding, by a lift component, the receptacle to a current stack within the receptacle stacker;
determining that the current stack is completed; and
in response to said determining, outputting, by a stack push component of the receptacle stacker, the completed stack onto an output conveyance mechanism that conveys stacks of receptacles from the receptacle stacker to a downstream station.

21. The method as recited in claim 20, wherein the receptacle stacker comprises a stack hopper configured to hold the stack of empty receptacles and a lift component operable to lift receptacles into the stack hopper, and wherein said adding the receptacle to the current stack within the receptacle stacker comprises activating the lift component to lift the receptacle into the stack hopper.

22. The method as recited in claim 21, wherein the stack hopper includes two or more catch mechanisms operable to catch and hold the receptacle lifted into the stack hopper by the lift mechanism.

23. The method as recited in claim 21, wherein the receptacle stacker further comprise a stack push component, and wherein said outputting the completed stack onto the output conveyance mechanism comprises activating the stack push component to push the completed stack out of the stack hopper onto the output conveyance mechanism.

24. The method as recited in claim 20, wherein the receptacles are stackable by the receptacle stacker only if oriented correctly, and wherein the method further comprises:
automatically detecting receptacles on the input conveyance mechanism that are oriented incorrectly; and
rotating each incorrectly oriented receptacle to the correct orientation.

25. The method as recited in claim 20, wherein the receptacles are different on each end so that there are two orientations for the receptacles, wherein the method further comprises:
automatically detecting the orientation of the receptacles on the input conveyance mechanism;
for each receptacle in a first orientation, allowing the receptacle to pass through on the input conveyance mechanism to the receptacle stacker;
for each receptacle in a second orientation, diverting the receptacle onto another conveyance mechanism that conveys the receptacles to a second receptacle stacker.

26. The method as recited in claim 20, wherein the receptacles are stackable only if oriented correctly, wherein the receptacle stacker comprises a rotator component operable to rotate receptacles, and wherein the method further comprises:
determining if the receptacle at the rotator component is oriented correctly; and
if the receptacle is not oriented correctly, activating the rotator component to rotate the receptacle to the correct orientation prior to said adding the receptacle to the current stack within the receptacle stacker.

27. The method as recited in claim 20, wherein the receptacle stacker comprises a stack hopper configured to hold the stack of empty receptacles, and wherein said determining that the current stack is completed comprises detecting that the current stack has reached a threshold height within the stack hopper.

28. The method as recited in claim 20, wherein the one or more upstream stations are induction stations in an order fulfillment process, wherein the receptacles are pick receptacles used in the order fulfillment process to convey collections of mixed items to the induction stations under direction of a control system of a materials handling facility, and wherein the items are removed from the pick receptacles and inducted into a conveyance mechanism at the induction stations for conveyance to one or more downstream processing stations under direction of the control system.

29. The method as recited in claim 20, wherein the downstream station is a stack palletization station at which the stacks of receptacles are removed from the output conveyance mechanism and placed onto pallets for transport to one or more locations within a materials handling facility.

\* \* \* \* \*